(12) United States Patent
Shingai

(10) Patent No.: US 7,775,515 B2
(45) Date of Patent: Aug. 17, 2010

(54) SHEET CONVEYING DEVICE

(75) Inventor: Hiroyuki Shingai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 77 days.

(21) Appl. No.: 11/931,466

(22) Filed: Oct. 31, 2007

(65) Prior Publication Data

US 2008/0111293 A1    May 15, 2008

(30) Foreign Application Priority Data

Nov. 15, 2006    (JP) .............................. 2006-309661

(51) Int. Cl.
*B65H 5/22*     (2006.01)
*B65H 83/00*    (2006.01)
*B65H 85/00*    (2006.01)
*B65H 29/00*    (2006.01)

(52) U.S. Cl. ..................................... 271/3.14; 271/186
(58) Field of Classification Search ............... 271/3.14, 271/225, 186
See application file for complete search history.

(56) References Cited

U.S. PATENT DOCUMENTS

| | | | | | |
|---|---|---|---|---|---|
| 4,627,709 | A | * | 12/1986 | Kitajima et al. | 399/374 |
| 4,761,001 | A | * | 8/1988 | Hayakawa et al. | 271/3.01 |
| 4,884,794 | A | * | 12/1989 | Dinatale et al. | 271/3.19 |
| 4,921,236 | A | * | 5/1990 | Saeki et al. | 271/3.05 |
| 5,085,418 | A | * | 2/1992 | Rapkin et al. | 271/3.02 |
| 5,132,741 | A | * | 7/1992 | Kitajima et al. | 399/370 |
| 5,192,976 | A | * | 3/1993 | Kitajima et al. | 399/373 |
| 5,203,554 | A | * | 4/1993 | Suzuki et al. | 271/10.05 |
| 5,229,816 | A | * | 7/1993 | Fujimoto et al. | 399/52 |
| 5,812,912 | A | * | 9/1998 | Hiroi et al. | 399/203 |
| 5,828,932 | A | * | 10/1998 | Ohata et al. | 399/209 |
| 5,926,681 | A | * | 7/1999 | Ishimaru | 399/367 |
| 5,927,706 | A | * | 7/1999 | Hiroi et al. | 271/117 |
| 5,991,592 | A | * | 11/1999 | Kobayashi et al. | 399/374 |
| 6,161,831 | A | * | 12/2000 | Kusakabe et al. | 271/186 |
| 6,209,861 | B1 | * | 4/2001 | Kakuta et al. | 271/3.02 |
| 2004/0021262 | A1 | * | 2/2004 | Yen et al. | 271/10.11 |
| 2007/0183004 | A1 | * | 8/2007 | Jo | 358/498 |

FOREIGN PATENT DOCUMENTS

| | | |
|---|---|---|
| JP | 8085649 | 4/1986 |
| JP | 11157756 | 6/1999 |
| JP | 2002077519 | 3/2002 |

\* cited by examiner

*Primary Examiner*—Patrick Mackey
*Assistant Examiner*—Patrick Cicchino
(74) *Attorney, Agent, or Firm*—Banner & Witcoff, Ltd

(57) ABSTRACT

In one aspect of a sheet conveying device, a sheet member is guided from a sheet feeding port through a reading position to a terminal end positioned above the sheet feeding port on a first path, guided from the terminal end through the reading position to the terminal end again on a second path, and guided from the terminal end through the reading position to a sheet discharging port on a third path. A transfer member rotates a conveying member and halts the rotation of the conveying member respectively according to first and second rotations of a driving source. A first detecting unit is provided downstream of the sheet feeding port on the first path. A control unit switches the driving source from the first rotation to the second rotation on the basis that the first detecting unit detects a trailing end of the sheet member.

16 Claims, 34 Drawing Sheets

SHEET CONVEYING DEVICE

CROSS-REFERENCE TO RELATED APPLICATIONS

This application is based upon and claims the benefit of priority from Japanese Patent Application No. 2006-309661, filed on Nov. 15, 2006, the entire contents of which are incorporated herein by reference.

TECHNICAL FIELD

One aspect of the present invention relates to a sheet conveying device provided with conveying paths which interconnects a first tray on which sheet members before feeding is allowed to be placed, a second tray on which sheet members after discharge are allowed to be placed, and an opening portion provided above the first tray via a reading position.

BACKGROUND

There is an image reading apparatus provided with a document feeder, which is called ADF (Auto Document Feeder) for conveying documents from a sheet feed tray through a conveying path to a sheet discharging tray. For example, JP-A-8-85649 discloses a document feeder in which for the purpose of reading a document printed both on the first and second faces, the document is conveyed for reading images on both faces of the document, with the leading end of the document turned back to the trailing end in the course of conveyance.

FIG. 33 and FIG. 34 are pattern diagrams showing a conveyance path of an example of a document feeder for reading images on both sides. As shown in FIG. 33, a plurality of sheets of a document is placed on a sheet feed tray 100, with the first face (page 1) being kept upward. Document P is fed from a feed roller 101 to a conveying path 102. A conveying roller 103 is provided on the conveying path 102, whenever necessary. The document is conveyed by the conveying roller 103, and when passing over a reading position X, the document P is read for the first face by an image reader. When the document P after the first face has been read is detected for the trailing end by a sensor, a discharge roller 104 is halted, with the trailing end of the document being nipped.

As shown in FIG. 34, the discharge roller 104 is reversed to convey the document P to a return path 105. The document P again advances upstream in the conveying direction at the reading position X on the conveying path 102 from the return path 105. Then, on passage of the document P conveyed by the conveying roller 103 over a reading position X, the second face (page 2) is read by an image reader. When the document P is detected for the trailing end by a sensor after the second face has been read, the discharge roller 104 is halted again, with a part near the trailing end of the document being nipped. Thereafter, the discharge roller 104 turns reversely, thereby conveying the document P to a switchback path 105. The document P, which has again advanced from the return path 105 to the conveying path 102, passes, with the first face being opposed to the reading position X. The document P is conveyed on the conveying path 102 and discharged to a sheet discharging tray 106, with the first face kept downward. Thereby, documents are discharged to the sheet discharging tray 106 in the order that they are stacked on the sheet feed tray 100.

Further, JP-A-11-157756 discloses another example of a document feeder for reading images on both faces. In the document feeder, the return path 105 is extended from an upper portion on the conveying path 102 which is approximately in a laterally-faced U-shape, and the terminal end of the return path 105 is opened outside the feeder toward the upper side of the sheet feed tray 100.

SUMMARY

In a conveying path on which a return path 105 is extended toward the upper side of the sheet tray 100, a part of the document P projected from the return path 105 may be in contact with the document P placed on a sheet feed tray 100. The document P placed on the sheet feed tray 100 may be disrupted, which may cause a defective feeding from the sheet feed tray 100 to the conveying path 102.

One aspect of the present invention has been made in view of the above circumstances, an object of which is to prevent the disruption of another sheet member placed in a tray by a sheet member projected to the tray in a sheet conveying device that conveys sheet members in a sheet form such as documents.

According to an aspect of the invention, there is provided a sheet conveying device including: a first tray on which a plurality of sheet members before feeding are allowed to be placed; a second tray on which a plurality of sheet members after discharge are allowed to be placed; an opening portion provided above the first tray; a sheet conveying path which connects the first tray and the second tray to the opening portion through a reading position; a feeding unit provided on the sheet conveying path to press-contact with a sheet member placed on the first tray, thereby feeding the sheet member sequentially to the sheet conveying path; a sheet conveying unit provided on the sheet conveying path; a driving source that generates a rotational driving force in a first rotational direction or a second rotational direction that is opposite to the first rotational direction; a control unit configured to switch the rotational direction of the driving source to the first rotational direction or the second rotational direction; a transfer unit that transfers a rotational driving force according to the position of the sheet member on the sheet conveying path from the driving source to the sheet conveying unit, the transfer unit transferring the rotational driving force from the driving source to the feeding unit when the driving source is driven to the first rotational direction, and the transfer unit blocking the transfer of the rotational driving force from the driving source to the feeding unit when the driving source is driven to a second rotational direction; and a first detecting unit provided downstream of the feeding unit in the conveying direction on the sheet conveying path to detect the trailing end of the sheet member conveyed on the sheet conveying path, wherein, when the sheet member is fed on the sheet conveying path from the first tray to the second tray sequentially through a first path, a second path and a third path, the first path on which, after passing through the reading position, the sheet member returns to the sheet conveying path upstream of the reading position in the conveying direction, the second path on which the sheet member having returned to the sheet conveying path again returns through the reading position and the opening portion to the sheet conveying path upstream of the reading position in the conveying direction, and the third path on which the sheet member having again returned to the sheet conveying path is discharged through the reading position and the opening portion onto the second tray, the control unit switches the driving source from the first rotational direction to the second rotational direction based on a result of the trailing end of the sheet member detected by the first detecting unit on conveyance of the sheet member on the first path.

According to another aspect of the invention, there is provided a sheet conveying device including: a sheet feeding port to which a sheet member is allowed to be inserted; a sheet discharging port from which the sheet member is allowed to be discharged; a conveying member that conveys the sheet member from the sheet feeding port to the sheet discharging port; a first path on which the sheet member is guided from the sheet feeding port through a reading position to a terminal end positioned above the sheet feeding port; a second path on which the sheet member is guided from the terminal end through the reading position to the terminal end again; a third path on which the sheet member is guided from the terminal end through the reading position to the sheet discharging port; a driving source capable of rotating in a first rotation and a second rotation that is opposite to the first rotation; a transfer member that rotates the conveying member according to the first rotation of the driving source and halts the rotation of the conveying member according to the second rotation of the driving source; a first detecting unit provided downstream of a sheet feeding port on the first path; and a control unit configured to switch the driving source from the first rotation to the second rotation on the basis that the first detecting unit detects a trailing end of the sheet member on the first path.

DESCRIPTION

Hereinafter, a description will be given for an illustrative aspect of the present invention with reference to the drawings as appropriate. It is noted that the illustrative aspect is only one example for explaining the present invention. As a matter of course, they may be appropriately modified not deviating from the spirit of the present invention.

Figure 1:
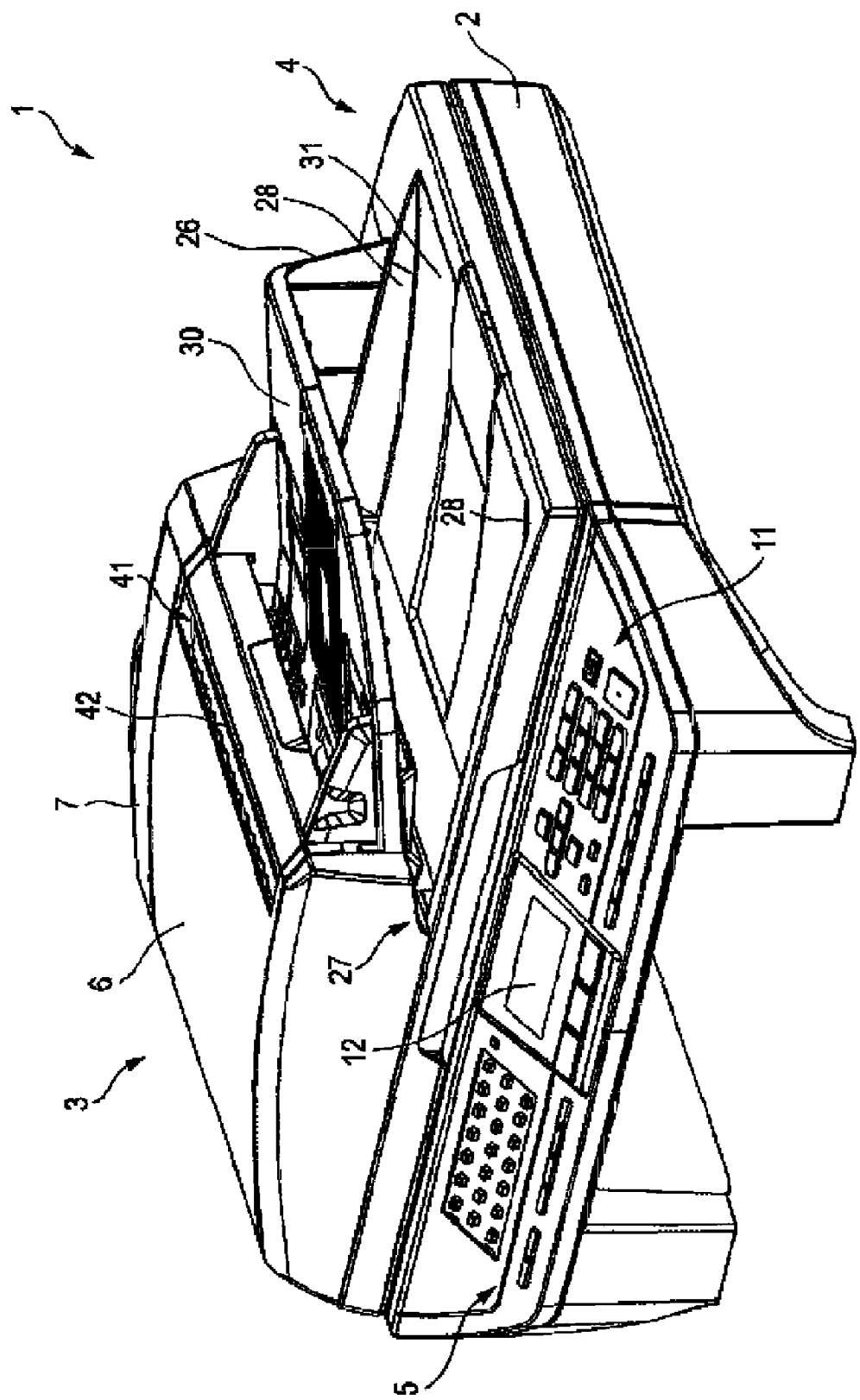
FIG. 1 is a perspective view of an outer structure of the image reading apparatus 1 in an illustrative aspect of the present invention.
Figure 2:
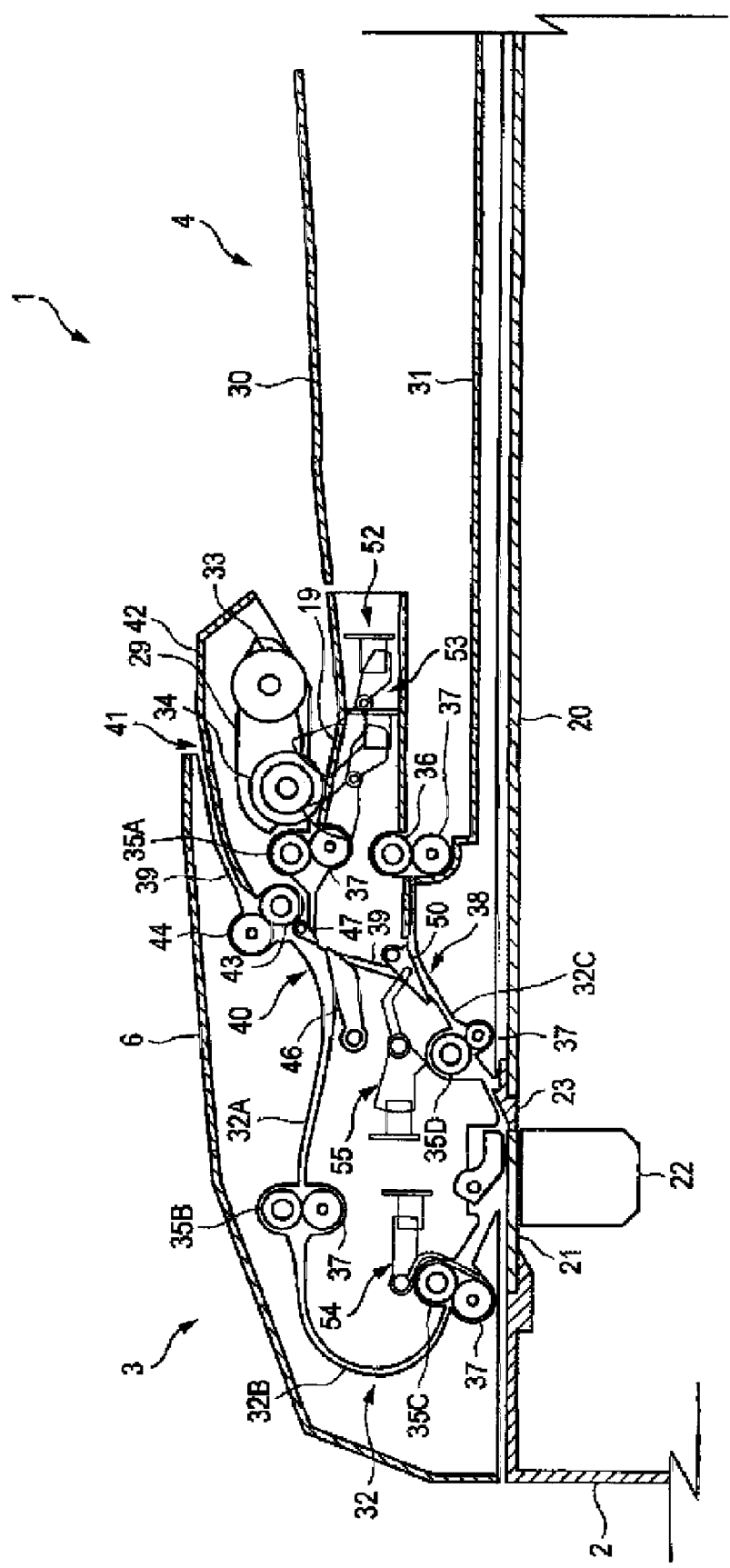
FIG. 2 is a sectional view of an inner structure of the image reading apparatus 1.

FIG. 1 shows an outer appearance structure of an image reading apparatus 1 according to an illustrative aspect of the present invention. FIG. 2 shows major inner structure of the image reading apparatus 1. The image reading apparatus 1 can be realized as an image reading unit configured to read images on a document (corresponding to a sheet member), for example, in a coping machine, a facsimile machine, a scanner or a multi function device (MFD) that has copying, facsimile and scanner functions integrally.

As shown in FIG. 1 and FIG. 2, the image reading apparatus 1 having a document cover 4 including a document placing base 2 acting as a flatbed scanner (FBS) and an auto document feeder (ADF) 3, which is a document conveying mechanism. It is noted that the ADF 3 is an example of the sheet conveying device.

An operation panel 5 is provided on the front face of the document placing base 2. The operation panel 5 is provided with various operation keys 11 and a liquid display unit 12. A user can input any desired instruction by using the operation panel 5. For example, "START" indicating the start or the resumption of reading a document and "STOP" indicating the halt of reading or the discontinuation are input by using the operation keys 11. The image reading apparatus 1 receives these predetermined inputs and operates according to these inputs. The image reading apparatus 1 operates not only based on instructions input from the operation panel 5 but also based on instructions transmitted from a computer connected via a printer driver, when connected to the computer.

As shown in FIG. 2, platen glasses 20, 21 are disposed on the top face opposing the document cover 4 on the document placing base 2. The document cover 4 is opened, thereby the platen glasses 20, 21 are exposed as the upper face of the document placing base 2. The document cover 4 is closed, thereby the upper face of the document placing base 2 including the platen glasses 20, 21 is entirely covered. An image reading unit 22 is provided inside the document placing base 2 so as to face the platen glasses 20, 21.

The platen glass 20 is for placing documents when the image reading apparatus 1 is used as a FBS and made, for example, of a transparent glass plate. An opening is formed at the center of the upper face of the document placing base 2 for exposing the platen glass 20, and an area of the platen glass 20 exposed from the opening is given as a document reading area on the FBS.

The platen glass 21 is to constitute a reading position where the ADF 3 of the image reading apparatus 1 is used and made, for example, of a transparent glass plate. An opening is formed at the reading position of the document placing base 2. The platen glass 21 is exposed from the opening. The platen glass 21 is in a rectangular shape, when viewed from above.

A positioning member 23 is provided between the platen glass 20 and the platen glass 21. The positioning member 23 is a flat-plate like member long in the major scanning direction. The positioning member 23 is used as a positioning reference of documents when the documents are placed on the platen glass 20 which is the document placing face of FBS. Therefore, markings indicating a center position and both ends of documents in various sizes such as A4, size and B5 size are given on the upper face of the positioning member 23. A guide face is formed on the upper face of the positioning member 23. The guide face catches a document passing through the platen glass 21 by using the ADF 3, deflects and returns it to the ADF 3.

An image reading unit 22 irradiates light on a document from a light source through the platen glasses 20, 21, concentrates reflected light from the document on a light receiving element, and then converting the reflected light to an electric signal (image sensor). The image reading unit 22 includes, for example, a contact image sensor (CIS) and a charge coupled device (CCD) of a shrinkage optical system image sensor. The image reading unit 22 is provided so as to move reciprocally below the platen glasses 20, 21 by a cartridge motor and a belt driving mechanism, which is a scanning mechanism.

The document cover 4 includes the ADF 3 that continuously conveys documents from the sheet feed tray 30 (one example of the first tray) through the document conveying path 32 (one example of the sheet conveying path and the first conveying path) to the sheet discharging tray 31 (one example of the second tray). A document passes through the reading position on the platen glass 21 in the course of conveyance by the ADF 3, and images of the document is read by the image reading unit 22 on standby below the platen glass 21.

As shown in FIG. 1 and FIG. 2, a sheet feed tray 30 and a sheet discharging tray 31 are respectively provided at the upper and lower stages, with the sheet feed tray 30 kept upward, on the document cover 4. In the present illustrative aspect, the sheet feed tray 30 is provided at the upper side. However, the sheet discharging tray 31 may be disposed above the sheet feed tray 30. Documents conveyed by the ADF 3 are placed on the sheet feed tray 30. A plurality of sheets of document can be placed on the sheet feed tray 30 in a stacked state in such a way that the leading end of a document in the conveying direction is inserted into the document conveying path 32 with the first face facing upward. As shown in FIG. 1, the back face of the sheet feed tray 30 in the apparatus is bent downward, by which a protective wall 26 is formed. The lower end of the protective wall 26 is connected to the upper face of the document cover 4. The protective wall 26 prevents documents on the sheet discharging tray 31 from falling when the document cover 4 is opened with respect to the document placing base 2. A notch 27 is formed at a part of the casing of the ADF 3 below the front face of the sheet feed tray 30 in the apparatus. The notch 27 increases the visibility when a document discharged onto the sheet discharging tray 31 is viewed from the front face of the apparatus. In particular, a small-sized document is difficult to view from the sheet feed tray 30. However, a space between the sheet feed tray 30 and the sheet discharging tray 31 is expanded by the notch 27, thus making it possible to increase the visibility of a small-sized document.

A plurality of documents discharged from the ADF 3 are placed on the sheet discharging tray 31. The sheet discharging tray 31 is located apart in a vertical direction below the sheet feed tray 30 and formed integrally on the upper face of the document cover 4. A document discharged from the ADF 3 is stacked on the sheet discharging tray 31, with the first face facing downward, in a state apart from a document on the sheet feed tray 30. Bilateral portions 28 which are to form the front face and the back face of the sheet discharging tray 31 in the apparatus are slant faces rising upward to the respective sides. By the bilateral portions 28, a document can be pulled out by allowing the document to slide along the slant face of the bilateral portion 28 so as to press down the document from above when the document discharged to the sheet discharging tray 31 is taken out, thereby making it easy to pull out the document from the sheet discharging tray 31.

As shown in FIG. 2, a document conveying path 32 which connects the sheet feed tray 30 to the sheet discharging tray 31 over a reading position on the platen glass 21 is formed inside the ADF 3. The document conveying path 32 is formed approximately in a letter C shape, when viewed in the cross section. The document conveying path 32 is continuously formed with a member, a guide plate, a guide rib and others which constitute the ADF main body as a path with a predetermined width through which a document can pass.

The document conveying path 32 is extended from the sheet feed tray 30 to one end of the document cover 4 (the left side in the drawing) and then, bent so as to be reversed downward, leading to a reading position on the platen glass 21. It is formed approximately in a Letter C shape when viewed in their longitudinal cross section extended from the reading position toward the sheet discharging tray 31. The document conveying path 32 includes three portions, that is, an upper portion 32A, a lower portion 32C and a curved portion 32B that connects the upper portion 32A to the lower portion 32C.

A conveying unit that conveys documents from the sheet feed tray 30 to the sheet discharging tray 31 is disposed on the document conveying path 32. More specifically, as shown in FIG. 2, the conveying unit includes a pickup roller 33, a separation roller 34 (one example of the roller body), conveying rollers 35A, 35B, 35C and 35D, a discharge roller 36, and a pinch rollers 37 in pressure-contact therewith, which are respectively provided in the document conveying path 32. A driving force is transferred to the above individual rollers of the conveying unit from a single motor 67 (one example of the driving source, refer to FIG. 6) through a driving-force transfer mechanism to be described later. It is noted that in the conveying unit, the conveying rollers 35A, 35B, 35C and 35D, the discharge roller 36 and the pinch rollers 37 in pressure-contact therewith correspond to the first conveying unit.

As shown in FIG. 2, the pickup roller 33 and the separation roller 34 are provided in the vicinity of the sheet feeding port of the document conveying path 32. The pickup roller 33 is provided so as to rotate freely at the leading end of an arm 29, the base end of which is pivotally supported by a shaft 111

(refer to FIG. 12) which pivotally supports the separation roller 34. The separation roller 34 is provided at a position apart in the conveying direction from the pickup roller 33. The separation roller 34 is provided in a rotatable manner so as to be in contact with a guide plate 19 (one example of the plate) which is a face opposing the document conveying path 32. A driving force is transferred from the motor 67 (refer to FIG. 6) to rotate and drive the pickup roller 33 and the separation roller 34. Further, a driving force is also transferred from the motor 67 to move the arm 29 up and down. The pickup roller 33 is identical to the separation roller 34 in diameter and they are rotated at the same peripheral speed. A friction pad containing cork and the like is provided at a position opposing the separation roller 34 on the guide plate 19. The friction pad separates the uppermost document from a plurality of documents due to friction generated on pressure-contact with the roller face of the rotating separation roller 34. It is noted that the feeding unit is realized by, for example, the separation roller 34 and the guide plate 19.

The conveying rollers 35A, 35B, 35C and 35D are respectively disposed at different positions on the document conveying path 32. In the present illustrative aspect, the conveying roller 35A is disposed in the vicinity of the separation roller 34 downstream in the conveying direction. The conveying roller 35B is disposed on the upper portion 32A on the document conveying path 32. The conveying roller 35C is disposed at the lower portion 32C on the document conveying path 32 and in the vicinity of the reading position upstream in the conveying direction. The conveying roller 35D is disposed at the lower portion 32C on the document conveying path 32 and in the vicinity of the reading position downstream in the conveying direction. It is noted that the above-described arrangement is one example and the conveying rollers 35A, 35B, 35C and 35D may be changed in number and arrangement, whenever necessary.

The pinch roller 37 is provided at a position opposing each of the conveying rollers 35A, 35B, 35C and 35D. The shaft of each pinch roller 37 is elastically urged by a spring, thereby being in pressure-contact with the roller face of each of the conveying rollers 35. When each of the conveying rollers 35A, 35B, 35C and 35D is rotated, the pinch roller 37 is also rotated accordingly. A document is in pressure-contact with each of the conveying rollers 35A, 35B, 35C and 35D by each pinch roller 37, by which a rotating force of each of the conveying rollers 35A, 35B, 35C and 35D is transferred to the document.

The discharge roller 36 is disposed in the vicinity of the sheet discharging port on the document conveying path 32 and rotated when a driving force from the motor 67 (refer to FIG. 6) is transferred. One of the pinch rollers 37 is provided at a position opposing the discharge roller 36. The pinch roller 37 is elastically urged by a spring.

A bidirectional path 39 (one example of the sheet conveying path and the second conveying path) is connected at the lower portion 32C on the document conveying path 32. The bidirectional path 39 is connected downstream of the reading position in the conveying direction, more specifically, to a connection position 38 downstream of the conveying roller 35D at the lower portion 32C in the conveying direction (corresponding to a predetermined first position). The bidirectional path 39 is configured to, when images on both faces are read, convey again a document, the first face of which is read at the reading position, from downstream the reading position in the conveying direction to the document conveying path 32 upstream in the conveying direction, with in the leading end and the trailing end being reversed. The bidirectional path 39 is extended in an obliquely upward direction from the connection position 38 above the sheet tray 30 and intersects with the upper portion 32A on the document conveying path 32. Documents conveyed in a switchback manner are returned to the document conveying path 32 from an intersecting position 40 between the upper portion 32A and the bidirectional path 39.

The terminal end 41 of the bidirectional path 39 is opened on the upper face of the ADF 3. A document supporting portion 42 is formed on the sheet feed tray 30 from the terminal end 41 of the bidirectional path 39 so as to continue from the terminal end 41. The document supporting portion 42 is to support a document projected from the terminal end 41 of the bidirectional path 39. Further, the document supporting portion 42 is formed above the feed roller 33 and the separation roller 34 and constitutes an upper cover 6 (refer to FIG. 1) of the ADF 3. The upper cover 6 is formed so as to cover the entire ADF 3 including the feed roller 33 and the separation roller 34, and constituted so as to be opened and closed pivotally with respect to the casing of the ADF 3. The document supporting portion 42 constituted as the upper cover 6 is extended to the upstream of the feed roller 33 in the conveying direction directed from the terminal end 42 to the sheet feed tray 30. Thereby, a document projecting outside from the terminal end 41 is supported on the document supporting portion 41. The document never hangs down the downstream side of the feeding position of documents stacked on the sheet feed tray 30 (the left side in FIG. 2) in the conveying direction. The documents on the sheet feed tray are not disrupted. Further, the upper cover 6 is opened pivotally, by which the document conveying path 32 inside the ADF 3 and a part of the bidirectional path 39 can be exposed to conduct maintenance such as removal of jammed documents.

As shown in FIG. 2, a reversible roller 43 is disposed in the vicinity of the terminal end of the bidirectional path 39. The reversible roller 43 is rotated and driven in two directions when a driving force from the motor 67 (refer to FIG. 6) is transferred. A pinch roller 44 is provided opposite the reversible roller 43. The shaft of the pinch roller 44 is elastically urged by a spring and thereby allowing the pinch roller 44 to be in pressure-contact with the roller face of the reversible roller 43. The pinch roller 44 is rotated in accordance with the rotation of the reversible roller 43. The document is nipped by the reversible roller 43 and the pinch roller 44 for conveyance. It is noted that the sheet conveying unit and the second conveying unit which convey documents in a switchback manner are realized by, for example, the reversible roller 43 and the pinch roller 44.

Figure 3:
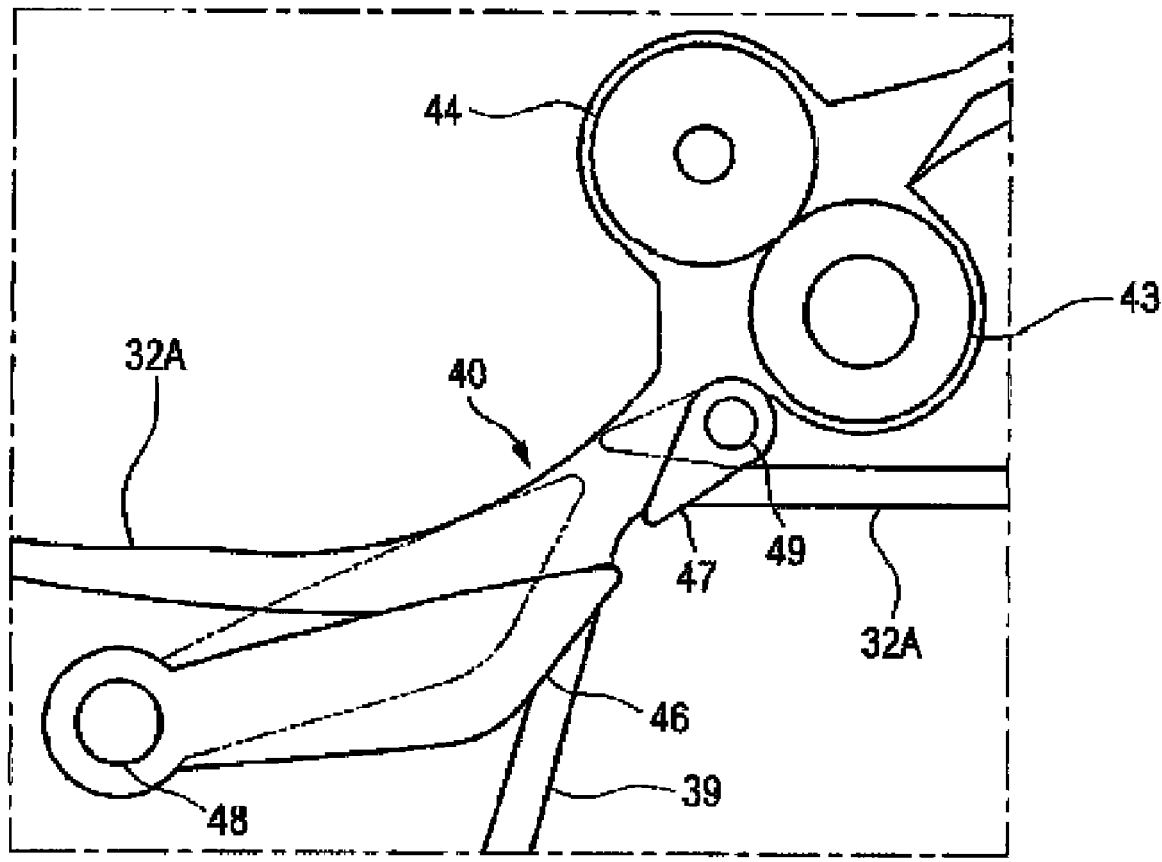
FIG. 3 is an enlarged view of a structure of the intersecting position 40.

FIG. 3 is an enlarged view showing a structure in the vicinity of the intersecting position 40. As shown in FIG. 2 and FIG. 3, a guide flap 46 and a guide flap 47 are disposed at the intersecting position 40. The guide flap 46 is disposed so as to rotationally move in a predetermined range at the center of a shaft 48 as a support point provided on a corner (the lower left side in FIG. 3) at the intersecting position 40 between the reading position side of the document conveying path 32 and the connection position 38 side of the bidirectional path 39. The guide flap 46 is a flat plate, and the leading end thereof is projected to the intersecting position 40. In FIG. 3, only one guide flap 46 is illustrated. However, a plurality of guide flaps 46 having the same configuration are provided at a predetermined interval in a width direction of the document conveying path 32, and a plurality of the guide flaps 46 are moved rotationally at the center of the shaft 48 in an integrated manner.

The guide flap 46 moves rotationally at the center of the shaft 48, thereby rotationally moving to a third position indicated by the solid line and to a fourth position indicated by the double dotted and dashed line in FIG. 3. The guide flap 46 is in contact, for example, with a guide member of the document conveying path 32 or the bidirectional path 39, thereby regulating the rotational movement from the third position to the lower side in FIG. 3 and that from the fourth position to the upper side in FIG. 3. When the guide flap 46 is located at the third position, a conveyance path continues from the sheet feed tray 30 (the right side in FIG. 3) to the reading position (the left side in FIG. 3). Further, a conveyance path from the document conveying path 32 to the connection position 38 (the lower side in FIG. 3) on the bidirectional path 39 is closed. Thereby, a document which has arrived at the intersecting position 40 from the sheet feed tray 30 on the document conveying path 32 is allowed to advance into the reading position on the document conveying path 32 and also prevented from advancing into the connection position 38 on the bidirectional path 39. Further, a document which has arrived at the intersecting position 40 from the terminal end 41(the upper side in FIG. 3) of the bidirectional path 39 is allowed to advance into the reading position on the document conveying path 32 and also prevented from advancing into the connection position 38 on the bidirectional path 39.

When the guide flap 46 is located at the fourth position, a conveyance path is connected from the connection position 38 on the bidirectional path 39 to the terminal end 41, and a conveyance path is closed from the connection position 38 on the bidirectional path 39 to the reading position on the document conveying path 32. Thereby, a document which has arrived at the intersecting position 40 from the connection position 38 on the bidirectional path 39 is allowed to advance into the terminal end 41 of the bidirectional path 39, and also prevented from advancing into the reading position on the document conveying path 32.

The guide flap 46 rotates in contact with the leading end of a document. The guide flap 46 is located at the third position indicated by the solid line in FIG. 3 by its own weight or on receipt of an urging force resulting from an elastic member such as a spring. The leading end of the document conveyed from the connection position 38 to the intersecting position 40 comes into contact with the guide flap 46, by which the guide flap 46 moves rotationally to the upper side in FIG. 3, assuming the fourth position indicated by the double dotted and dashed line in FIG. 3. The leading end of the document conveyed from the terminal end 41 of the bidirectional path 39 to the intersecting position 40 comes into contact with the guide flap 46. Since the guide flap 46 is regulated for rotationally moving from the third position to the fourth position, the document is guided by the guide flap 46. The guide flap 46 is formed into such a shape that the guide flap can be easily moved rotationally due to contact with the leading end of a document conveyed from the connection position 38 to the intersecting position 40 to come into contact therewith and the document conveyed from the terminal end 41 of the bidirectional path 39 to the intersecting position 40 can be easily guided to the reading position on the document conveying path 32.

The guide flap 47 is disposed so as to rotationally move in a predetermined range at the center of a shaft 49 provided on a corner (the upper right side in FIG. 3) at the intersecting position 40 between the sheet feed tray 30 side of the document conveying path 32 and the terminal end 41 side of the bidirectional path 39. The guide flap 47 is a wing-shaped flat plate, and the leading end thereof is projected to the intersecting position 40. In FIG. 3, only one guide flap 47 is illustrated. However, a plurality of guide flaps 47 having the same configuration are provided at a predetermined interval in a width direction of the document conveying path 32, and a plurality of the guide flaps 47 are rotationally moved in an integrated manner.

The guide flap 47 rotationally moves at the center of the shaft 49, thereby rotationally moving to a fifth position indicated by the solid line and to a sixth position indicated by the double dotted and dashed line in FIG. 3. The guide flap 47 is in contact, for example, with a guide member of the document conveying path 32 or the bidirectional path 39, thereby being regulated to rotationally move from the fifth position to the right side in FIG. 3 and to rotationally move from the sixth position to the upper side shown in FIG. 3. When the guide flap 47 is located at the fifth position, a conveyance path continues from the terminal end 41 of the bidirectional path 39 to the reading position on the document conveying path 32. Further, a conveyance path from the connection position 38 on the bidirectional path 39 to the sheet feed tray 30 on the document conveying path 32 is closed.

When the guide flap 47 is located at the sixth position, a conveyance path continues from the sheet feed tray 30 on the document conveying path 32 to the reading position, and a conveyance path from the sheet feed tray 30 on the document conveying path 32 to the terminal end 41 of the bidirectional path 39 is closed. Thereby, a document which has arrived at the intersecting position 40 from the sheet feed tray 30 on the document conveying path 32 is allowed to advance into the reading position on the document conveying path 32, and also prevented from advancing into the terminal end 41 of the bidirectional path 39.

The conveyance path is switched by the guide flap 47 when a document comes into contact therewith. The guide flap 47 is located at the fifth position indicated by the solid line in FIG. 3 by its own weight or on receipt of an urging force resulting from an elastic member such as a spring. A document conveyed from the sheet feed tray 30 on the document conveying path 32 comes into contact with the guide flap 47, by which the guide flap 47 moves rotationally to the left side in FIG. 3, and is positioned to the sixth position indicated by the double dotted and dashed line in FIG. 3. Further, even when the leading end of a document conveyed from the connection position 38 to the intersecting position 40 comes into contact with the guide flap 47, the document is guided by the guide flap 47, thus advancing into the terminal end 41 of the bidirectional path 39. The guide flap 47 is formed into such a wing-like shape that the guide flap can be easily moved rotationally due to contact with the document conveyed from the sheet feed tray 30 on the document conveying path 32 to the intersecting position 40 and the document conveyed from the connection position 38 of the bidirectional path 39 to the intersecting position 40 can be easily guided to the terminal end 41 of the bidirectional path 39.

Figure 4:
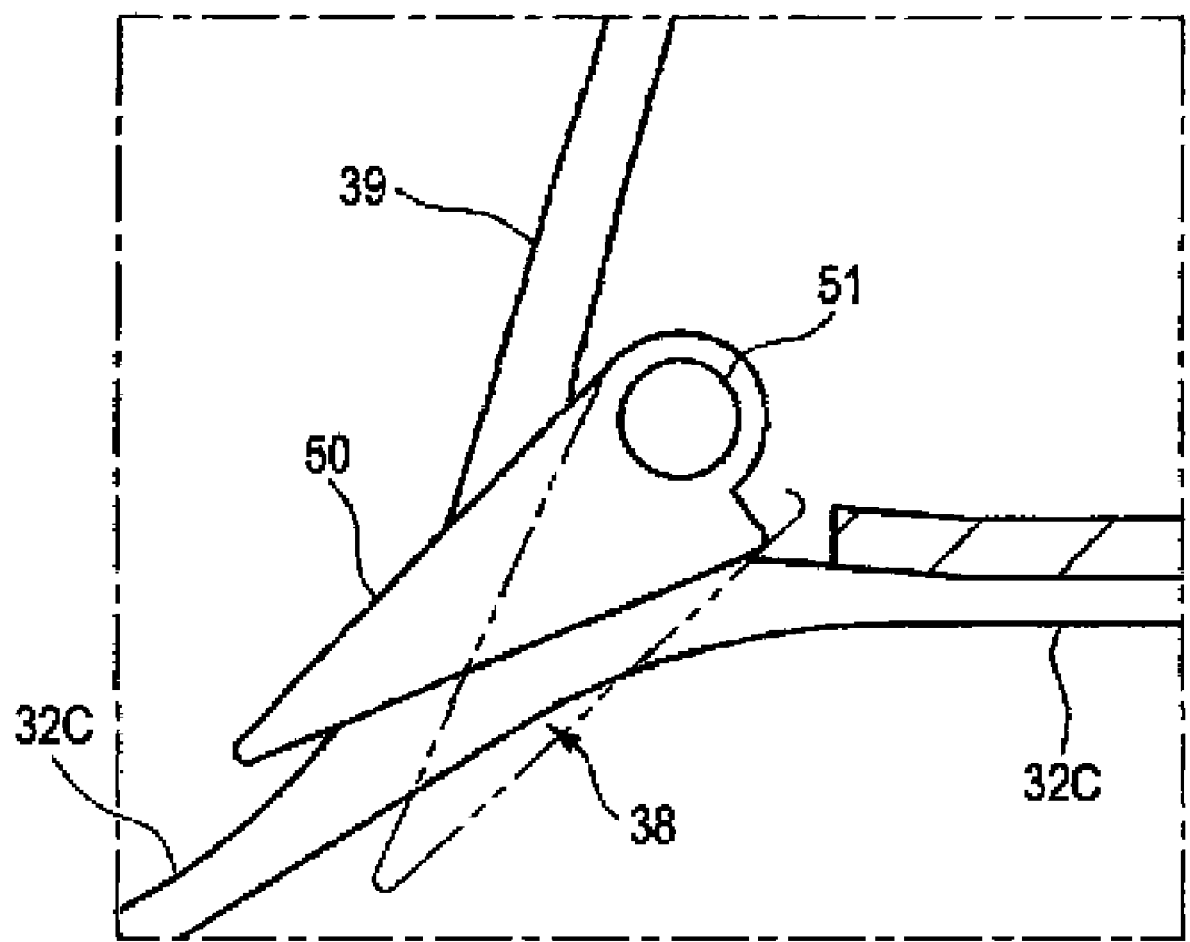
FIG. 4 is an enlarged view of a structure of the connection position 38.

FIG. 4 is an enlarged view showing a structure in the vicinity of the connection position 38. As shown in FIG. 2 and FIG. 4, a guide flap 50 (one example of the guide unit) is disposed at the connection position 38. The guide flap 50 is disposed so as to move rotationally at the center of the shaft 51. A driving force is transferred from the motor 67 (refer to FIG. 6) to the guide flap 50, thereby being moved rotationally either to the first position indicated by the solid line or to the second position indicated by the double dotted and dashed line in FIG. 4. In the guide flap 50, the conveyance path of documents is switched either to the bidirectional path 39 or to the document conveying path 32 leading to the sheet discharging tray 31. The guide flap 50 is in contact with a guide member of the document conveying path 32 or the bidirectional path 39, thereby being regulated from the first position to the upper side in FIG. 4 and to rotationally move from the second position to the lower side in FIG. 4. When the guide flap 50 is located at the first position, it is connected to the sheet discharging tray 31 (the right side in FIG. 4). When the guide flap 50 is located at the second position, it is connected to the bidirectional path 39. As described above, the guide flap 50 guides a document either to the document conveying path 32 or the bidirectional path 39 at the connection position 38. It is noted that in FIG. 4, only one guide flap 50 is illustrated, but a plurality of the guide flaps 50 having the same configuration are provided at a predetermined interval in a width direction of the document conveying path 32, and a plurality of the guide flaps 50 are moved rotationally in an integrated manner.

As shown in FIG. 2, a plurality of sensors for detecting the conveyance of documents are provided on the document conveying path 32 and on the bidirectional path 39. More specifically, a first front sensor 52 is disposed upstream in the conveying direction on the separation roller 34, and a second front sensor 53 (one example of the first detecting unit) is disposed downstream in the conveying direction on the separation roller 34 on the document conveying path 32. Further, a first sheet sensor 54 (one example of the second detecting unit) is disposed upstream of the reading position in the conveying direction. A second sheet sensor 55 (one example of the third detecting unit) is disposed between the connection position 38 on the bidirectional path 39 and the intersecting position 40. These sensors are so called optical sensors and similar in structure except that the shape of the sensor actuator differs depending on difference in a position to be detected. Therefore, in the present illustrative aspect, a detailed description will be made for the structure with reference to the first front sensor 52, as an example.

Figure 5:
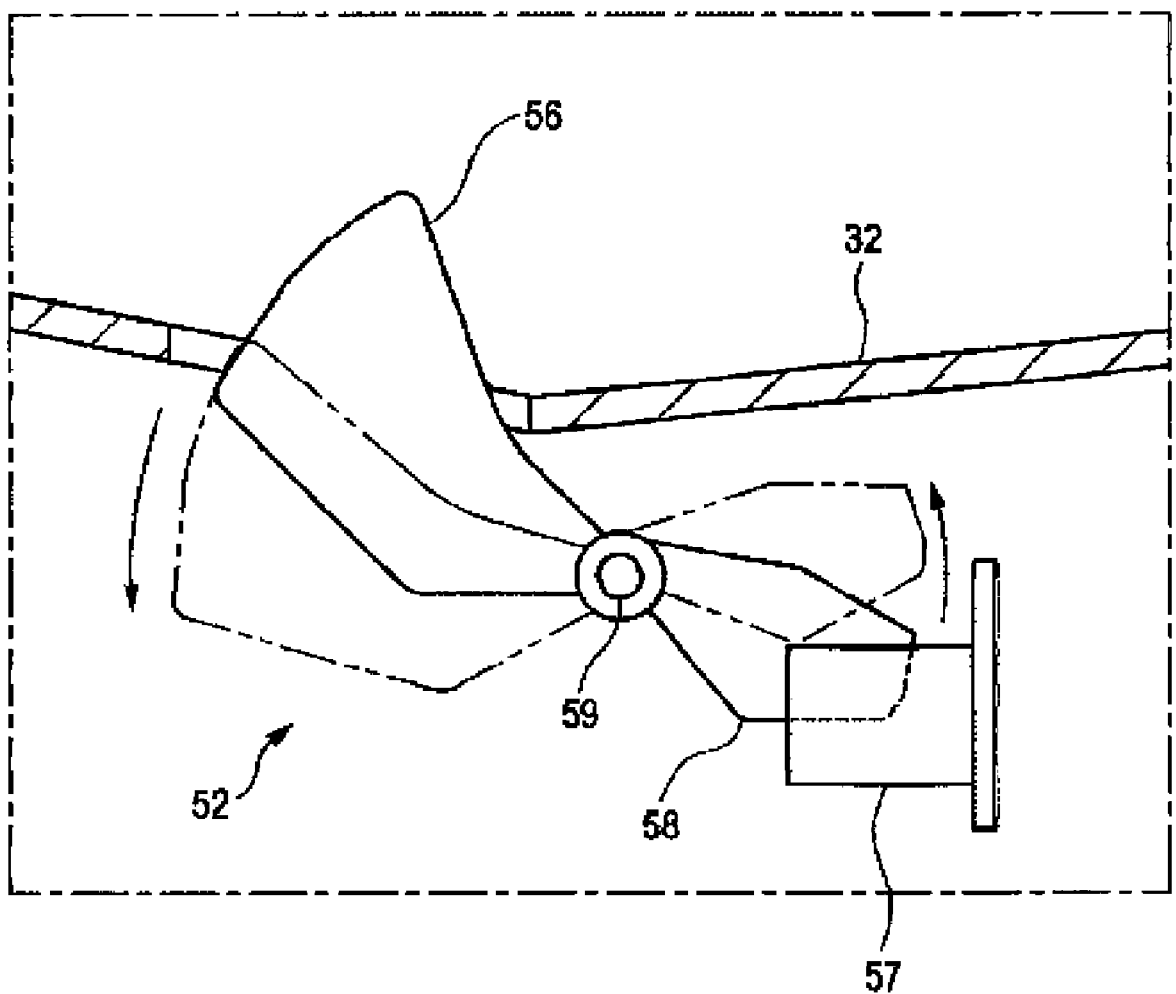
FIG. 5 is an enlarged view of a structure of the first front sensor 52.

FIG. 5 is an enlarged view showing a structure of the first front sensor 52. As shown in the drawing, the first front sensor 52 is projected from the lower face of the document conveying path 32 and includes: a sensor actuator 56 rotationally moving so as to retract from the document conveying path 32 due to contact with a document; and a photo interrupter 57 which detects the rotational movement of the sensor actuator 56. A light blocking portion 58 detected by the photo interrupter 57 is formed integrally at the sensor actuator 56, and provided so as to freely move rotationally at the center of the shaft 59. The sensor actuator 56 is elastically urged by an urging member such as a spring (not illustrated) at a position where the sensor actuator 56 is projected to the document conveying path 32, in other words, in a clockwise direction in FIG. 5. In a state where no external force is given to the sensor actuator 56, as shown by the solid line in FIG. 5, the sensor actuator 56 is projected to the document conveying path 32, and the light blocking portion 58 is located between a light emitting portion and a light receiving portion of the photo interrupter 57. Thereby, light transferred by the photo interrupter 57 is blocked to turn the first front sensor 52 off.

When a document is placed on the sheet feed tray 30, the document is in contact with the sensor actuator 56, thereby allowing the sensor actuator 56 to move rotationally in a direction retracting from the document conveying path 32. A light blocking portion 58 is also allowed to move rotationally together with the sensor actuator 56, and as shown by the double dotted and dashed line in FIG. 5, the light blocking portion 58 moves away from a point between the light emitting portion and the light receiving portion of the photo interrupter 57. Thereby, light transferred by the photo interrupter 57 is not blocked to turn the first front sensor 52 on. The first front sensor 52 is turned on and off, by which a judgment is made for whether a document is placed on the sheet feed tray 30.

The second front sensor 53 is arranged between the separation roller 34 and the intersecting position 40. The second front sensor 53 is turned on and off, thereby detecting the presence or absence of a document. On the basis of either an on or an off detection signal sent from the second front sensor 53, it is possible to detect the presence or absence of the document by the second front sensor 53. Further, the second front sensor 53 is to detect a position of conveying a document, more specifically, a position of conveying the leading end and the trailing end of the document. For example, the number of rotations of the conveying rollers 35A, 35B, 35C and 35D after detection of the leading end or the trailing end of the document by the second front sensor 53 is monitored by referring to the number of steps of the motor 67 (refer to FIG. 6) and output values of an encoder, thus making it possible to judge a position of the leading end or the trailing end of the document on the document conveying path.

The first sheet sensor 54 disposed upstream of the reading position in the conveying direction is turned on and off, thereby detecting the leading end or the trailing end of a document conveyed on the document conveying path 32. The number of rotations of the conveying rollers 35A, 35B, 35C and 35D after detection of the leading end or the trailing end of the document by the first sheet sensor 54 is monitored by referring to the number of steps of the motor 67 (refer to FIG. 6) and output values of an encoder, thereby judging whether the leading end or the trailing end of the document has arrived at the reading position. The image reading unit 22 is controlled on the basis of a signal from the first sheet sensor 54. In other words, when the leading end of the document has arrived at the reading position, the image reading unit 22 starts to read an image, and when the trailing end of the document has arrived at the reading position, it completes the image reading.

In the document conveying path 32, a distance from the separation roller 34 to a predetermined switching position 45 (corresponding to a predetermined second position, refer to FIG. 24) upstream of the conveying roller 35C in the conveying direction is established to be shorter than a minimum length of a conveyable document by the ADF 3 of the image reading apparatus 1. More specifically, as described later, a distance from the leading end of a document when the document is temporarily halted upstream of the conveying roller 35C to a nip point between the separation roller 34 and the guide plate 19 is established to be shorter than a minimum length of a conveyable document. Therefore, at a time when the leading end of the document has arrived at the vicinity upstream of the conveying roller 35C in the conveying direction, the trailing end of the document is nipped by the separation roller 34.

The second sheet sensor 55 disposed between the connection position 38 on the bidirectional path 39 and the intersecting position 40 is turned of and off, thereby detecting the leading end or the trailing end of a document conveyed on the bidirectional path 39. For example, the number of rotations of the conveying rollers 35A, 35B, 35C and 35D and that of the reversible roller 43 after detection of the trailing end of the document by the second sheet sensor 55 are monitored by referring to the number of steps of the motor 67 (refer to FIG. 6) and output values of an encoder, thereby judging whether the trailing end of the document has passed through the intersecting position 40.

Figure 6:
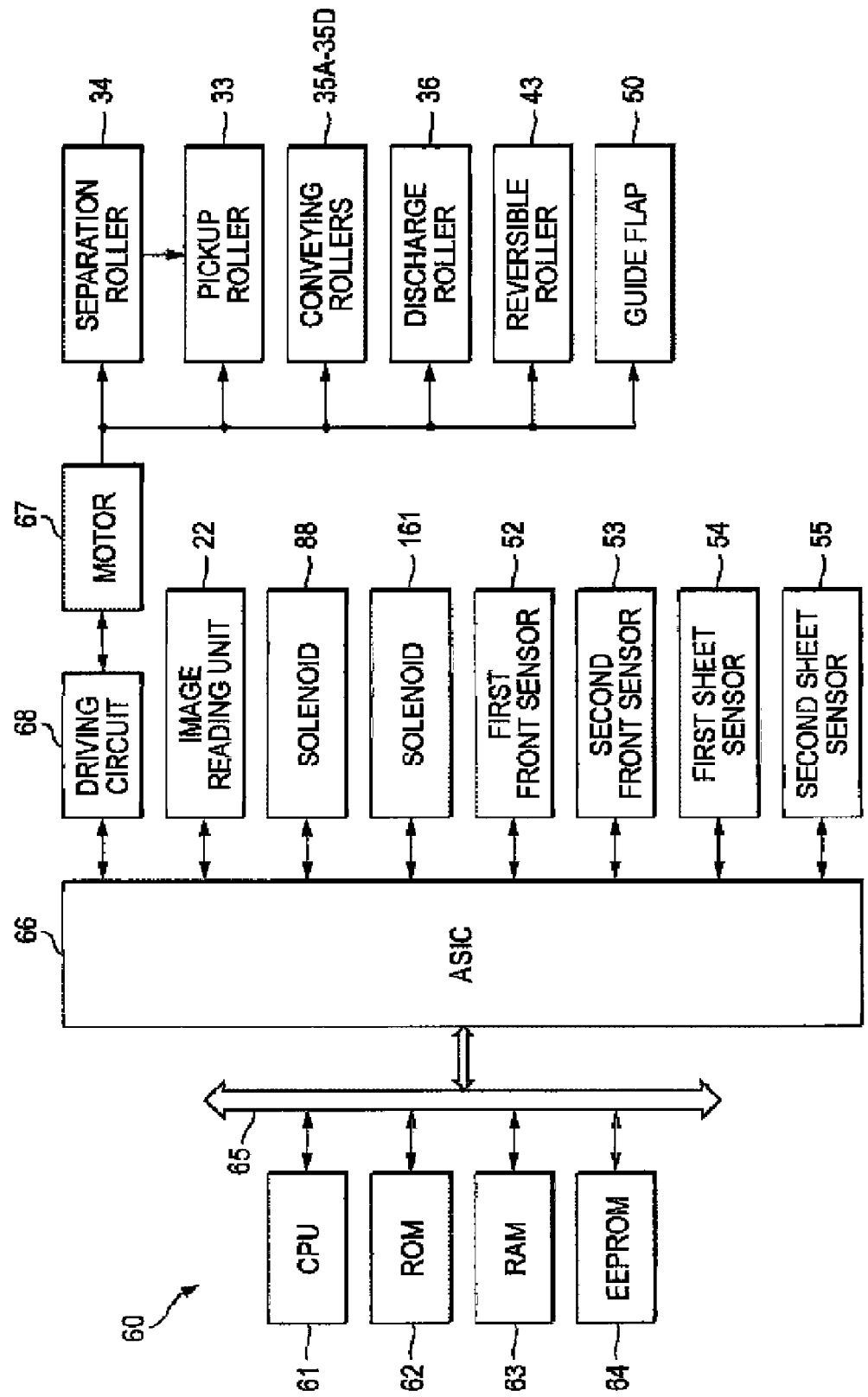
FIG. 6 is a block diagram of a structure of the controller 60.

FIG. 6 is a drawing showing a structure of the controller 60 of the image reading apparatus 1. The controller 60 is to control comprehensively an entire operation of the image reading apparatus 1. As shown in the drawing, the controller 60 is configured as a micro computer mainly with a central processing unit 61 (CPU), a read only memory 62 (ROM), a random access memory 63 (RAM), an electrically erasable and programmable ROM 64 (EEPROM), and connected via a bus 65 to an application specific integrated circuit 66 (ASIC).

The ROM 62 stores programs and others for controlling various operations of the image reading apparatus 1 and the ADF 3. The RAM 63 is used as a storage area or a work area which temporarily stores various data used for execution of the above programs by the CPU 61 and as a storage area of correction information, conveyance mode information, reading state information and rotational direction information to be described later. The ROM 62 and RAM 62 are supplied with electricity from a backup power source and able to retain information stored in the RAM 63, even if the apparatus is turned off. The EEPROM 64 is a storage area which stores various settings and flags to be stored after the power source is turned off. The control unit is realized by, for example, the CPU 61, the ROM 62, the RAM 63 and the EEPROM 64.

The ASIC 66 generates a phase excitation signal and the like to energize the motor 67 according to instructions from the CPU 61, provide the signal to a driving circuit 68 of the motor 67, thereby performing the rotation and control by providing a driving signal from the driving circuit 68 to the motor 67. The motor 67 rotates and drives either in a positive rotational direction or in a reverse rotational direction (positive and reverse two-way directions), thereby providing a driving force to the pickup roller 33, the separation roller 34, the conveying rollers 35A, 35B, 35C and 35D, the discharge roller 36, the reversible roller 43 and the guide flap 50. The motor 67 is a single driving source of the ADF 3. The motor 67 includes any structure or any driving mode, as long as it is able to rotate and drive in two way directions, that is, a positive rotation (CW rotation) or a reverse rotation (CCW rotation). In the present illustrative aspect, the motor is explained as a stepping motor which is driven and controlled by a pulse driving mode. The history of instructions such as halt instructions to the motor 67, positive rotation (CW rotation) instructions and reverse rotation (CCW rotation) instructions are stored in the RAM 63.

The driving circuit 68 generates a pulse signal for rotating the motor 67 on receipt of an output signal from the ASIC 66. The pulse signal is generated on the basis of a periodic signal generated at the ASIC 66. The pulse signal generated at the driving circuit 68 is output to the motor 67. On inputting the pulse signal, the motor 67 rotates in a predetermined rotational direction, thereby transferring a rotational force of the motor 67 via individual gear systems 70, 110, 120, 150 and 170 to be described later to the pickup roller 33, the separation roller 34, the conveying rollers 35A, 35B, 35C and 35D, the discharge roller 36, the reversible roller 43 and the guide flap 50.

A periodic signal generated at the ASIC 66 is fed back via the bus 65 to the CPU 61. On the basis of the thus fed back periodic signal, the CPU 61 counts the number of pulses of pulse signals generated at the driving circuit 68. It is noted that the thus counted pulse signals are temporarily stored in the RAM 63 as the number of steps of the motor 67.

An image reading unit 22 is connected to the ASIC 66. The image reading unit 22 reads images on a document on the basis of control programs accommodated in the ROM 62. It is noted that although not illustrated in FIG. 6, a driving mechanism for reciprocating the image reading unit 22 is also activated on receipt of an output signal from the ASIC 66.

The ASIC 66 is connected with the first front sensor 52, second front sensor 53, first sheet sensor 54 and second sheet sensor 55. In response to on and off of these sensors, the CPU 61 allows the ASIC 66 to output a predetermined output signal on the basis of control programs accommodated in the ROM 62. Further, the history of on and off of these sensors is stored in the RAM 63. Of the history of on and off of these individual sensors, the history of on and off of the first sheet sensor 54 and the second sheet sensor 55 is used as reading state information.

The ASIC 66 is connected with a solenoid 88 and a solenoid 161. The CPU 61 allows the ASIC 66 to output an output signal at a predetermined timing on the basis of control programs accommodated in the ROM 62, thereby activating the solenoid 88 and the solenoid 161.

Hereinafter, a description will be given for a driving-force transfer mechanism from the motor 67 to the pickup roller 33, the separation roller 34, the conveying rollers 35A, 35B, 35C and 35D, the discharge roller 36, the reversible roller 43 and the guide flap 50. Each shaft of the separation roller 34, the conveying rollers 35A, 35B, 35C and 35D, the discharge roller 36, the reversible roller 43 and the guide flap 50 is extended in a width direction of the document conveying path 32. The separation roller 34, the conveying rollers 35A, 35B, 35C and 35D, the discharge roller 36, the reversible roller 43 and the guide flap 50 are provided at a predetermined position of each shaft according to a width of the document conveying path 32. As a matter of course, although individual rollers and the like are provided substantially all over the area in an axial direction of each shaft, a plurality of rollers may be coaxially arranged at a predetermined interval in a width direction of the document conveying path 32.

As shown in FIG. 1, in the ADF 3 provided on the upper face of the document cover 4, the document conveying path 32 and individual rollers are accommodated in a casing. The motor 67 and the driving force transfer mechanism, which impart a driving force to individual rollers, are also accommodated in the casing of the ADF 3. A driven gear is provided at one end of each shaft of the separation roller 34, the conveying rollers 35A, 35B, 35C and 35D, the discharge roller 36, the reversible roller 43 and the guide flap 50. A driving force is transferred from the motor 67 via each of the driving force transfer mechanisms to individual driven gears, thereby driving individual rollers and others. In the present illustrative aspect, the driven gear is provided at one end of each shaft of the motor 67, each of the driving force transfer mechanisms, the solenoid 88, the solenoid 161, the separation roller 34, the conveying rollers 35A, 35B, 35C and 35D, the discharge roller 36, the reversible roller 43 and the guide flap 50. Each driven gear is accommodated in a gear box 7 provided at the back of the casing of the ADF 3. It is noted that each gear shown below is a spur gear at which teeth are formed on an outer periphery parallel with the axial line, unless otherwise specified.

FIG. 7 through FIG. 11 illustrate a first gear system 70 from the motor 67 to the separation roller 34. The first gear system 70 (one example of the second transfer mechanism) is to rotate the separation roller 34 in a feeding direction upon a clockwise (CW) rotation of the motor 67 and to block the transfer of a driving force to the separation roller 34 upon switching from a CW rotation to a counter clockwise (CCW) rotation. The CW rotation and the CCW rotation are a reciprocal rotational direction of the motor 67, respectively corresponding to the positive rotation and the reverse rotation. It is noted that the transfer unit is realized by, for example, the above-described first gear system 70 as well as the second gear system 120, the third gear system 150 and the fifth gear system 151 to be described later.

Figure 7:
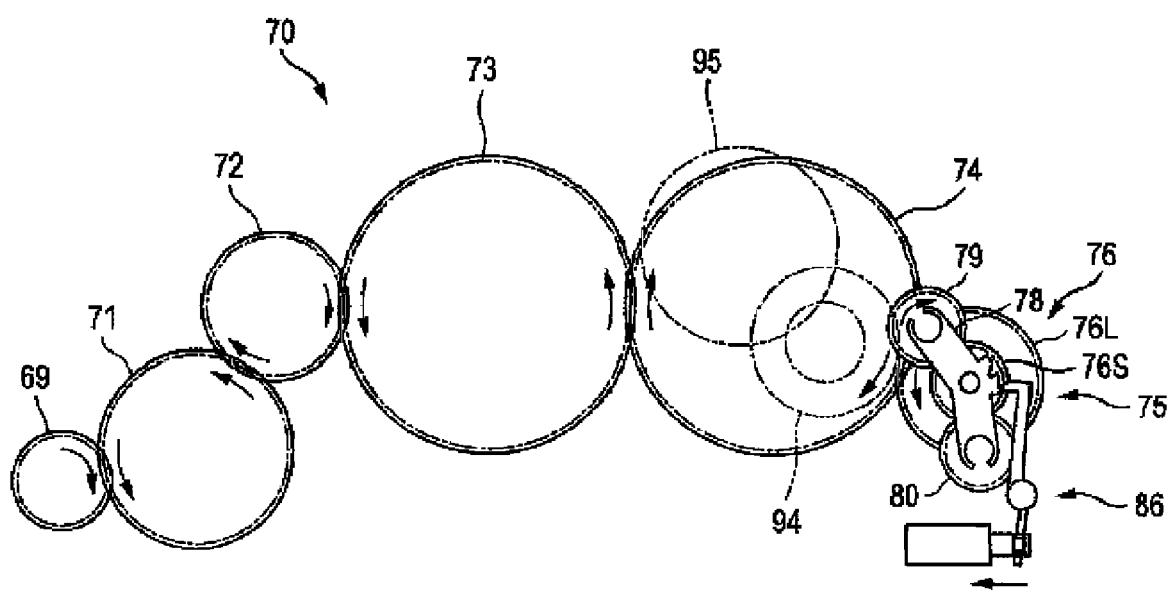
FIG. 7 is a figure of a structure of the first gear system 70.

As shown in FIG. 7, four transfer gears 71, 72 and 73 and 74 are sequentially meshed with a driving gear 69 provided on the driving shaft of the motor 67, and a driving force is transferred to a planet gear device 75. It is noted that there is no particular restriction on the four transfer gears 71, 72, 73 and 74 and they may be provided whenever necessary, depending on a distance from the driving gear 69 to the planet gear device 75. The transfer gear may be changed in number and diameter. In response to the CW rotation or CCW rotation of the motor 67 the transfer gears 71, 72 and 73 sequentially meshed are rotated in a predetermined direction, and a driving force is transferred so that the transfer gear 74 is rotated in a CCW rotation or in a CW rotation.

Figure 9:
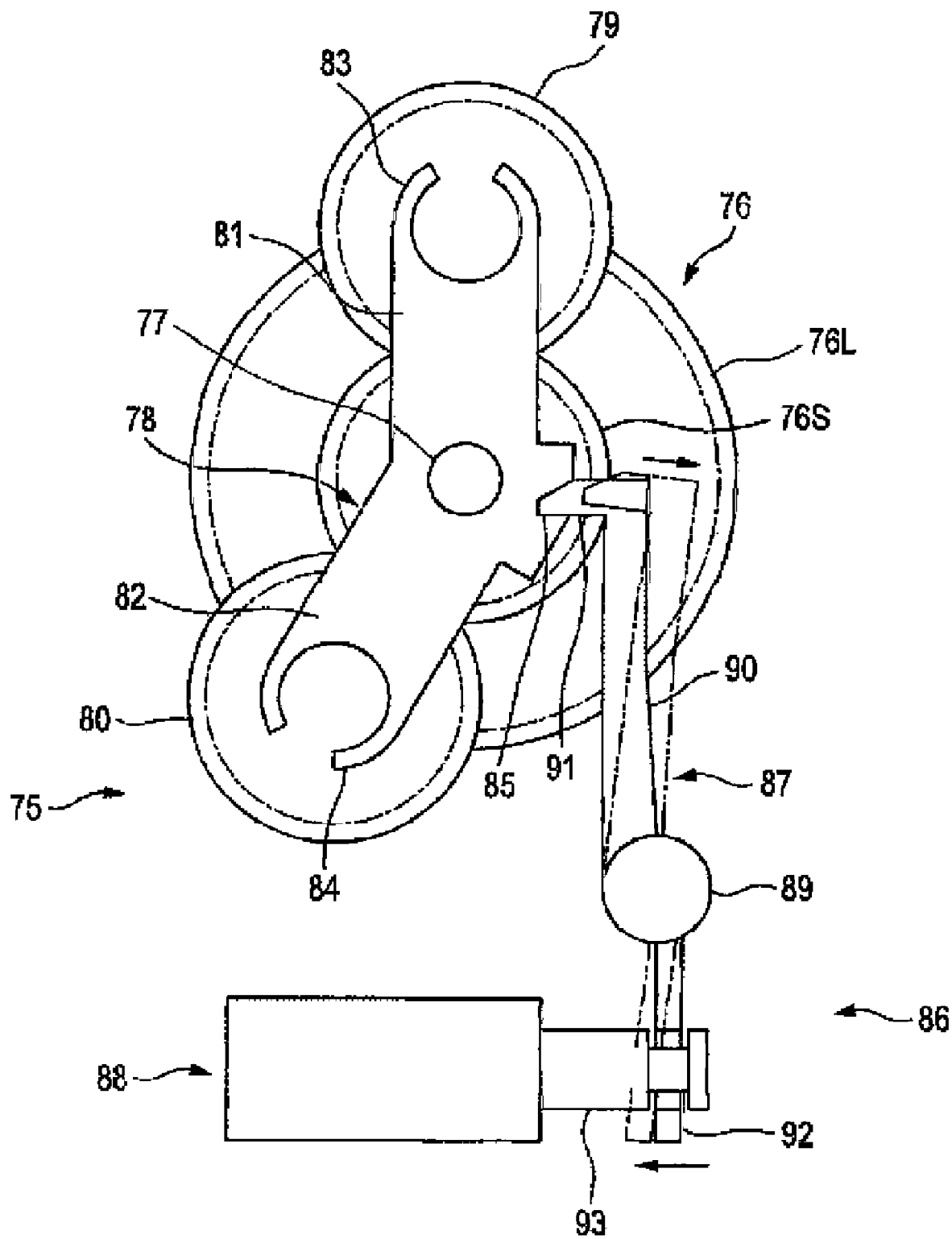
FIG. 9 is a figure of structure of the planet gear device 75 and the locking mechanism 86.

FIG. 9 shows a structure of the planet gear device 75. In the planet gear device 75, a supporting arm 78 is provided so as to rotate freely and coaxially with the shaft 77 of a sun gear 76, and two planet gears 79 and 80 respectively meshing with the sun gear 76 are pivotally supported on the supporting arm 78. It is noted that in the present illustrative aspect, the planet gear device 75 is provided with two planet gears 79 and 80 but there is no particular restriction on the number of planet gears. The planet gear device may be provided with only one planet gear, for example.

The sun gear 76 is a two-stage gear which is coaxially and integrally made up of a large diameter gear 76L and a small diameter gear 76S. The supporting arm 78 is such that at which arm portions 81 and 82 are extended from the shaft 77 in a direction of two diameters, thereby pivotally supporting the respective planet gears 79 and 80 by bearing portions 83 and 84 formed at the leading end of each of the arm portions 81 and 82. The planet gears 79 and 80 pivotally supported on the supporting arm 78 are respectively meshed with a gear 76S of the sun gear 76. Upon rotation of the sun gear 76, the planet gears 79 and 80 respectively meshed with the gear 76S are rotated. Further, in response to the rotation of the sun gear 76, the supporting arm 78 is also rotated in the same direction. In other words, when the sun gear 76 is rotated, the planet gears 79 and 80 revolve around the sun gear 76, while respectively rotating on their axes.

A locking recess 85 is formed in the vicinity of the shaft 77 of the supporting arm 78. The first gear system 70 is provided with a locking mechanism 86. A locking recess 85 is locked by the locking mechanism 86, thereby the supporting arm 78 is stopped at a predetermined position irrespective of the rotation of the sun gear 76. A position at which the supporting arm 78 is locked by the locking mechanism 86 is a detachment position to be described later.

The locking mechanism 86 includes a locking member 87 and a solenoid 88. The locking member 87 includes an arm portion 90, a pawl 91 and a passive portion 92. The arm portion 90 is extended radially from the shaft 89 to the supporting arm 78. The pawl 91 is formed in a claw shape at the leading end of the arm portion 90. The passive portion 92 is extended radially from the shaft 89. The pawl 91 can be engaged with a recess 85 of the supporting arm 78. The pawl 91 can be detached from the recess 85 by allowing the arm portion 90 to move rotationally at the center of the shaft 89. The passive portion 92 is connected to the shaft 93 of the solenoid 88. The solenoid 88 is to allow the shaft 93 to be retracted into the main body, when electricity is turned on to activate an electromagnetic force, and is to urge the shaft 93 to a direction which allows the shaft 93 to project from the main body when electricity is turned off to eliminate the electromagnetic force. The shaft 93 is driven, a driving force of which is transferred to the passive portion 92, thereby the locking member 87 is moved rotationally at the center of the shaft 89 to assume a predetermined posture. As indicated by the solid line in FIG. 9, the pawl 91 is engaged with the recess 85 of the supporting arm 78 in a state where the solenoid 88 is off. As indicated by the double dotted and dashed line in FIG. 9, the pawl 91 is detached from the recess 85 in a state where the solenoid 88 is on.

As shown in FIG. 7, the transfer gear 74 is meshed with the gear 76L of the sun gear 76 in the planet gear device 75. A driving force is transferred from the motor 67 to the transfer gear 74, and the sun gear 76 is rotated in a predetermined direction. For example, as shown in FIG. 7, when the driving gear 69 rotates in a CW rotation, the transfer gear 74 is rotated in a CW rotation, and the sun gear 76 is rotated in a CCW rotation. When the solenoid 88 is on, the supporting arm 78 is able to rotate freely, thereby the planet gears 79 and 80 revolve in a CCW rotation around the sun gear 76. It is noted that the solenoid 88 may be turned on only when the pawl 91 is detached from the locking recess 85, and the pawl 91 will not be engaged with the locking recess 85 when the solenoid 88 is turned-off after the supporting arm 78 rotates from the detachment position.

Figure 8:
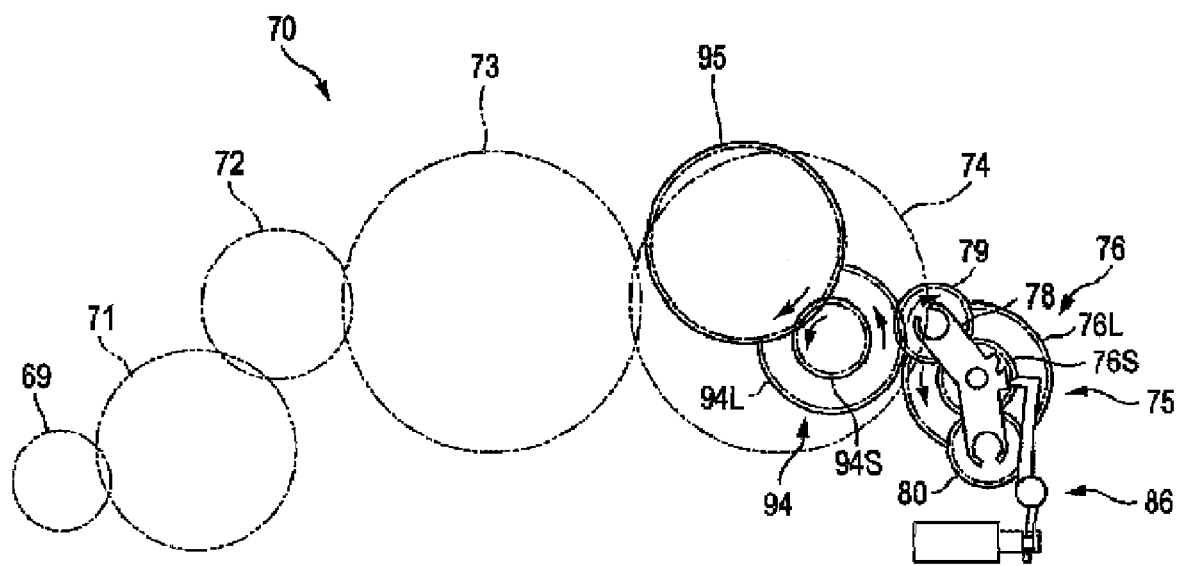
FIG. 8 is a figure of a structure of the first gear system 70.

As shown in FIG. 8, a transfer gear 94 is arranged in a position adjacent to the planet gear device 75. The transfer gear 94 can be meshed with/detached from planet gears 79 and 80 of the planet gear device 75. As shown in FIG. 8, the planet gears 79 and 80 revolve in a CCW rotation around the sun gear 76, by which the planet gear 79 is meshed with the transfer gear 94, and the planet gear 80 is detached from the transfer gear 94. The transfer gear 94 is a two-stage gear which is coaxially and integrally made up of a large diameter gear 94L and a small diameter gear 94S. The planet gears 79 and 80 can be meshed with/detached from the large diameter gear 94L. The small diameter gear 94S is meshed with a driven gear 95 provided on the shaft 111 (refer to FIG. 12) which pivotally supports the separation roller 34. It is noted that there is no particular restriction on a gear structure from the transfer gear 94 to the driven gear 95, and the transfer gear may be changed in number and diameter, whenever necessary, depending on a distance from the transfer gear 94 to the driven gear 95.

The planet gear 79, which revolves in a CCW rotation around the sun gear 76, is meshed with the transfer gear 94, by which the revolution of the planet gear 79 is stopped. Then, the planet gear 79 receives a driving force transferred from the sun gear 76, thereby rotating on its axis in a CW rotation. Thus, the transfer gear 94 is rotated in a CCW rotation, and the driven gear 95 is rotated in a CW rotation. The driven gear 95 is rotated in a CW rotation, by which a shaft 111 pivotally supporting the separation roller 34 is rotated in a conveying direction.

Figure 10:
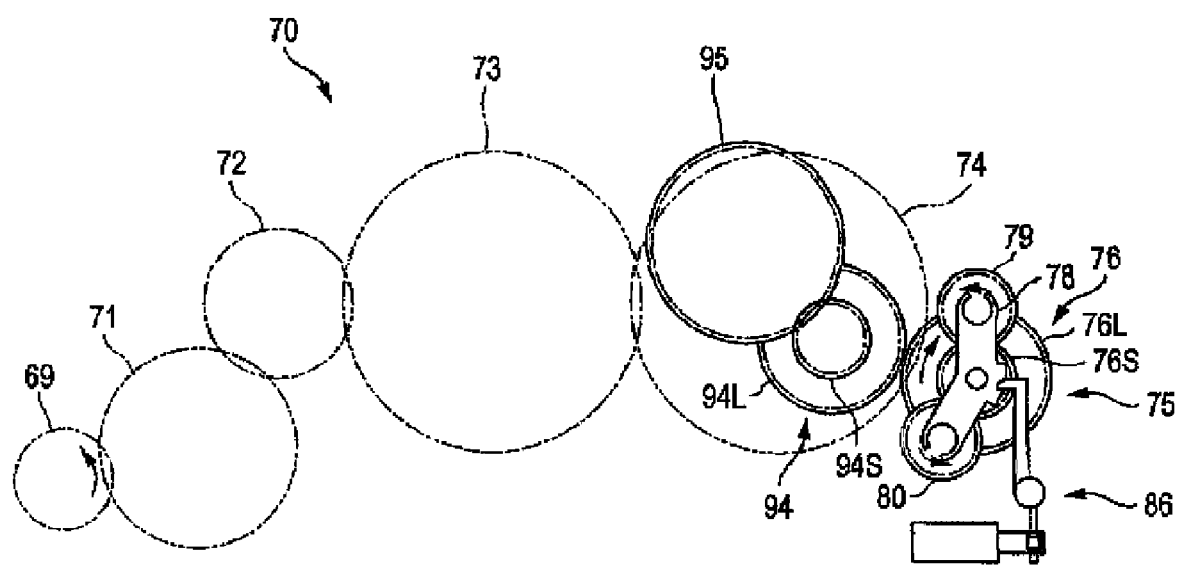
FIG. 10 is a figure of a structure of the first gear system 70.

As shown in FIG. 10, when the driving gear 69 is switched from a CW rotation to a CCW rotation, the transfer gear 74 is rotated in a CCW rotation, and the sun gear 76 is rotated in a CW rotation. As shown in FIG. 8, in a state where the planet gear 79 is meshed with the transfer gear 94, even when the solenoid 88 is off, the pawl 91 will not be engaged with the locking recess 85. Therefore, since the supporting arm 78 rotates freely, the planet gears 79 and 80 revolve in a CW rotation around the sun gear 76. In association with revolution of the planet gears 79 and 80 around the sun gear 76, the supporting arm 78 is rotated, by which a locking recess 85 of the supporting arm 85 is at a position which can be engaged with the pawl 91. In this instance, when the solenoid 88 is off, as shown in FIG. 10, the pawl 91 is engaged with the locking recess 85, thereby regulating the rotation of the supporting arm 78. In this state, neither of the planet gears 79 and 80 is meshed with the transfer gear 94. A position of the supporting arm 78 at which both of the planet gears 79 and 80 are detached from the transfer gear 94 is called a detachment position in the Specification. The pawl 91 is engaged with the locking recess 85, by which the supporting arm 78 is locked so as not to be rotated. The supporting arm 78 is retained at the detachment position until the solenoid 88 is subsequently turned on.

Figure 11:
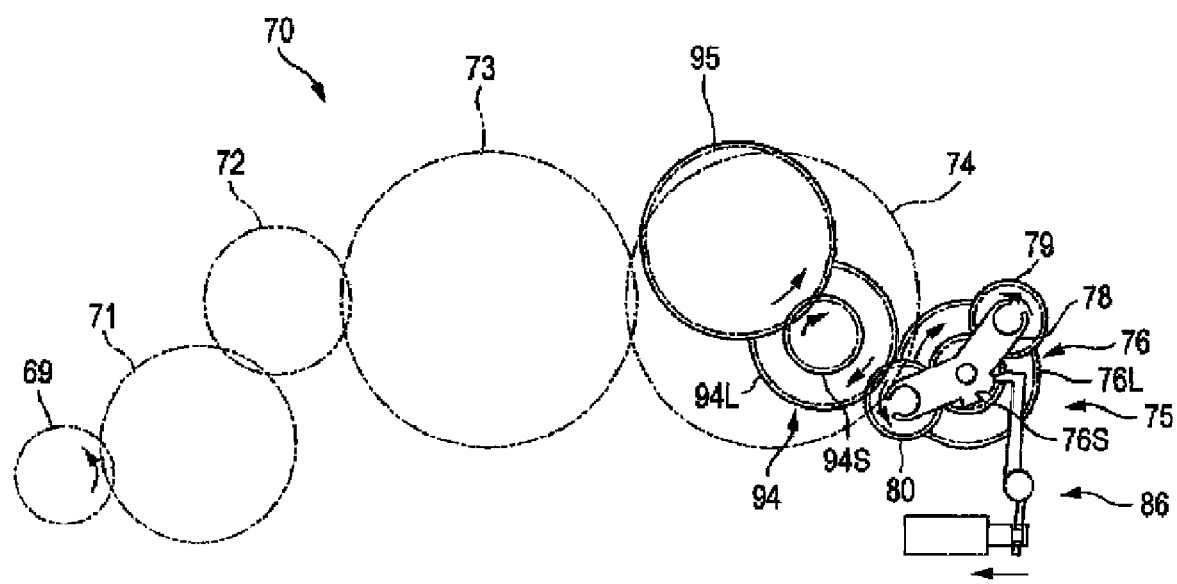
FIG. 11 is a figure of a structure of the first gear system 70.

As shown in FIG. 11, when the solenoid 88 is turned on, the planet gears 79 and 80 revolve in a CW rotation on the basis of the CW rotation of the sun gear 76. The planet gear 80, which revolves in a CW rotation, is meshed with the transfer gear 94, by which the revolution of the planet gear 80 around the sun gear 76 is stopped. Then, the planet gear 80 receives a driving force transferred from the sun gear 76, thereby rotating on its own axis in a CCW rotation. Thus, the transfer gear 94 rotates in a CW rotation, and the driven gear 95 is rotated in a CCW rotation. The driven gear 95 is rotated in a CCW rotation, by which the shaft 111 pivotally supporting the separation roller 34 is rotated in a direction opposite to the conveying direction.

Hereinafter, a description will be given for a second gear system 110 from the shaft 111 pivotally supporting a separation roller 34 to a pickup roller 33. As shown in FIG. 2, the pickup roller 33 is pivotally supported at the leading end of an arm 29 and arranged apart at the side opposite to the separation roller 34. As described above, a driving force of the motor 67 is transferred to the shaft 111 and the driving force is transferred from the shaft 111 to the arm 29, the pickup roller 33 and the separation roller 34.

Figure 12:
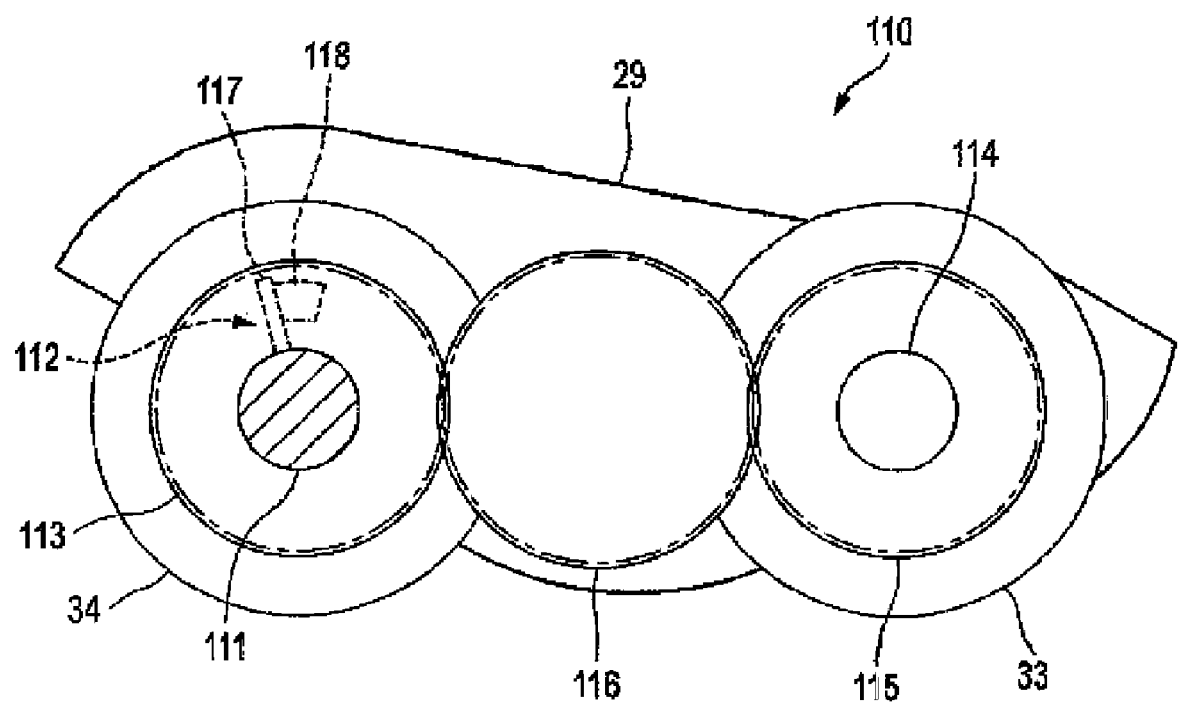
FIG. 12 is a figure of a structure of the second gear system 110.

FIG. 12 shows the second gear system 110 from the shaft 111 to the pickup roller 33. The second gear system 110 includes a one-cycle clutch 112 provided on the shaft 111, a gear 113 formed integrally with the separation roller 34, a gear 115 fixed to the shaft 114 of the pickup roller 33 and a transfer gear 116 which transfers a driving force from the gear 113 to the gear 115. The separation roller 34 is pivotally supported so as to rotate freely on the shaft 111. It is noted that the one-cycle clutch 112 and the gear 113 are respectively provided axially on both sides of the separation roller 34. The one-cycle clutch 112 is provided at the back side as shown in FIG. 12 and the gear 113 is provided in the front side as shown in FIG. 12 which shows the separation roller 34. Therefore, the one-cycle clutch 112 behind the separation roller 34 is indicated by the dashed line.

The one-cycle clutch 112 includes a pin 117 projected from the shaft 111 and a projected piece 118 projected laterally from the separation roller 34. The pin 117 is projected radially to the shaft 111 at the side of the separation roller 34 and moved rotationally in association with the rotation of the shaft 111. The projected piece 118 is projected axially from the side face of the separation roller 34. A position of the projected piece 118 in a radial direction of the separation roller 34 is within a range of the projected length of the pin 117, and the pin 117 can be engaged with the projected piece 118. As shown in FIG. 12, the pin 117 is engaged with the projected piece 118, by which the rotation of the shaft 111 is transferred to the separation roller 34 via the pin 117 and the projected piece 118, and the separation roller 34 is rotated integrally with the shaft 111.

Since the separation roller 34 moves freely toward the shaft 111, the separation roller 34 is able to move in such a direction that the projected piece 118 moves away from the pin 117. Then, when the separation roller 34 turns around approximately at one cycle with respect to the shaft 111, the projected piece 118 is again in contact with the pin 117. Thereby, the separation roller 34 is able to turn around approximately only at one cycle without load, irrespective of the transfer of a driving force from the shaft 111.

A transfer gear 116 is provided between the gear 113 provided on the separation roller 34 and the gear 115 fixed to the shaft 114 of the pickup roller 33. The transfer gear 116 is meshed with the gear 113 and the gear 115. Since the gear 113 is formed integrally with the separation roller 34, it is rotated in association with the rotation of the separation roller 34. In response to the rotation of the gear 113, the transfer gear 116 is rotated, and in response to the rotation of the transfer gear 116, the gear 115 is rotated. Since the gear 115 is fixed to the shaft 114 of the pickup roller 33, a rotational force is transferred to the pickup roller 33 in association with the rotation of the gear 115. In other words, the separation roller 34 and the pickup roller 33 are always rotated in the same direction. The thus constituted second gear system 110 is able to transfer a driving force from the shaft 111, which pivotally supports the separation roller 34 so as to rotate freely, to the separation roller 34 and the pickup roller 33.

As shown in FIG. 12, the arm 29 is pivotally supported to the shaft 111 so that the base end thereof can rotate freely and moves vertically when a driving force is transferred from the shaft 111. A cylindrical body (not illustrated) is attached to the shaft 111, and a slide clutch is provided between the cylindrical body and the base end of the arm 29. The rotation of the shaft 111 is transferred to the arm 29 by the cylindrical body and the slide clutch. The slide clutch is to slide between the cylindrical body and the base end of the arm 29 upon receipt of a load exceeding a predetermined torque, thereby cutting off the transfer of a driving force. The shaft 111 is rotated in a CW rotation, by which a rotational force in the same direction is transferred via the cylindrical body and the slide clutch to an arm 29, and the arm 29 is lowered. On the other hand, when the shaft 111 is rotated in a CCW rotation, the arm 29 is elevated. As shown in FIG. 2, when the arm 29 is lowered, the pickup roller 33 is in contact with the guide face of the document conveying path 32 or a document on the sheet feed tray 30. When the shaft 111 is further rotated in this state, a clutch slides with respect to the cylindrical body and halts in a state where the arm 29 is lowered. As described above, a driving force is transferred from the shaft 111 via the cylindrical body and slide clutch to the arm 29, and the arm 29 is swayed so that the pickup roller 33 is lowered or elevated with respect to the guide face of the document conveying path 32. It is noted that a mechanism which moves the arm 29 vertically depending on the presence or absence of the transferred driving force is not always needed and may be omitted.

Figure 13:
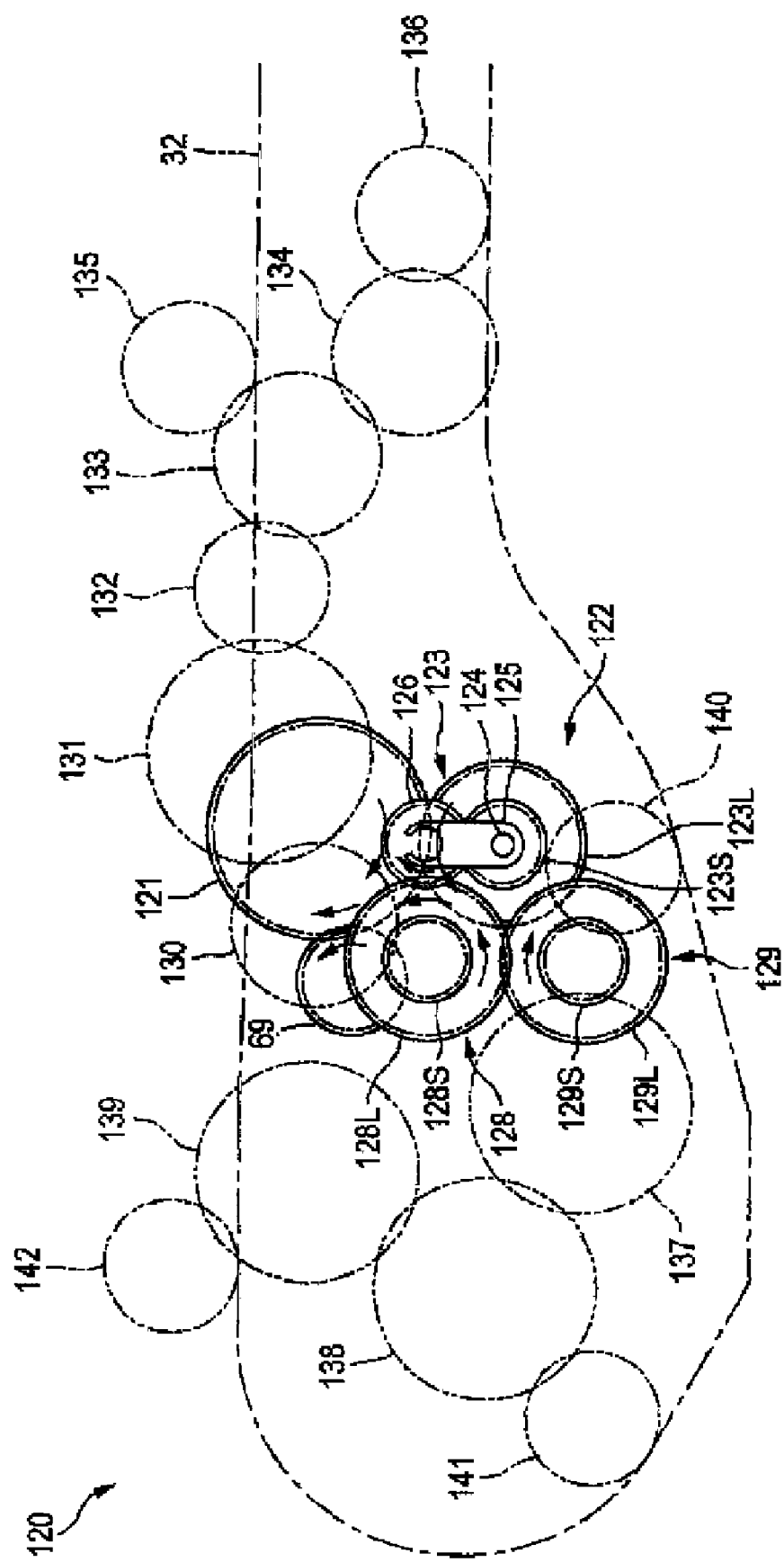
FIG. 13 is a figure of a structure of the third gear system 120.
Figure 14:
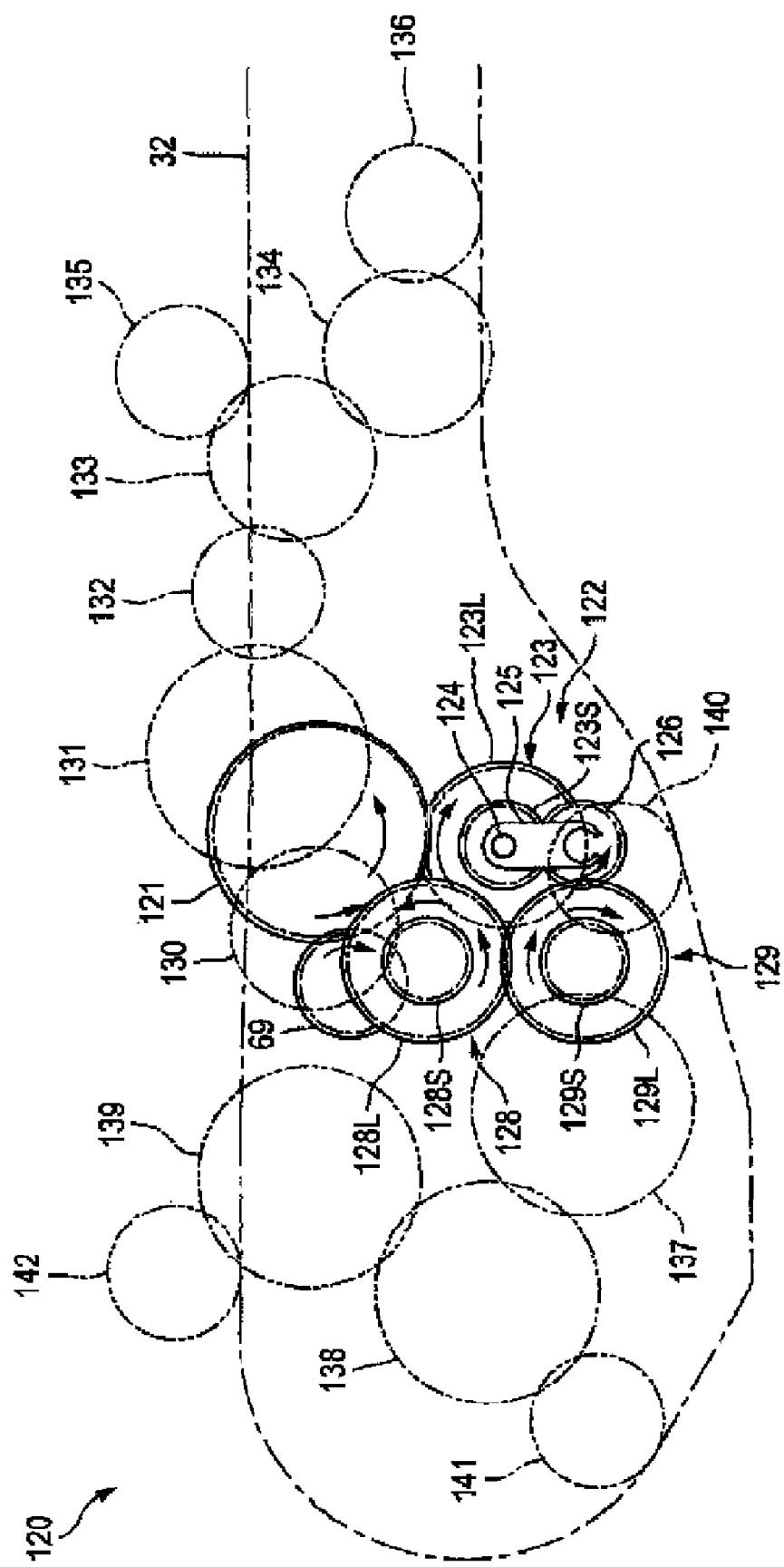
FIG. 14 is a figure of a structure of the third gear system 120.
Figure 15:
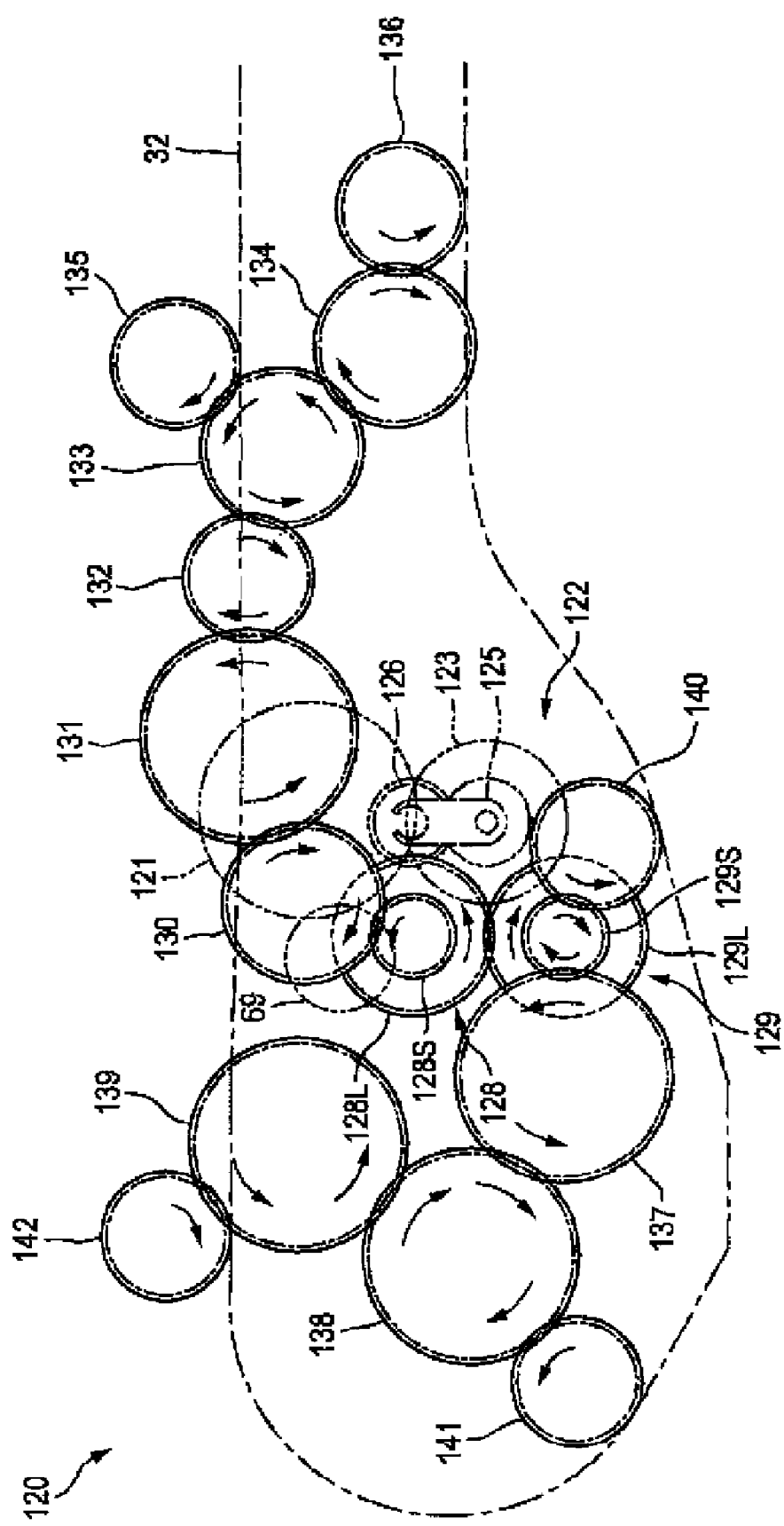
FIG. 15 is a figure of a structure of the third gear system 120.

FIG. 13 through FIG. 15 illustrate a third gear system 120 (one example of the first transfer mechanism) from the motor 67 to the conveying rollers 35A, 35B, 35C and 35D. The third gear system 120 is to transfer a driving force for conveying documents to the conveying rollers 35A, 35B, 35C and 35D in a conveying direction, in other words, from upstream to downstream in the conveying direction on the document conveying path 32, irrespective of the rotational direction of the motor 67.

As shown in FIG. 13, a transfer gear 121 is meshed with a driving gear 69 provided on the driving shaft of the motor 67, and a driving force is transferred to a planet gear device 122. There is no particular restriction on the number of gears and others from the driving gear 69 to the transfer gear 121. The number of transfer gears and the diameter can be changed, depending on a distance from the driving gear 69 to the planet gear device 122. A driving force is transferred so that the transfer gear 121 can be rotated in a CCW rotation or in a CW rotation in response to the rotation of the-motor 67 in a CW rotation or in a CCW rotation.

In the planet gear device 122, a supporting arm 125 is provided so as to rotate freely and coaxially with the shaft 124 of the sun gear 123. One planet gear 126 which is meshed with the sun gear 123 is pivotally supported at the supporting arm 125. It is noted that in the present illustrative aspect, the planet gear device 122 is provided with one planet gear 126 but there is no particular restriction on the number of planet gears. For example, as with the previously described planet gear device 75, the planet gear device may be provided with two planet gears.

The sun gear 123 is a two-stage gear which is coaxially and integrally made up of a large diameter gear 123L and a small diameter gear 123S. The planet gear 126 pivotally supported at the supporting arm 125 is meshed with a gear 123S of the sun gear 123. When the sun gear 123 rotates, the planet gear 126 which is meshed with the gear 123S is rotated. Further, since the sun gear 123 is attached to the shaft 124 via a torque limiter, a supporting arm 125 is also rotated in the same direction in response to the rotation of the sun gear 123. In other words, when the sun gear 123 rotates, the planet gear 126 revolves around the sun gear 123, while rotating on its own axis.

The transfer gear 121 is meshed with the gear 123L of the sun gear 123 in the planet gear device 122. A driving force is transferred from the motor 67, and the transfer gear 121 is rotated in a predetermined direction, by which the sun gear 123 is rotated in a predetermined direction. For example, as shown in FIG. 13, when the driving gear 69 rotates in a CCW rotation, the transfer gear 121 rotates in a CW rotation, and the sun gear 123 rotates in a CCW rotation. The planet gear 126 revolves around the sun gear 123 in a CCW rotation.

As shown in FIG. 13, a transfer gear 128 and a transfer gear 129 are arranged in a position adjacent to the planet gear device 122. The transfer gear 128 is a two-stage gear which is coaxially and integrally made up of a large diameter gear 128L and a small diameter gear 128S. Similarly, the transfer gear 129 is a two-stage gear which is coaxially and integrally made up of a large diameter gear 129L and a small diameter gear 129S. The planet gear 126 of the planet gear device 122 can be meshed with/detached from the gear 128L of the transfer gear 128. The planet gear 126 is also meshed with the gear 129L of the transfer gear 129. Further, the gear 128L and the gear 129L are meshed with each other.

As shown in FIG. 13, the planet gear 126 is meshed with the sun gear 123, thus revolving in a CCW rotation around the sun gear 123. Thereby, the planet gear 126 is meshed with the gear 128L of the transfer gear 128. In this instance, the planet gear 126 is detached from the transfer gear 129. The planet gear 126, which revolves in a CCW rotation, is meshed with the transfer gear 128, thereby stopping the revolution of the planet gear 126 around the sun gear 123. Then, the planet gear 126 rotates on its own axis in a CW rotation on receipt of a driving force transferred from the sun gear 123. Thus, the transfer gear 128 is rotated in a CCW rotation. Then, the transfer gear 129 which is meshed with the transfer gear 128 is rotated in a CW rotation.

As shown in FIG. 14, when the driving gear 69 rotates in a CW rotation, the transfer gear 121 is thereby rotated in a CCW rotation and the sun gear 123 is then rotated in a CW rotation. In this instance, the planet gear 126 rotates around in a CW rotation. Then, the planet gear 126 revolves in a CW rotation around the sun gear 123, by which the planet gear 126 is meshed with the gear 129L of the transfer gear 129. In this instance, the planet gear 126 is detached from the transfer gear 128 and therefore not meshed therewith. The planet gear 126, which revolves in a CW rotation, is meshed with the transfer gear 129, by which the revolution of the planet gear 126 around the sun gear 123 is stopped. The planet gear 126 rotates in a CCW rotation on receipt of a driving force transferred from the sun gear 123. Thus, the transfer gear 129 rotates in a CW rotation. The transfer gear 128, which is meshed with the transfer gear 129, rotates in a CCW rotation. As described above, even when the driving gear 69 rotates in a CW rotation or in a CCW rotation, a driving force is transferred in a CCW rotation to the transfer gear 128, and a driving force is transferred in a CW rotation to the transfer gear 129. In other words, irrespective of the rotational direction of the motor 67 connected to the driving gear 69, a driving force which rotates each gear in a definite rotational direction is transferred to the transfer gear 128 and the transfer gear 129.

FIG. 15 illustrates a driving force transferred from the transfer gears 128 and 129 to each of the conveying rollers 35A, 35B, 35C and 35D and the discharge roller 36. The gear 128S of the transfer gear 128 is meshed sequentially with five transfer gears 130, 131, 132, 133 and 134. Then, the transfer gear 133 is meshed with the driven gear 135 provided on the shaft of the conveying roller 35A. The transfer gear 134 is meshed with the driven gear 136 provided on the shaft of the discharge roller 36. A driving force of the transfer gear 128 is transferred via the transfer gears 130, 131, 132 and 133 and the driven gear 135 to the conveying roller 35A. Further, a driving force of the transfer gear 128 is transferred via the transfer gears 130, 131, 132, 133 and 134 and the driven gear 136 to the discharge roller 36.

As described above, the transfer gear 128 is rotated in a CCW rotation, irrespective of the rotational direction of the driving gear 69, and a driving force is transferred from the transfer gear 128 sequentially to the five transfer gears 130, 131, 132, 133 and 134. Upon receipt of the driving force, the driven gear 135 is rotated in a CW rotation and the driven gear 136 is rotated in a CCW rotation. The driven gear 125 is rotated in a CW rotation, by which the conveying roller 35A is rotated in a conveying direction. Further, the driven gear 126 is rotated in a CCW rotation, by which the discharge roller 36 is rotated in such a direction to discharge documents onto the sheet discharging tray 31.

Three transfer gears 137, 138 and 139 are sequentially meshed with the gear 129S of the transfer gear 129. Then, a driven gear 140 provided on the shaft of the conveying roller 35D is meshed with the gear 129S, a driven gear 141 provided on the shaft of the conveying roller 35C is meshed with the transfer gear 138, and a driven gear 142 provided on the shaft of the conveying roller 35B is meshed with the transfer gear 139. Thereby, a driving force of the transfer gear 129 is transferred via the driven gear 140 to the conveying roller 35D. Further, a driving force of the transfer gear 129 is transferred via the transfer gear 138 and the driven gear 141 to the conveying roller 35C. Still further, a driving force of the transfer gear 129 is transferred via the transfer gear 139 and the driven gear 142 to the conveying roller 35B.

As described above, the transfer gear 129 is rotated in a CW rotation irrespective of the rotational direction of the driving gear 69, and a driving force is transferred from the transfer gear 129 sequentially to three transfer gears 137, 138 and 139. Upon receipt of the thus transferred driving force, the driven gears 140 and 141 are rotated in a CCW rotation, and the driven gear 142 is rotated in a CW rotation. The driven gears 140 and 141 are rotated in a CCW rotation, by which the conveying rollers 35D and 35C are rotated in a conveying direction. The driven gear 142 is rotated in a CW rotation, by which the conveying roller 35B is rotated in a conveying direction. Therefore, irrespective of the rotational direction of the driving gear 69, a driving force is transferred in a conveying direction to each of the conveying rollers 35A, 35B, 35C and 35D and the discharge roller 36. It is noted that there is no particular restriction on a gear structure from the transfer gears 128 and 129 to each of the driven gears 135, 136, 140, 141 and 142, and the number of transfer gears and the diameter may be changed whenever necessary, depending on a distance from each transfer gear to each driven gear.

Figure 16:
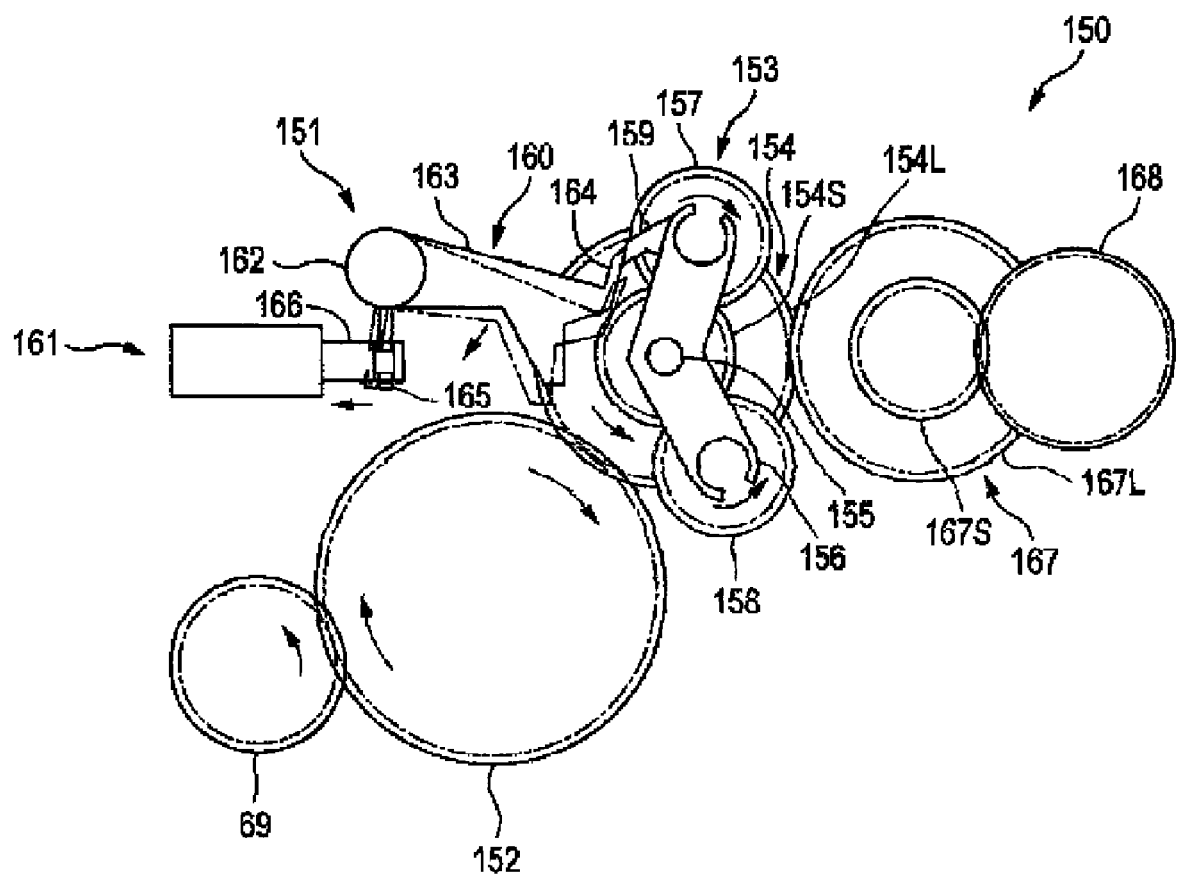
FIG. 16 is a figure of a structure of the fourth gear system 150.
Figure 17:
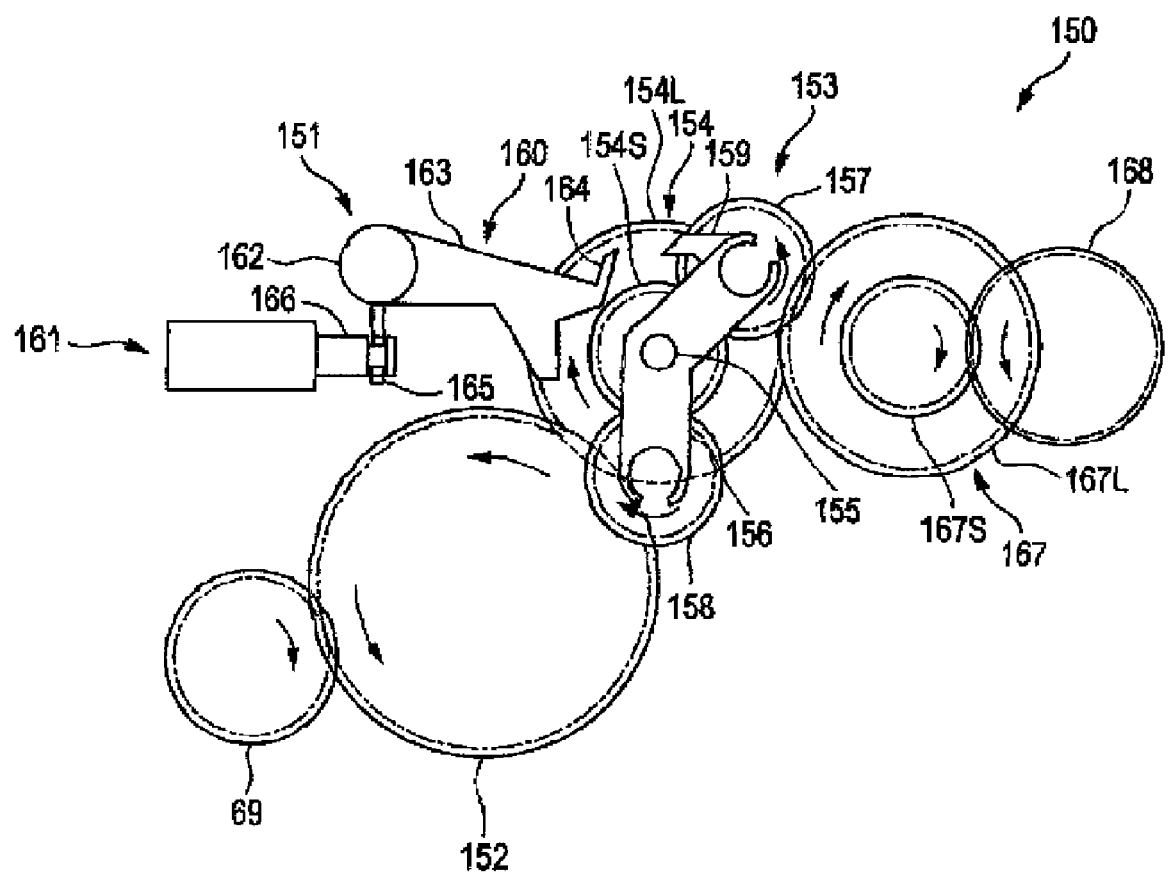
FIG. 17 is a figure of a structure of the fourth gear system 150.
Figure 18:
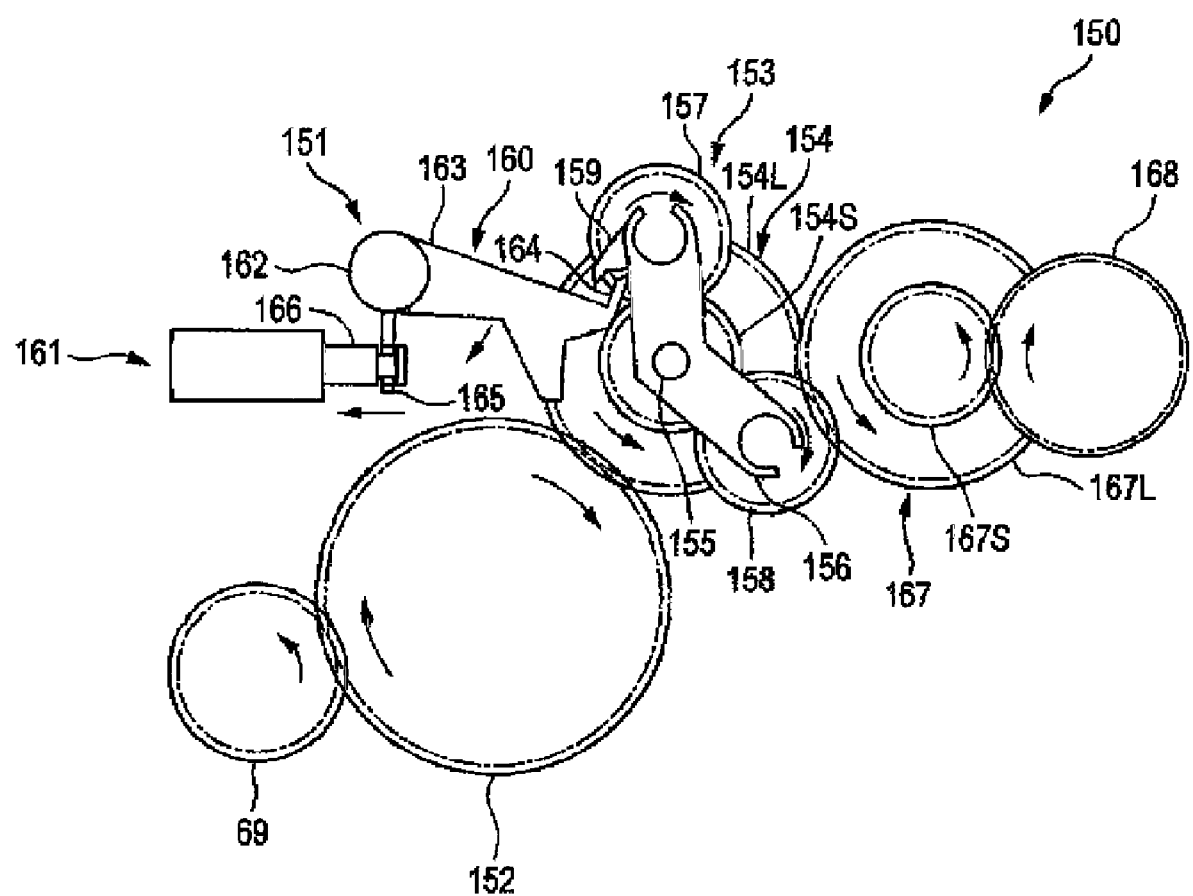
FIG. 18 is a figure of a structure of the fourth gear system 150.

FIG. 16 through FIG. 18 illustrate a fourth gear system 150 and a fifth gear system 151. The fourth gear system 150 from the motor 67 to a reversible roller 43 is to transfer a driving force to the reversible roller 43. The driving force is in a pulling-in direction or in a returning direction on the basis of the rotational direction of the motor 67. More specifically, the fourth gear system 150 transfers a driving force to the reversible roller 43 in a direction which returns the document on the bidirectional path 39 from the opening to the document conveying path 32 when the motor 67 rotates in a CW rotation and transfers a driving force to the reversible roller 43 to convey the document to the opening when the motor 67 rotates in a CCW rotation. The first driving-force supplying unit is realized by, for example, the fourth gear system 150 and the motor 67.

The fifth gear system 151 is to cut off a driving force transferred from the motor 67 to the reversible roller 43 when the rotational direction of the motor 67 is switched from a returning direction to a pulling-in direction of the reversible roller 43. In this instance, the pulling-in direction is a direction at which the document is pulled into the terminal end 41 of the bidirectional path 39 from the intersecting position 40 of the upper portion 32A on the document conveying path 32, and the returning direction is a direction at which the document is returned from the terminal end 41 of the bidirectional path 39 to the document conveying path 32. It is noted that in the present illustrative aspect, a mechanism including the fourth gear system 150 and the motor 67 is exemplified as the first driving-force supplying unit. However, for example, a driving source such as a motor different from the motor 67 may be provided separately, and the rotation of the driving source is controlled, thereby supplying a driving force to the reversible roller 43. The thus structured mechanism is able to simplify a transfer mechanism from the driving source to the reversible roller 43.

As shown in FIG. 16, a transfer gear 152 is meshed with the driving gear 69 provided on the driving shaft of the motor 67, thereby a driving force is transferred to the planet gear device 153. It is noted that there is no particular restriction on a structure from the driving gear 69 to the transfer gear 152, and the number and the diameter of the transfer gears may be changed depending on a distance from the driving gear 69 to the planet gear device 153. In response to the rotation of the motor 67 in a CW rotation or in a CCW rotation, a driving force is transferred so that the transfer gear 152 is rotated in a CCW rotation or in a CW rotation.

In the planet gear device 153, a supporting arm 156 is provided so as to rotate freely and coaxially on the shaft 155 of the sun gear 154, and two planet gears 157 and 158 which are respectively meshed with the sun gear 154 are pivotally supported at the supporting arm 156. It is noted that in the present illustrative aspect, the planet gear device 153 is provided with two planet gears 157 and 158 but there is no particular restriction on the number of planet gears. For example, as with the previously described planet gear device 122, the planet gear device may be provided with only one planet gear.

The sun gear 154 is a two-stage gear which is coaxially and integrally made up of a large diameter gear 154L and a small diameter gear 154S. The supporting arm 156 is provided on the shaft 155 so as to rotate freely, thereby pivotally supporting the planet gears 157 and 158 respectively. The planet gears 157 and 158 pivotally supported at the supporting arm 156 are respectively meshed with the gear 154S of the sun gear 154. When the sun gear 154 is rotated, the planet gears 157 and 158, which are respectively meshed with the gear 154S, are rotated. Further, in response to the rotation of the sun gear 154, the supporting arm 156 is also rotated in the same direction. In other words, when the sun gear 154 rotates, the planet gears 157 and 158 revolve around the sun gear 154, while rotating on their own axes.

A projected portion 159 is formed in the vicinity of the leading end at which the supporting arm 156 pivotally supports the planet gear 157. The projected portion 159 is locked by the fifth gear system 151, by which the supporting arm 156 rotating in a CCW rotation on the shaft 155 of the sun gear 154 is stopped at a predetermined position. As shown in FIG. 16, a position at which the supporting arm 156 is locked by the fifth gear system 151 is a detachment position to be described later.

The fifth gear system 151 includes a locking member 160 and a solenoid 161. The locking member 160 is provided with an arm portion 163 extended radially from the shaft 162 to the supporting arm 156, a pawl 164 formed in a claw shape at the leading end of the arm portion 163 and a passive portion 165 extended radially from the shaft 162. The pawl 164 can be meshed with the projected portion 159 of the supporting arm 156 and disengaged from the projected portion 159 when the arm portion 163 is moved rotationally at the center of the shaft 162. The passive portion 165 is connected to the shaft 166 of the solenoid 161. The solenoid 161 is to drive linearly the shaft 166 in a direction which allows the shaft to be retracted into the main body when electricity is supplied (ON) to activate an electromagnetic force and is to linearly and elastically return the shaft 166 to a direction which allows the shaft to project from the main body when electricity is interrupted (OFF) to eliminate the electromagnetic force. The shaft 166 is driven, a driving force of which is transferred to the passive portion 165, thereby the locking member 160 is moved rotationally at the center of the shaft 162 to assume a predetermined posture.

In a state where the solenoid 161 is off, as indicated by the solid line in FIG. 16, the locking member 160 assumes a posture at which the pawl 164 can be engaged with the projected portion 159 of the supporting arm 156. The locking member 160 is able to move rotationally in a CW rotation from the thus engaged posture, retaining the engaged posture as long as no external force is given by being urged by a spring or the like. The projected portion 159 is rotated in association with the rotation of the supporting arm 156, the rotational direction of which is approximately a radial direction of the locking member 160 in an engaged posture. Therefore, even when a rotational force of the supporting arm 156 is transferred via the projected portion 159 to the locking member 160, the locking member 160 will not rotate from the engaged posture against an urging force by a spring or the like. In a state where the solenoid 161 is on, as indicated by the double dotted and dashed line in FIG. 16, the locking member 160 assumes a posture at which the pawl 164 is detached from the projected portion 159.

As shown in FIG. 16, the transfer gear 152 is meshed with the gear 154 of the sun gear 154 in the planet gear device 153. A driving force is transferred from the motor 67 to rotate the transfer gear 152 to a predetermined direction, by which the sun gear 154 is rotated in a predetermined direction. For example, as shown in FIG. 16, when the driving gear 69 rotates in a CCW rotation, the transfer gear 152 rotates in a CW rotation, and the sun gear 154 rotates in a CCW rotation. In response to the above rotation, the planet gears 157 and 158 revolve around the sun gear 154S in a CCW rotation. In association with the rotation of the planet gears 157 and 158, the supporting arm 156 is rotated, by which the projected portion 159 of the supporting arm 156 is in a position which allows engagement with the pawl 164. In this instance, when the solenoid 161 is off, as shown in FIG. 16, the pawl 164 is engaged with the projected portion 159, thereby regulating the rotation of the supporting arm 156. In this state, neither the planet gears 157 and 158 are meshed with the transfer gear 167. A position of the supporting arm 156 at which both of the planet gears 157 and 158 are detached from the transfer gear 167 is called a detachment position in this specification. The pawl 164 is engaged with the projected portion 159, thereby regulating the rotation of the supporting arm 156 in a CCW rotation until the solenoid 161 is turned on, and the supporting arm 156 is retained at the detachment position.

As shown in FIG. 16, the transfer gear 167 is arranged at a position adjacent to the planet gear device 153. The transfer gear 167 can be meshed with the planet gears 157 and 158 of the planet gear device 153. The transfer gear 167 is a two-stage gear which is coaxially and integrally made up of a large diameter gear 167L and a small diameter gear 167S. The planet gears 157 and 158 can be meshed with the large diameter gear 167L. The small diameter gear 167S is meshed with a driven gear 168 provided on the shaft of the reversible roller 43. It is noted that there is no particular restriction on the gear structure from the transfer gear 167 to the driven gear 168, and the number and the diameter of transfer gears may be changed, whenever necessary, depending on a distance from the transfer gear 167 to the driven gear 168.

As shown in FIG. 17, when the driving gear 69 rotates in a CW rotation, the transfer gear 152 rotates in a CCW rotation, and the sun gear 154 rotates in a CW rotation. In response to the rotation, the planet gears 157 and 158 revolve around (the sun gear 154) in a CW rotation. In association with the rotation of the planet gears 157 and 158, the supporting arm 156 is rotated. When the supporting arm 156 is rotated in a CW rotation, the projected portion 159 moves away from the pawl 164. Therefore, even when the solenoid 161 is off, the supporting arm 159 can be rotated in a CW rotation. The planet gears 157 and 158 revolve around in a CW rotation, by which the planet gear 157 is meshed with the transfer gear 167.

The planet gear 157, which revolves around the sun gear 154 in a CW rotation, is meshed with the transfer gear 167, by which the rotation of the planet gear 157 around the sun gear 154 is stopped. Then, the planet gear 157 receives a driving force transferred from the sun gear 154, thereby rotating on its own axis in a CCW rotation. In response to the rotation, the transfer gear 167 rotates in a CW rotation and the driven gear 168 is rotated in a CCW rotation. The driven gear 168 is rotated in a CCW rotation, by which the reversible roller 43 is rotated in a returning direction.

When the solenoid 161 is turned on from a state shown in FIG. 16, the shaft 166 is allowed to be retracted into the main body. Thereby, the locking member 160 is moved rotationally and the pawl 164 is detached from the projected portion 159. Therefore, the supporting arm 156 is allowed to rotate in a CCW rotation, and the planet gears 157 and 158 revolve around the sun gear 154 in a CCW rotation. As shown in FIG. 18, the planet gear 158, which revolves around the sun gear 154 in a CCW rotation, is meshed with the transfer gear 167, by which the revolution of the planet gear 158 around the sun gear 154 is stopped. Then, the planet gear 158 receives a driving force transferred from the sun gear 154, thereby rotating on its own axis in a CW rotation. In response to the rotation, the transfer gear 167 rotates in a CCW rotation, and the driven gear 168 is rotated in a CW rotation. The driven gear 168 is rotated in a CW rotation, by which the reversible roller 43 is rotated in a pulling-in direction. It is noted that the solenoid 161 may be turned on only when the pawl 164 is detached from the projected portion 159, and the pawl 164 will not be engaged with the projected portion 159 even when the solenoid 161 is turned off after the supporting arm 156 is rotated from the detachment position in a CCW rotation.

The rotation of the driving gear 67 is switched from a CCW rotation to a CW rotation, by which the supporting arm 156 can be rotated in a CW rotation from a state shown in FIG. 18 at which the planet gear 158 is meshed with the transfer gear 167. The supporting arm 156 is rotated in a CW rotation, thereby assuming a state shown in FIG. 17 at which the planet gear 157 is meshed with the transfer gear 167. Then, the rotation of the driving gear 67 is switched from a CW rotation to a CCW rotation, by which the supporting arm 156 is rotated in a CCW rotation from a state shown in FIG. 17, assuming a detachment position shown in FIG. 16 at which the pawl 164 is engaged with the projected portion 159.

Figure 19:
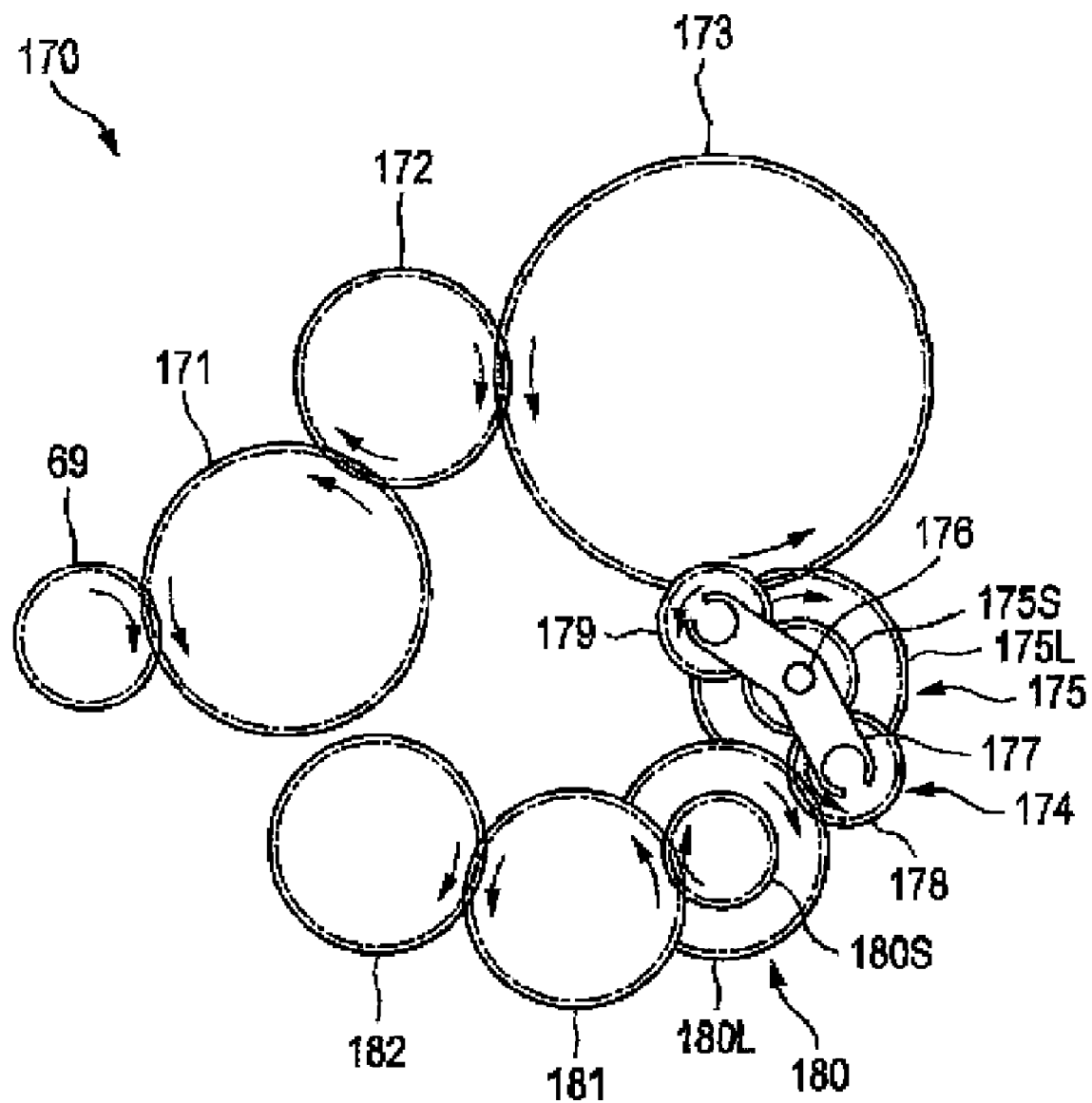
FIG. 19 is a figure of a structure of the sixth gear system 170.
Figure 20:
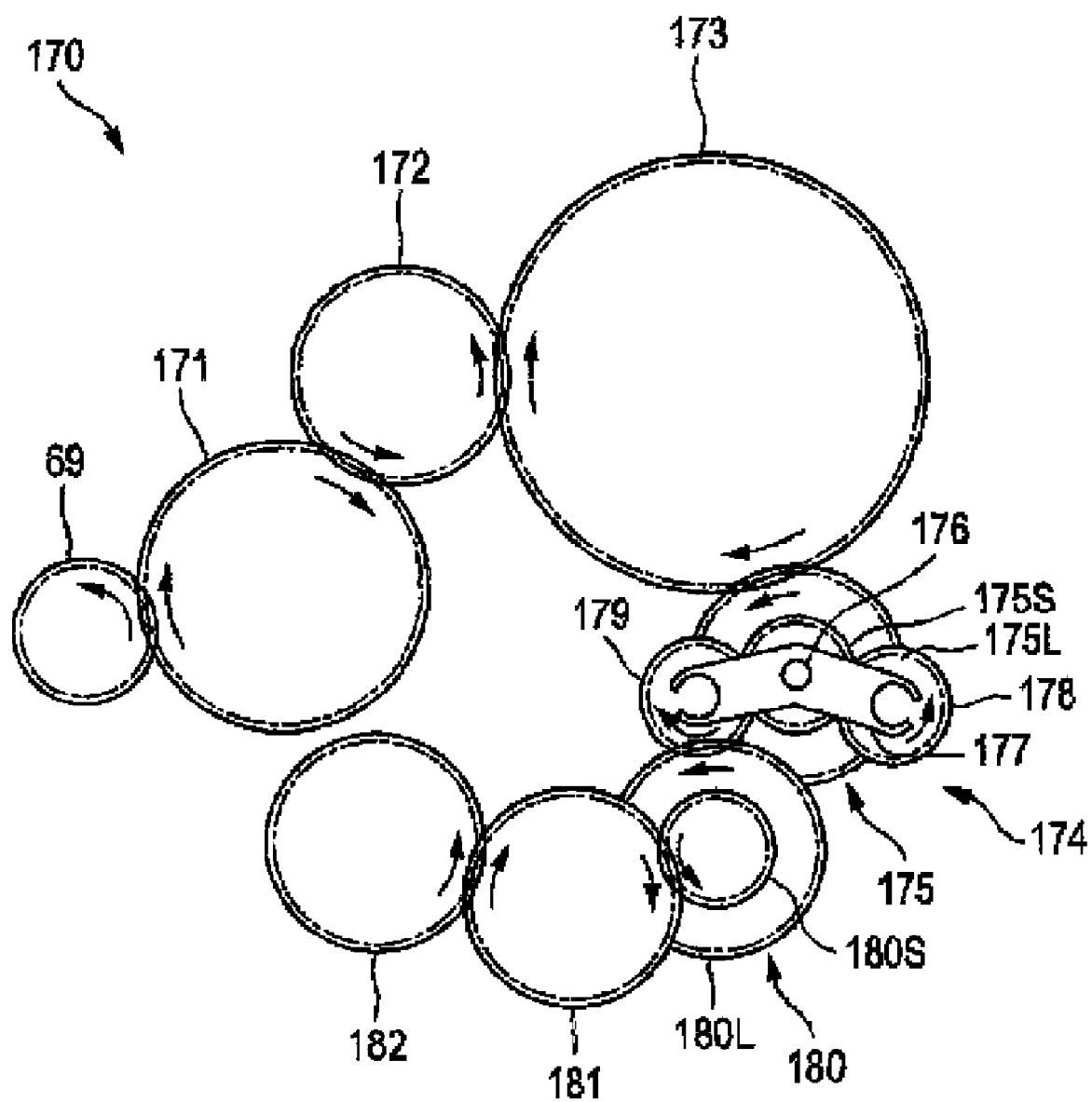
FIG. 20 is a figure of a structure of the sixth gear system 170.

FIG. 19 and FIG. 20 show a sixth gear system 170 from the motor 67 to the guide flap 50. The second driving-force supplying unit is realized by, for example, the sixth gear system 170 and the motor 67. The sixth gear system 170 is a rotational driving force to transfer to the guide flap 50 on the basis of the rotational direction of the motor 67, thereby changing the guide flap 50 to the first position or the second position. It is noted that a mechanism constituted with the sixth gear system 170 and the motor 67 is exemplified as the second driving-force supplying unit in the present illustrative aspect. However, for example, a driving source such as a motor different from the motor 67 is provided separately, and a driving force of the driving source may be supplied to the guide flap 50.

As shown in FIG. 19, the transfer gears 171, 172, and 173 are meshed sequentially with the driving gear 69 provided on the driving shaft of the motor 67, and a driving force is transferred from the transfer gear 173 to the planet gear device 174. It is noted that there is no particular restriction on the number of gears or others from the driving gear 69 to the transfer gear 173, and the number and the diameter of the transfer gears may be changed, depending on a distance from the driving gear 69 to the planet gear device 174. A driving force is transferred so that the transfer gear 173 can be rotated in a CCW rotation or in a CW rotation in response to the rotation of the motor 67 in a CW rotation or in a CCW rotation.

In the planet gear device 174, a supporting arm 177 is provided so as to rotate freely and coaxially with the shaft 176 of the sun gear 175, and two planet gears 178 and 179, which are respectively meshed with the sun gear 175, are pivotally supported at the supporting arm 177. It is noted that in the present illustrative aspect, the planet gear device 174 is provided with two planet gears 178 and 179, but there is no particular restriction on the number of planet gears. For example, as with the previously described planet gear device 122, the planet gear device may be provided with only one planet gear.

The sun gear 175 is a two-stage gear which is coaxially and integrally made up of a large diameter gear 175L and a small diameter gear 175S. The planet gears 178 and 179, which are pivotally supported at the supporting arm 177, are respectively meshed with the gear 175S of the sun gear 175. When the sun gear 175 rotates, the planet gears 178 and 179, which are respectively meshed with the gear 175S, rotates. Further, in response to the rotation of the sun gear 175, the supporting arm 177 is also rotated in the same direction. In other words, when the sun gear 175 rotates, the planet gears 178 and 179 revolve around the sun gear 175, while respectively rotating on their own axes.

The transfer gear 173 is meshed with the sun gear 175 of the planet gear device 174. A driving force is transferred from the motor 67 to rotate the transfer gear 173 to a predetermined direction, by which the sun gear 175 is rotated to a predetermined direction. For example, as shown in FIG. 19, when the driving gear 69 rotates in a CW rotation, the transfer gear 173 rotates in a CCW rotation, the sun gear 175 rotates in a CW rotation, and the planet gears 178 and 179 revolve around the sun gear 175 in a CW rotation.

As shown in FIG. 19, the transfer gear 180 and the transfer gear 181 are arranged in a position adjacent to the planet gear device 174. The transfer gear 180 is a two-stage gear which is coaxially and integrally made up of a large diameter gear 180L and a small diameter gear 180S. The planet gears 178 and 179 of the planet gear device 174 can be meshed with the gear 180L of the transfer gear 180. Further, the gear 180S of the transfer gear 180 is meshed with the transfer gear 181, and the transfer gear 181 is meshed with the driven gear 182 provided on the shaft of the guide flap 50.

As shown in FIG. 19, the planet gears 178 and 179 revolve in a CW rotation around the sun gear 175, by which the planet gear 178 is meshed with the gear 180L of the transfer gear 180. On the other hand, the planet gear 179 is in a state which is detached from the transfer gear 180. The planet gear 178, which revolves around the sun gear 175 in a CW rotation, is meshed with the transfer gear 180, by which the revolutions of the planet gears 178 and 179 around the sun gear 175 are stopped. Then, the planet gear 178 rotates on its own axis in a CCW rotation upon receipt of a driving force transferred from the sun gear 175. Therefore, the transfer gear 180 rotates in a CW rotation. The transfer gear 181, which is meshed with the transfer gear 180, rotates in a CCW rotation, and the driven gear 182, which is meshed with the transfer gear 181, is rotated in a CW rotation. The driven gear 182 is rotated in a CW rotation, by which the guide flap 50 is rotated so as to sway upward, assuming the first position.

As shown in FIG. 20, when the driving gear 69 rotates in a CCW rotation, the transfer gear 173 rotates in a CW rotation, the sun gear 175 rotates in a CCW rotation, and the planet gears 178 and 179 revolve in a CCW rotation around the sun gear 175. The planet gears 178 and 179 revolve in a CCW rotation around the sun gear 175, by which the planet gear 179 is meshed with the gear 180L of the transfer gear 180. On the other hand, the planet gear 178 is in a state which is detached from the transfer gear 180. The planet gear 179, which revolves in a CCW rotation around the sun gear 175, is meshed with the transfer gear 180, by which the revolutions of the planet gears 178 and 179 are stopped. Then, the planet gear 179 rotates on its own axis in a CW rotation on receipt of a driving force transferred from the sun gear 175. Therefore, the transfer gear 180 rotates in a CCW rotation. The transfer gear 181, which is meshed with the transfer gear 180, rotates in a CW rotation, and the driven gear 182, which is meshed with the transfer gear 181, is rotated in a CCW rotation. The driven gear 182 is rotated in a CCW rotation, by which the guide flap 50 is rotated so as to sway downward, thereby assuming the second position.

Although not shown in the figures, a slide clutch is provided between the shaft on which the driven gear 182 is provided and the guide flap 50. The slide clutch is to transfer the rotation of the shaft to the guide flap 50. The slide clutch is to cut off a driving force transferred by slippage of a clutch plate when a load exceeding a predetermined torque is given. As shown in FIG. 4, the guide flap 50 is swayed between the first position and the second position, and regulated so as not to be moved rotationally beyond each position by being made to contact with a guide member or the like. Therefore, after the guide flap 50 assumes the first position or the second position, the rotation of the guide flap 50 is regulated by slipping the slide clutch slips. Accordingly, in a state where the guide flap 50 is kept stationary in the first position or the second position, a shaft on which the driven gear 182 is provided can be further rotated. Further, there is no particular restriction on a gear structure from the transfer gear 180 to the driven gear 182, and the number and the diameter of the transfer gears may be changed, whenever necessary, depending on a distance from the transfer gear 180 to each driven gear 182.

Hereinafter, a description is given for operations of reading an image by the image reading apparatus 1. Both a FBS and an ADF 3 may be used in the image reading apparatus 1. However, the use of the FBS is not in particular related to the present illustrative aspect, a detailed description of which will be, therefore, omitted here. Where the ADF 3 is used, a document cover 4 is kept closed relative to a document placing base 2. The document cover 4 is opened or closed upon detection by a sensor or the like provided on the document placing base 2 and controlled so that the ADF 3 can be used when the document cover 4 is closed. Then, documents Gn containing n-number of sheets to be read are placed on a sheet feed tray 30. In this instance, the symbol Gn denotes documents, and the symbol of n denotes the number of documents. Hereinafter, in the order of a smaller number of pages, each document is indicated as G1, G2, . . . , Gn. The documents Gn are placed on the sheet feed tray 30 in such a way that, of the front face and the back face, the sheet face (hereinafter, referred to as "first face") of a page with a smaller number (in other words, an earlier page) is kept on the upper side, and the sheet face (hereinafter, referred to as "second face") of a page with a greater number (in other words, a page next to the first face) is kept on the lower side, in other words, the page is faced up. Further, the documents Gn may be available in one sheet or plural sheets. In the present illustrative aspect, a description will be given for the documents Gn in plural sheets. For example, where images on the documents Gn, which are plural in number and identical in size, are read, a plurality of the documents Gn are placed on the sheet feed tray 30 so that the first face on the first document G1 is kept on the upper side, in other words, the documents are faced up and stacked neatly on the sheet feed tray 30.

When instructions for Reading Start are input to the image reading apparatus 1, the motor 67 is driven, thereby driving and rotating the pickup roller 33, the separation roller 34, the conveying rollers 35A, 35B, 35C and 35D, the discharge roller 36 and the reversible roller 43 at a predetermined timing. Further, then an arm 29 is lowered, by which the pickup roller 33 is in contact with the document G1 on the sheet feed tray 30. Then, documents are separated one by one from the document G1 at the uppermost position which directly receives the rotational force of the pickup roller 33 and the separation roller 34, and delivered to a document conveying path 32. The thus fed documents Gn are guided into the document conveying path 32, conveyed to a reading position, and read for images by an image reading unit 22 which is on standby below the reading position. Then, the documents Gn, which have been read for images, are discharged to a sheet discharging tray 31. In the above described image reading operations, documents Gn are different in a conveyance path, depending on a case where the documents Gn are subjected to one-face reading or a case where they are subjected to both-face reading. Whether the documents Gn are subjected to one-face reading or both-face reading is judged by a one-face reading mode (one-face mode) or a both-face reading mode (both-face mode), which is established previously before the instructions of Reading Start are input. The thus established one-face reading mode or both-face reading mode is stored as conveyance mode information in RAM 63 in the controller 60. Where the one-face reading mode is established, the image reading apparatus 1 is operated so that documents can be conveyed on a conveyance path for the one-face reading mode. Further, where the both-face reading mode is established, the image reading apparatus 1 is operated so that documents can be conveyed on a conveyance path according to the both-face reading mode.

Figure 21:
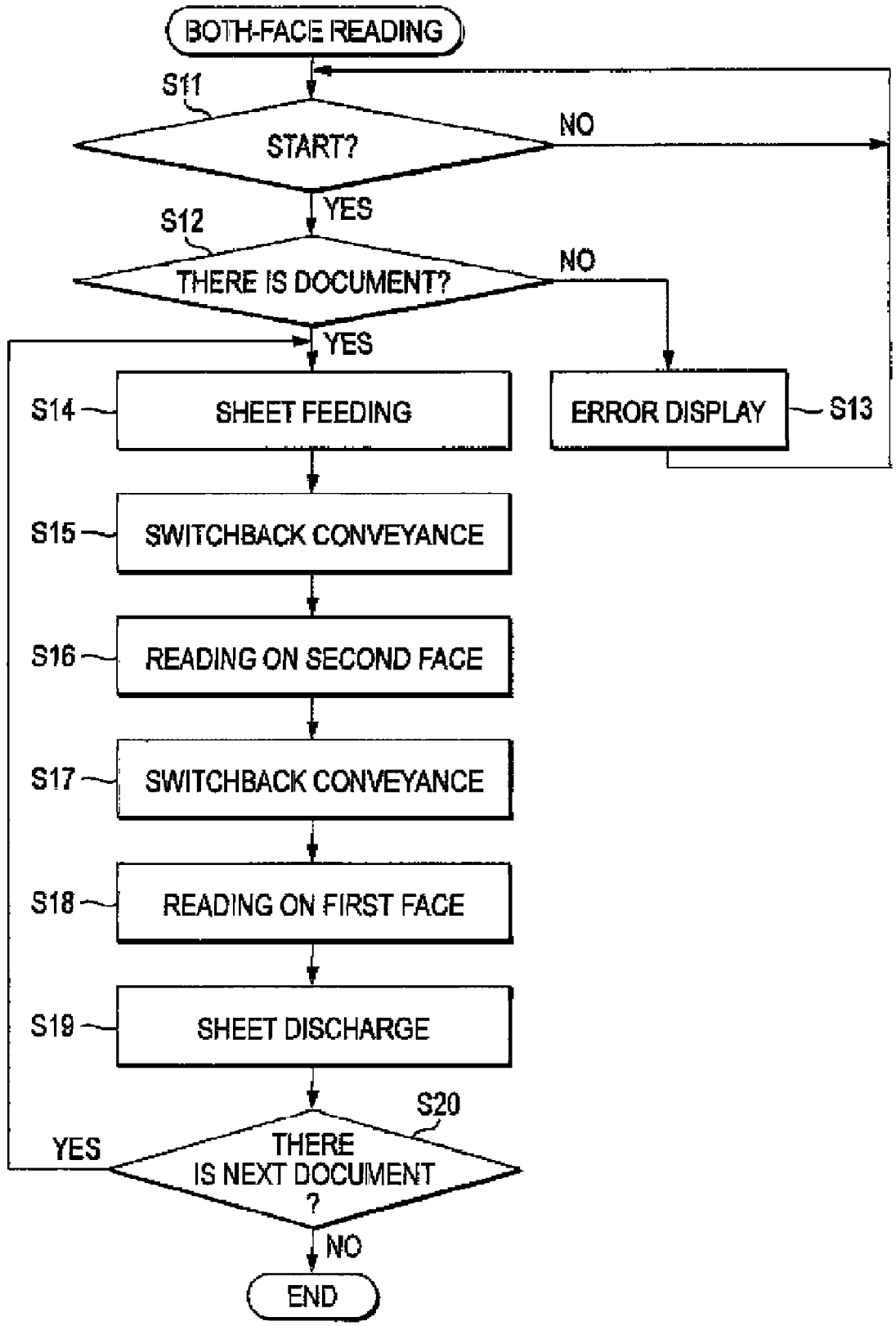
FIG. 21 is a flowchart for explaining operations of the one-face reading mode.
Figure 22:
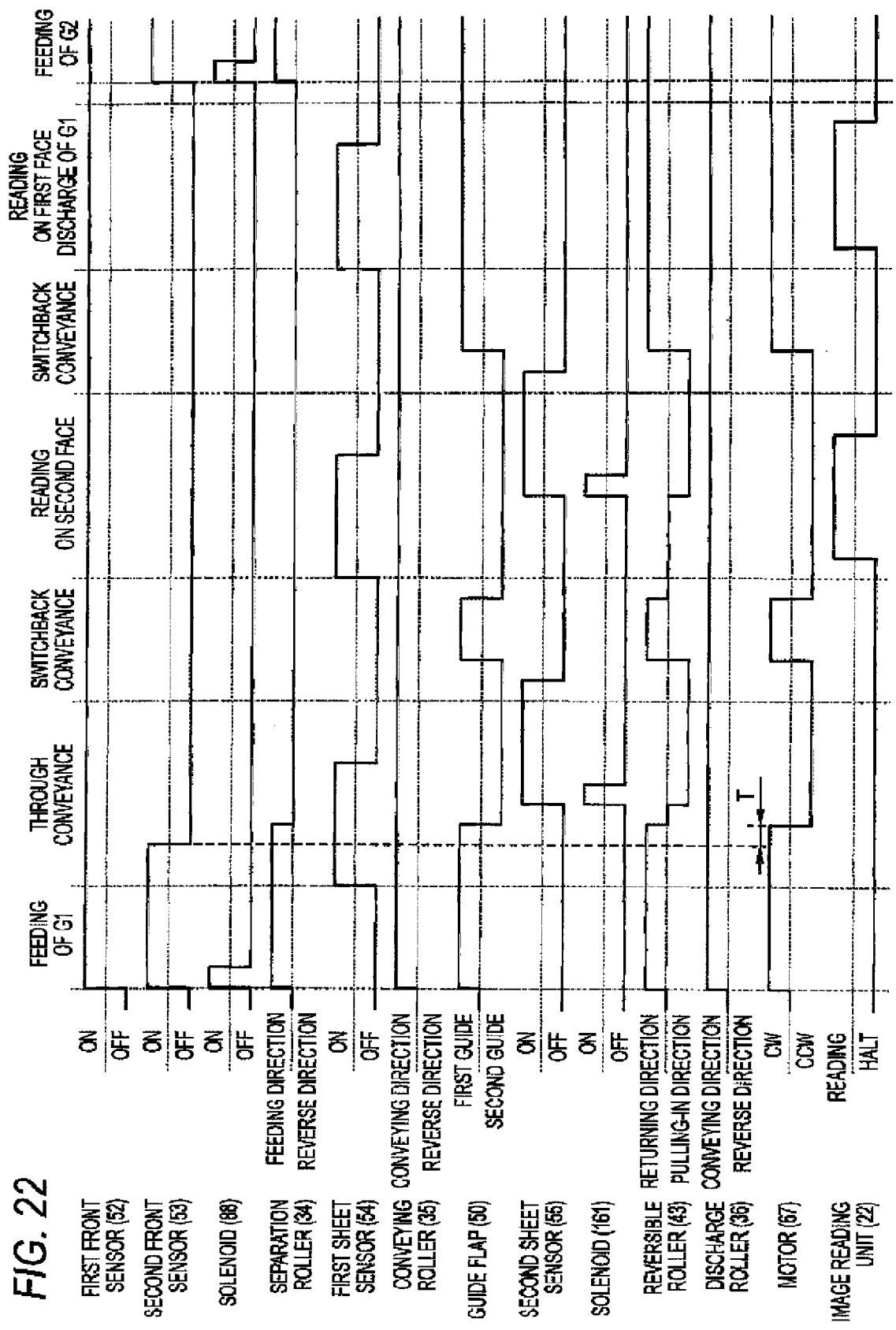
FIG. 22 is a flowchart for explaining operations of the both-face reading mode.
Figure 23:
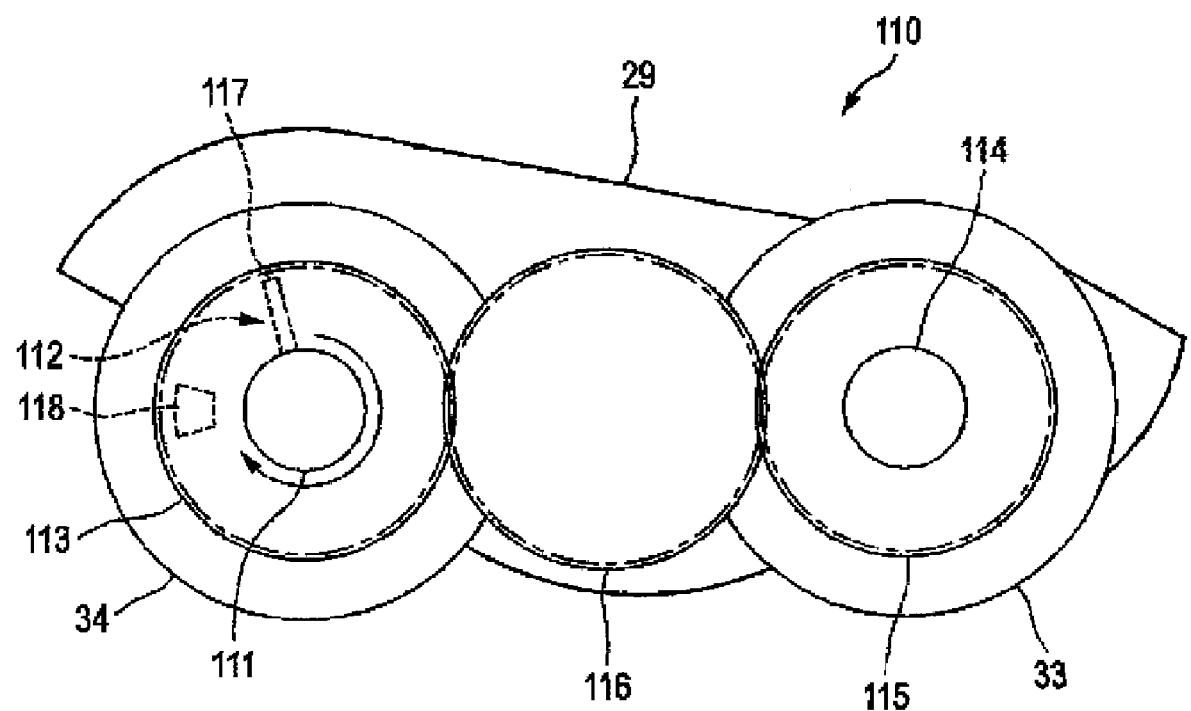
FIG. 23 is a drawing for showing a state where the separation roller 34 rotates without load.

Hereinafter, a description will be given for the both-face reading by the image reading apparatus 1 with reference to FIG. 21 through FIG. 32. It is noted that when the one-face reading mode is established in the image reading apparatus 1, the documents G1 fed from the sheet feed tray 30 are conveyed on the document conveying path 32, with the first face opposing the reading position, and only the first face is read (one-face reading) Thereafter, the documents G1 are discharged to the sheet discharging tray 31. The thus described one-face reading is not in particular related to the present illustrative aspect, a detailed description is, therefore, omitted here. FIG. 21 is a flowchart for describing operations of the image reading apparatus 1 in the both-face reading mode. FIG. 22 is a timing chart for showing operation timings of each element in the both-face reading mode. Further, FIG. 23 is a drawing for showing a state at which the separation roller 34 is rotated without load. FIG. 24 through FIG. 32 are pattern diagrams for showing a conveyance state of documents Gn in the both-face reading mode. It is noted that the face indicated by "1" on documents Gn in these drawings denotes the first face, and the face indicated by "2" denotes the second face. The first face and second face constitute the relationship between the front face and the back face.

Figure 24:
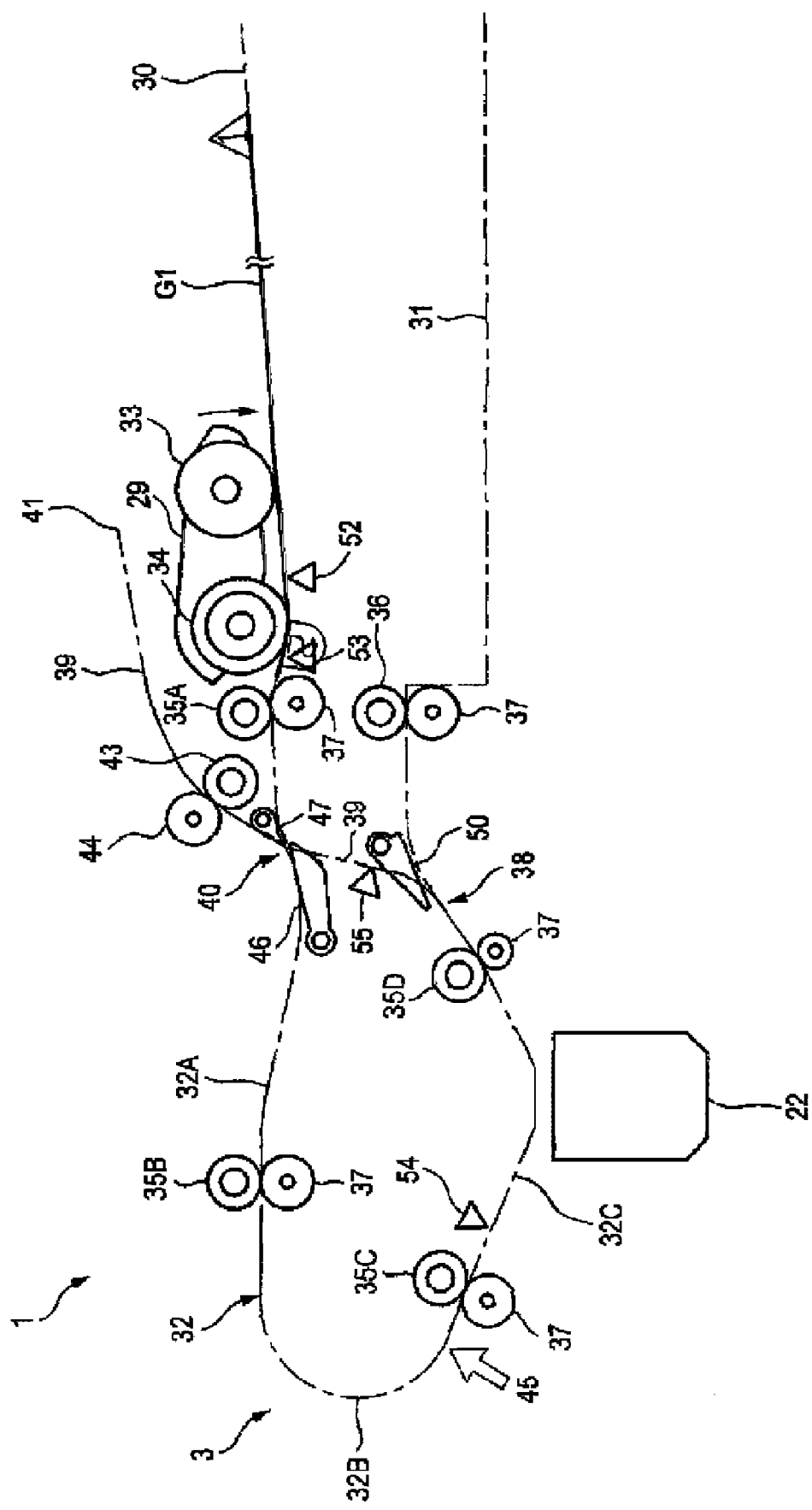
FIG. 24 is a pattern diagram for showing operations of reading images in the one-face reading mode.

Before feeding of documents Gn, as shown in FIG. 24, the guide flap 50 is in the first position, that is, a position at which a conveyance path at the connection position 38 continues from the reading position on the document conveying path 32 to the sheet discharging tray 31. The guide flap 46 is in the third position, that is, a position at which a conveyance path at the intersecting position 40 continues from the sheet feed tray 30 on the document conveying path 32 to the reading position, and the guide flap 47 in the firth position, that is, a position at which a conveyance path at the intersecting position 40 continues from the terminal end 41 of the bidirectional path 39 to the reading position on the document conveying path 32.

When instructions of "Reading Start" are input to the image reading apparatus 1 (S11 (Y)), a judgment is made by the first front sensor 52 for whether documents Gn are placed on the sheet feed tray 30 (S12). Where the controller 60 judges that documents Gn are not placed on the sheet feed tray 30 (S12(N)), an error display, "No Document Found", is made at a display unit of the image reading apparatus 1 (S13). When documents Gn are placed on the sheet feed tray 30, the motor 67 is driven and rotated in a CW rotation. Instructions given to the motor 67 for rotation in a CW rotation are stored in the RAM 63 as rotational direction information. It is noted that in the present illustrative aspect, a description will be given that at the time when reading is started, the motor 67 is rotated in a CW rotation. However, whether the motor 67 is rotated in a CW rotation or in a CCW rotation at the time when reading is started is decided optionally, and the rotational direction of the motor 67 is a relative concept.

The controller 60 is to drive and rotate the motor 67 in a CW rotation and also to turn on the solenoid 88 (refer to FIG. 22). In this instance, as shown in FIG. 7 and FIG. 8, in the planet gear device 75 of the first gear system 70, locking by the locking mechanism 86 is released, the planet gears 79 and 80 are revolved in a CCW rotation around the sun gear 76 on the basis of the rotation of the sun gear 76 to transfer a driving force to the transfer gear 94. Thereby, a driven gear 95 is rotated in a CW rotation. The driven gear 95 is rotated in a CW rotation, by which a driving force is transferred to an arm 29 to lower the arm 29. When the arm 29 is lowered, the pickup roller 33 is in contact with the documents G1 on the sheet feed tray 30. Further, the driven gear 95 is rotated in a CW rotation, which is transferred from the second gear system 110 to the pickup roller 33 and the separation roller 34. The pickup roller 33 and the separation roller 34 are rotated in a feeding direction, by which the document G1 is delivered to the document conveying path 32. When a plurality of documents Gn are placed on the sheet feed tray 30, the document G2 immediately under the documents G1 may be conveyed together with the document G1 located uppermost, however, the document G2 is stopped by a friction pad provided on the guide plate 19. Thus, the document G1 is fed to the document conveying path 32 (S14).

On the document conveying path 32, a driving force of the motor 67 is transferred by the third gear system 120 to the conveying rollers 35A, 35B, 35C and 35D and the discharge roller 36. Each of these rollers is rotated in a conveying direction so that documents Gn are conveyed from upstream to downstream of the document conveying path 32 in the conveying direction. The documents G1 fed from the sheet feed tray 30 to the document conveying path 32 are nipped by the conveying roller 35A and the pinch roller 37, the rotational force of which is transferred, by which it is conveyed to the intersecting position 40 on the document conveying path 32. It is noted that the documents G1 are fed on the document conveying path 32 and the leading end of the document G1 in the conveying direction is detected by a second front sensor 53, thereby the second front sensor 53 is turned on (refer to FIG. 22).

Figure 25:
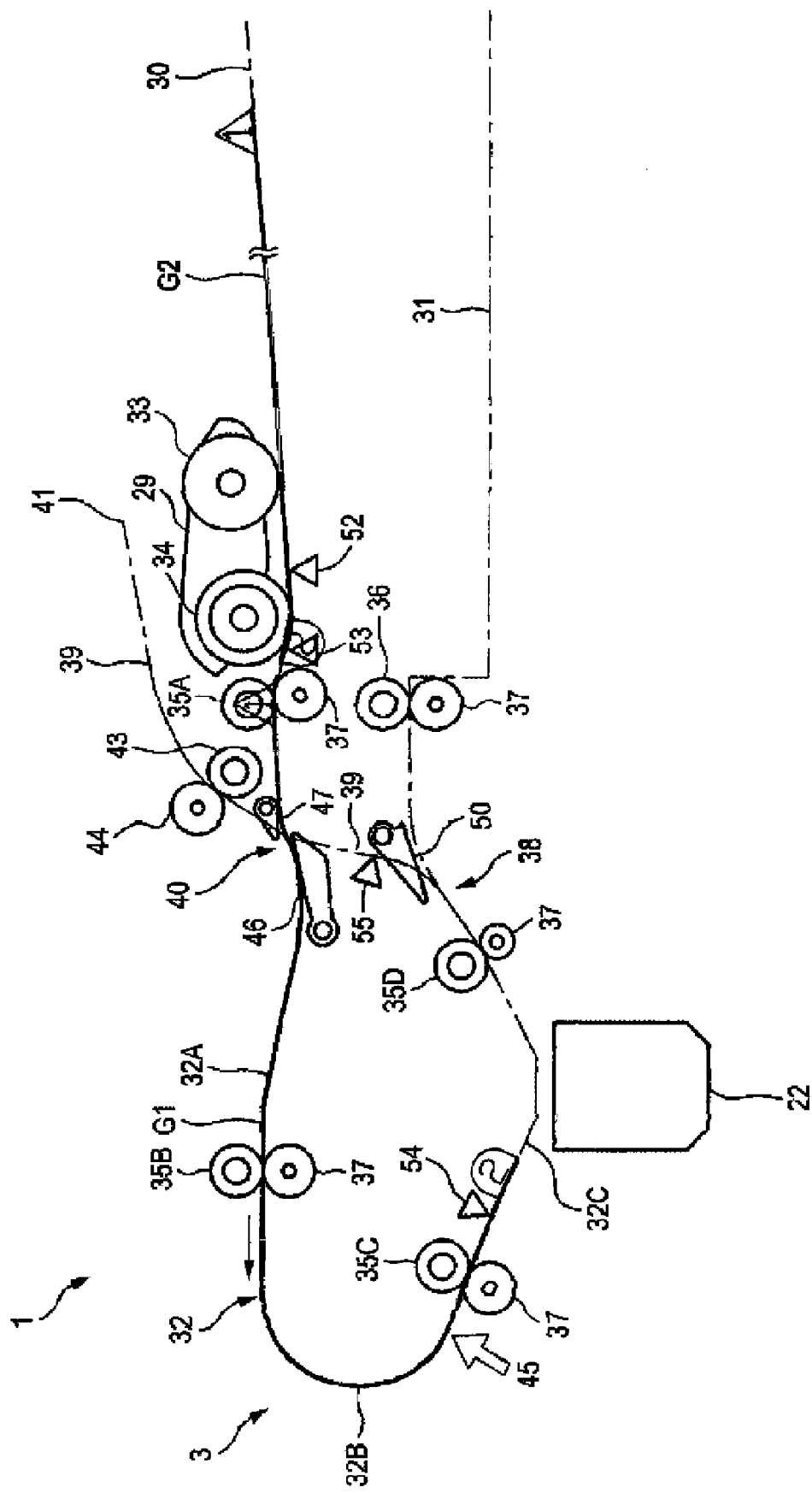
FIG. 25 is a pattern diagram for showing operations of reading images the in one-face reading mode.

Since the guide flap 47 closes a conveyance path from the sheet feed tray 30 on the document conveying path 32 to the intersecting position 40, the leading end of document G1 in the conveying direction, which has arrived at the intersecting position 40, abuts against the guide flap 47. Then, as shown in FIG. 25, the guide flap 47 is pushed to the leading end of the documents G1 and changed from the fifth position to the sixth position. Thereby, a conveyance path continues from the sheet feed tray 30 on the document conveying path 32 to the reading position, and a conveyance path to the terminal end 41 of the bidirectional path 39 is closed. Further, a conveyance path to the connection position 38 of the bidirectional path 39 is closed by the guide flap 46. Therefore, the documents G1, which have arrived at the intersecting position 40 from the sheet feed tray 30 on the document conveying path 32, is guided by the guide flap 46 and the guide flap 47, and conveyed to the reading position on the document conveying path 32, without advancing into the bidirectional path 39 in either direction.

A driving force of the motor 67 is transferred by the third gear system 120 to rotate each of the conveying rollers 35A, 35B, 35C and 35D and the discharge roller 36, the peripheral speed of which is designed to be faster than the peripheral speed at which a driving force of the motor 67 is transferred by the first gear system 70 and the second gear system 110 to rotate the separation roller 34. As shown in FIG. 25, the documents G1 fed from the sheet feed tray 30 to the document conveying path 32 is in pressure-contact with the separation roller 34, nipped by the conveying roller 35A and the pinch roller 37 and conveyed accordingly. As shown in FIG. 12, the separation roller 34 is allowed to rotate without load by the one-cycle clutch 112 in a feeding direction approximately by one circle. Therefore, as shown in FIG. 23, the separation roller 34 in pressure-contact with the document G1 is rotated together with the documents G1 conveyed by the conveying roller 35A at a predetermined speed, thereby rotating without load so as to advance into the feeding direction by the shaft 111. Thereby, a predetermined clearance is formed between the document G1 (first page) and the document G2 (second page) in the conveying direction.

The documents G1 fed on the document conveying path 32 are conveyed by each of the conveying rollers 35A, 35B, and 35C so as to turn reversely downward by a curved portion 32B on the document conveying path 32, arriving at the first sheet sensor 54. In this instance, the leading end of the documents G1 in the conveying direction is detected by the first sheet sensor 54, thereby the first sheet sensor 54 is turned on (refer to FIG. 22).

When the documents G1 are further conveyed and, as shown in FIG. 25, the trailing end of the documents G1 in the conveying direction passes through the second front sensor 53, the trailing end of the documents G1 in the conveying direction is detected by the second front sensor 53. In other words, the second front sensor 53 is turned off (refer to FIG. 22). In this instance, the controller 60 switches the rotation of the motor 67 from a CW rotation to a CCW rotation on the basis of an off signal of the second front sensor 53. In the present illustrative aspect, the separation roller 34 is allowed to rotate without load by the one-cycle clutch 112 in the feeding direction approximately by one circle. Therefore, at a time when a certain period of time T (refer to FIG. 22) has elapsed after the second front sensor 53 was turned off, the rotation of the motor 67 is switched from a CW rotation to a CCW rotation. In this instance, the above time T is set in advance to be a time which is needed from completion of the rotation of the separation roller 34 without load to the resumption of the rotation without load, more specifically, time which is needed from a point when the separation roller 34 is again rotated to a point when the leading end of the next document G2 in the conveying direction is nipped. It is noted that at the time when the rotation of the motor 67 is switched from a CW rotation to a CCW rotation, the leading end of the document G1 in the conveying direction has arrived at the reading position, but at this time, no image reading is made on the first face of the document G1. Further, at the time when the rotation of the motor 67 is switched from a CW rotation to a CCW rotation, the leading end of the subsequent document G2 in the conveying direction has not arrived at the intersecting position 40.

During a period of elapse of the time T after the trailing end of the documents G1 in the conveying direction has been detected by the second front sensor 53 (refer to FIG. 22), the separation roller 34 is temporarily rotated without load and thereafter rotated in the conveying direction. As described above, the second front sensor 53 is provided downstream of the separation roller 34 in the conveying direction. Therefore, during a period of elapse of the time T after detection of the trailing end of document G1 in the conveying direction, the separation roller 34 operates (corresponding to the feeding operation) feeding the next documents G2 to the document conveying path 32. In other words, the separation roller 34 operates nipping the leading end of the documents G2 in the conveying direction and taking out the documents G2 from the sheet feed tray 30. Then, when the separation roller 34 nips the leading end of the documents G2 in the conveying direction, the time T has elapsed and the rotation of the motor 67 is switched from a CW rotation to a CCW rotation. When the rotation of the motor 67 is switched from a CW rotation to a CCW rotation, as shown in FIG. 10, the supporting arm 78 of the planet gear device 75 is locked by the locking mechanism 86, and retained at the detachment position. Thereby, a driving force transferred to the driven gear 95 is cut off, and the shaft 111, which pivotally supports the separation roller 34, is halted. Therefore, since the separation roller 34 is not rotated, the document G2 is halted in a state where it is nipped between the separation roller 34 and the guide plate 19. It is noted that a state where the document G2 nipped and halted continues until the document G1 is completely read on both faces. In other words, during the conveyance of the document G1, a driving force is transferred from the motor 67 to the separation roller 34 only until the rotation of the motor 67 is switched from a CW rotation to a CCW rotation for the first time after the start of feeding the document G1.

It is noted that as described above, such a mechanism is adapted in the present illustrative aspect that the one-cycle clutch 112 is provided on the shaft 111 of the second gear system 110 and the separation roller 34 is rotated without load when the document G1 passes through the separation roller 34. However, for example, where the one-cycle clutch 112 is not provided and such a mechanism is adapted that will not allow the separation roller 34 to rotate without load, at the time when the second front sensor 53 is turned off, the rotation of the motor 67 may be switched from a CW rotation to a CCW rotation. In this instance, the separation roller 34 continues to rotate in the conveying direction until the second front sensor 53 downstream of the separation roller 34 in the conveying direction detects the trailing end of the documents G1 in the conveying direction. Therefore, until the trailing end of the documents G1 in the conveying direction has passed through a nip point between the separation roller 34 and the guide plate 19 and thereafter is detected by the second front sensor 53, the separation roller 34 operates feeding the next document G2 to the document conveying path 32.

In order to switch the rotation of the motor 67 from a CW rotation to a CCW rotation, the CPU 61 at the controller 60 at first outputs halt instructions to the motor 67 and thereafter outputs CCW rotation instructions. The history of the halt instructions, the CCW rotation instructions, together with the CW rotation instructions which have been already output, is stored in the RAM 63 as rotational direction information.

Figure 26:
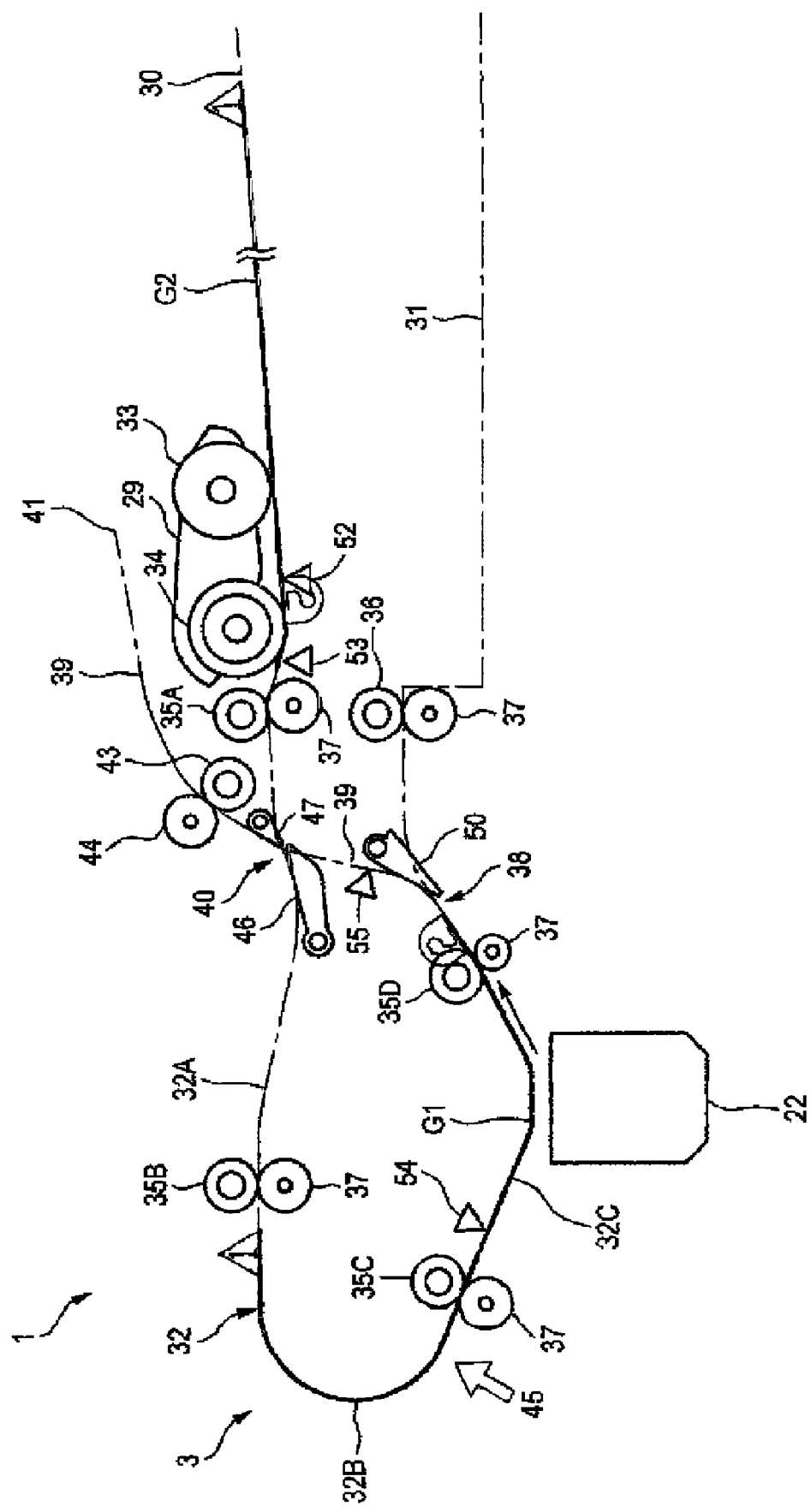
FIG. 26 is a pattern diagram for showing operations of reading images in the one-face reading mode.

On the other hand, as shown in FIG. 13 through FIG. 15, the third gear system 120 transfers a driving force in the conveying direction to each of the conveying rollers 35A, 35B, 35C and 35D and the discharge roller 36, irrespective of whether the rotation of the motor 67 is in a CW rotation or in a CCW rotation. Thus, as shown in FIG. 25 and FIG. 26, even after the rotation of the motor 67 is switched, the document G1 is conveyed to the reading position on the document conveying path 32 by the conveying roller 35B or others. It is noted that when the rotation of the motor 67 is switched, the halt instructions are output to halt temporarily the motor 67. A gear loss (driving loss) occurs where the CCW rotation instructions are output and even immediately after the motor 67 starts to rotate in a CCW rotation, until the planet gear 126 is detached from the transfer gear 128 and meshed with the transfer gear 129, a driving force of the motor 67 is not transferred to any of the conveying rollers 35A, 35B, 35C and 35D or the discharge roller 36. In the meantime, the motor 67 practically rotates without load. Because of the gear loss, the document G1 is halted temporarily on the document conveying path 32. When the document G1 is halted during image reading, the image quality may be deteriorated. However, the image reading is not started at this time, and there will be no defects resulting from the gear loss.

When the rotation of the motor 67 is switched from a CW rotation to a CCW rotation, the fourth gear system 150 cuts off a driving force transferred to the driven gear 168, while the fifth gear system 151 retains the planet gear device 153 at the detachment position. Thereby, the reversible roller 43 is halted (refry to FIG. 22). The rotation of the motor 67 is switched from a CW rotation to a CCW rotation, by which the sixth gear system 170 allows the guide flap 50 to change to the second position (refer to FIG. 26). It is noted that the trailing end of document G1 passes through the intersecting position 40, thereby the guide flap 47 returns from the sixth position to the fifth position.

Figure 27:
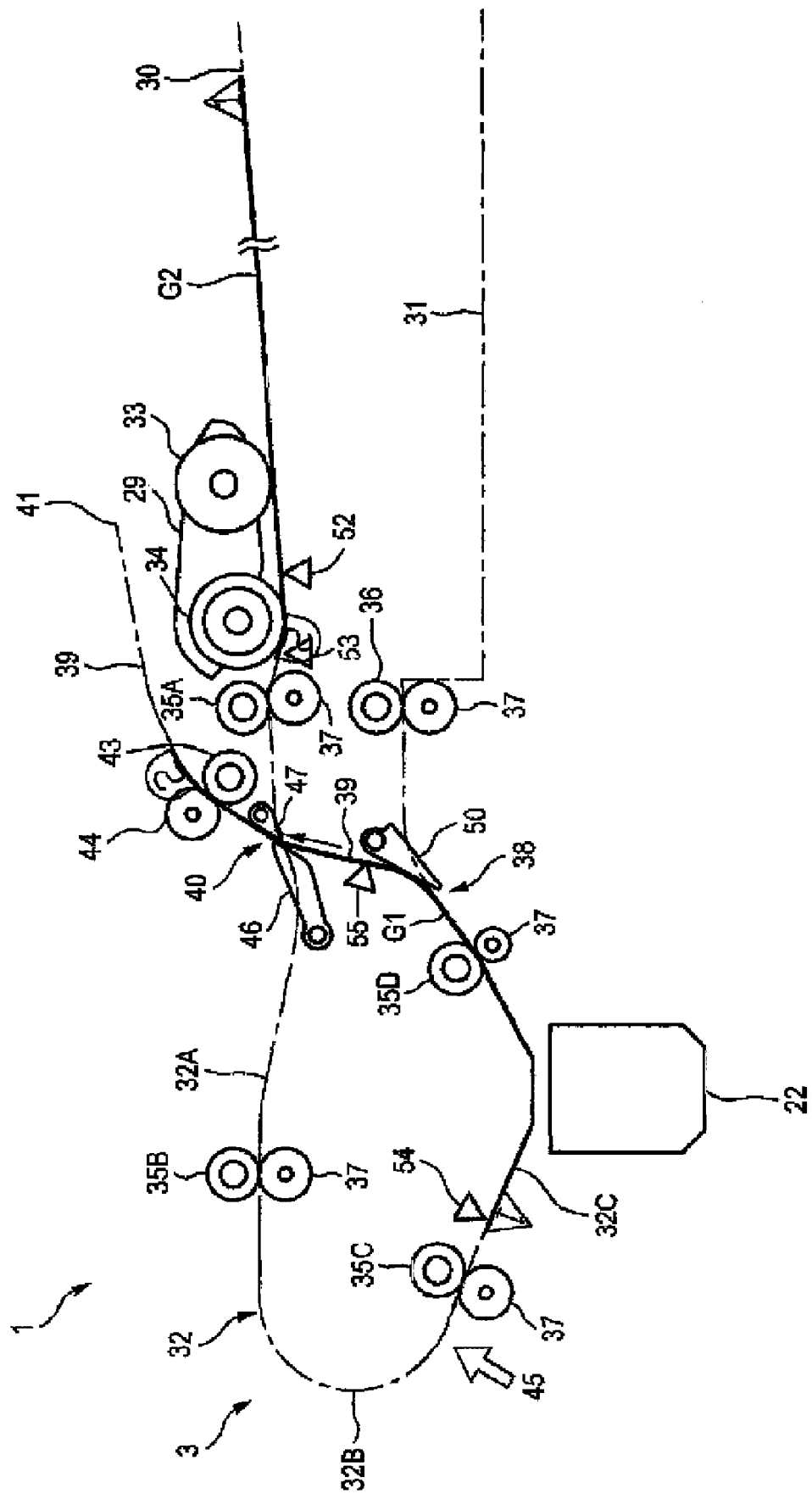
FIG. 27 is a pattern diagram for showing operations of reading images in the both-face reading mode.

The documents G1 are conveyed on the document conveying path 32, with the first face opposing the reading position. When the documents G1 are further conveyed and the leading end of the documents G1 arrive at the guide flap 50, as shown in FIG. 27, the leading end of the documents G1 is guided by the guide flap 50, advancing through the connection position 38 from document conveying path 32 into the bidirectional path 39. The second sheet sensor 55 is turned on when detecting the leading end of the document G1 which has advanced into the bidirectional path 39 (refer to FIG. 22). On the other hand, the first sheet sensor 54 detects the trailing end of the document G1 after the trailing end thereof has passed through the first sheet sensor 54 and is turned off (refer to FIG. 22). The history of on and off of the second sheet sensor 55 is stored as reading state information in the RAM 63 in the controller 60. When the second sheet sensor 55 is turned on, the controller 60 turns the solenoid 161 on (refer to FIG. 22). Thereby, when the document G1 is pulled into the bidirectional path 39, the supporting arm 156 of the planet gear device 153 locked by the fifth gear system 151 is released. Then, as shown in FIG. 18, a driving force rotating in a CCW rotation is transferred from the motor 67 to the planet gear device 153, which transfers a driving force rotating in a CW rotation to the driven gear 168, thereby the reversible roller 43 is rotated in a pulling-in direction.

Since the guide flap 46 closes a conveyance path from the bidirectional path 39 to the intersecting position 40, the leading end of documents G1, which has advanced into the bidirectional path 39, is in contact with the guide flap 46 on arrival at the intersecting position 40. As shown in FIG. 27, the guide flap 46 moves rotationally so as to be pushed up by the leading end of the document G1 conveyed on the bidirectional path 39, changing the third position to the fourth position. Thereby, a conveyance path continues from the connection position 38 of the bidirectional path 39 to the terminal end 41 of the bidirectional path 39, and also a conveyance path to the reading position on the document conveying path 32 is closed. Further, a conveyance path to the sheet feed tray 30 on the document conveying path 32 is closed by the guide flap 47. Therefore, the leading end of the document G1, which has arrived at the intersecting position 40 from the connection position 38 on the bidirectional path 39, is guided by the guide flap 46 and the guide flap 47 and conveyed to the bidirectional path 39, without advancing into the document conveying path 32. Then, the leading end of the document G1 is nipped by the reversible roller 43 and the pinch roller 44 and conveyed to the terminal end 41 on the bidirectional path 39 by the rotation of the reversible roller 43 in a pulling-in direction.

Figure 28:
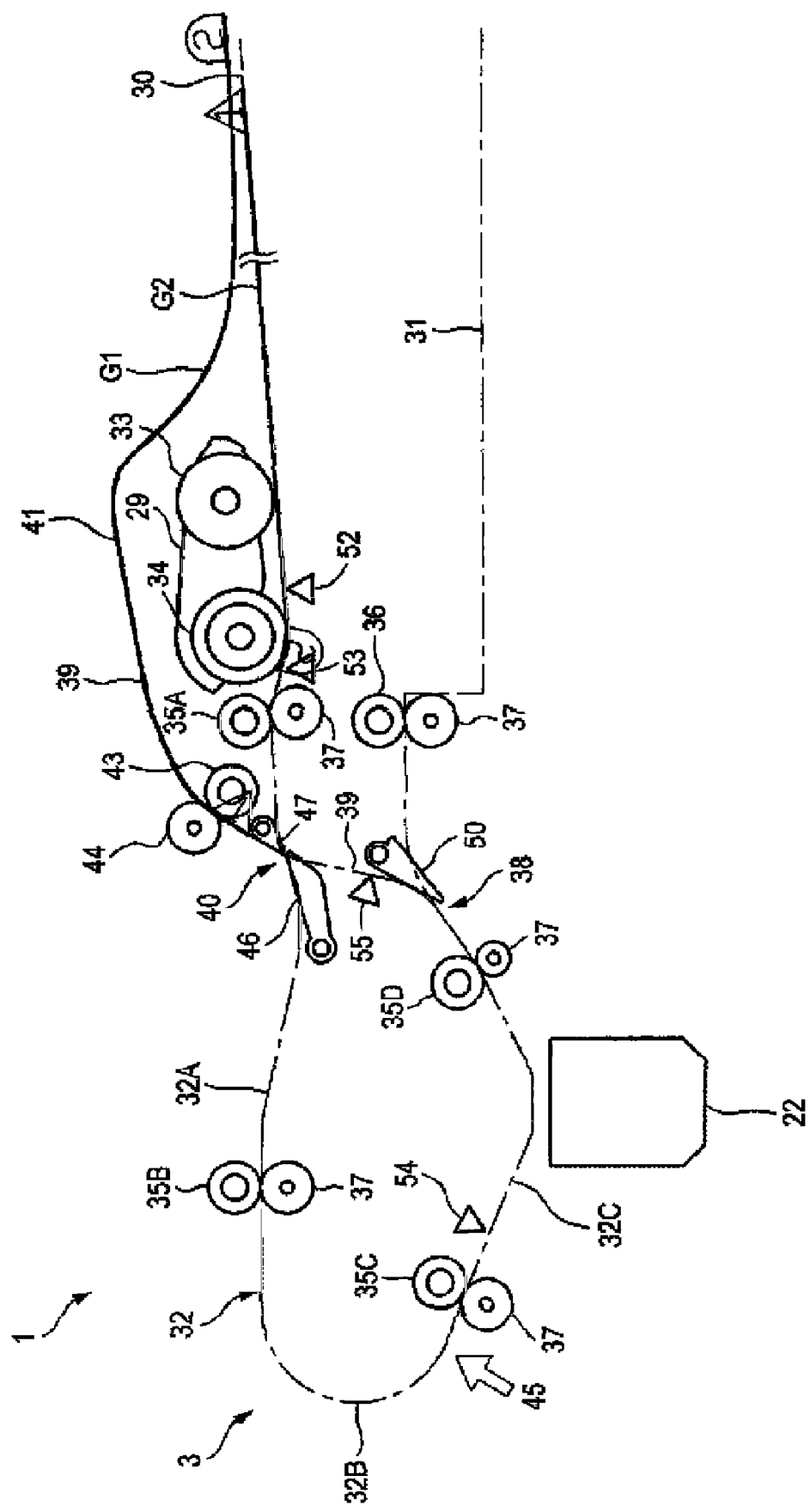
FIG. 28 is a pattern diagram for showing operations of reading images in the both-face reading mode.

As shown in FIG. 28, after the trailing end of the document G1 has passed over the intersecting position 40 on the bidirectional path 39 and completely advanced into the terminal end 41, the controller 60 switches the rotation of the motor 67 from a CCW rotation to a CW rotation (refer to FIG. 22). In order to switch the rotation of the motor 67 from a CCW rotation to a CW rotation, the CPU 61 of the controller 60 outputs CW rotation instructions after output of halt instructions to the motor 67. The halt instructions and the CW rotation instructions are stored in the RAM 63 as rotational direction information, together with instructions output for driving the motor 67.

The second sheet sensor 55 is turned off when detecting the trailing end of the document G1 conveyed on the bidirectional path 39, and the trailing end of the document G1 passes over the intersecting position 40 after the elapse of a predetermined time. Therefore, the controller 60 counts a signal detected by the second sheet sensor 55 and a distance or time for which it is conveyed by the conveying roller 35D and the reversible roller 43. Thereby, it judged that the trailing end of the document G1 has passed over the intersecting position 40 on the bidirectional path 39 and completely advanced into the terminal end 41. The rotation of the motor 67 is switched, by which the document G1 nipped by the reversible roller 43 and the pinch roller 44 and projected outward from the terminal end 41 outside the ADF 3 is returned to the intersecting position 40.

When a part of the document G1 is projected from the terminal end 41 of the bidirectional path 39 outside the ADF 3, the part of the document G1 is supported by the document supporting portion 42 (refer to FIG. 1). Further, the leading end of the document G1 is overlapped so as to ride over the document G2 on the sheet feed tray 30. In this instance, there is a fear that the arrangement of documents on the sheet feed tray 30 may be disrupted. However, as described above, since the document G2 on the sheet feed tray 30 is in a state where the leading end is nipped by the guide plate 19 opposing the separation roller 34, the aligned state of documents Gn on the sheet feed tray 30 is not disrupted.

The document G1 passes over the intersecting position 40 and moves away from the guide flap 46, by which the guide flap 46 moves rotationally downward and returns to the third position.

The rotation of the motor 67 is switched from a CCW rotation to a CW rotation, by which, as shown in FIG. 17, the planet gear device 153 of the fourth gear system 150 rotates the supporting arm 156 in a CW rotation to transfer a driving force of the motor 67 to a driven gear 168, thereby rotating the driven gear 168 in a CCW rotation. Thereby, the reversible roller 43 is rotated in a retuning direction. Therefore, the document G1 is conveyed in a switchback manner so that the bidirectional path 39 can be returned to the intersecting position 40 (S15).

On the other hand, as shown in FIG. 13 through FIG. 15, the third gear system 120 transfers a driving force to each of the conveying rollers 35A, 35B, 35C and 35D and the discharge roller 36 so as to rotate in one direction, irrespective of whether the rotation of the motor 67 is in a CW rotation or in a CCW rotation. Therefore, even after the rotation of the motor 67 is switched, each of the conveying rollers 35A, 35B, 35C and 35D and the discharge roller 36 are rotated in one direction. It is noted that when the rotation of the motor 67 is switched from a CCW rotation to a CW rotation, a gear loss occurs that until the planet gear 126 is detached from the transfer gear 129 and meshed with the transfer gear 128, the motor 67 rotates without load, and a driving force of the motor 67 is not transferred to any of the conveying rollers 35A, 35B, 35C and 35D or the discharge roller 36.

Upon switching the rotation of the motor 67 from a CCW rotation to a CW rotation, the first gear system 70 cuts off a driving force transferred to the driven gear 95, while the locking mechanism 86 retains the planet gear device 75 at the detachment position. Thereafter, since the solenoid 88 is not activated, the planet gear device 75 is retained at the detachment position even if the motor 67 rotates in a CW rotation. Therefore, a rotational driving force transferred to the separation roller 34 is continuously blocked. In the sixth gear system 170, the rotation of the motor 67 is switched from a CCW rotation to a CW rotation, by which the guide flap 50 is changed to the first position (refer to FIG. 29).

Figure 29:
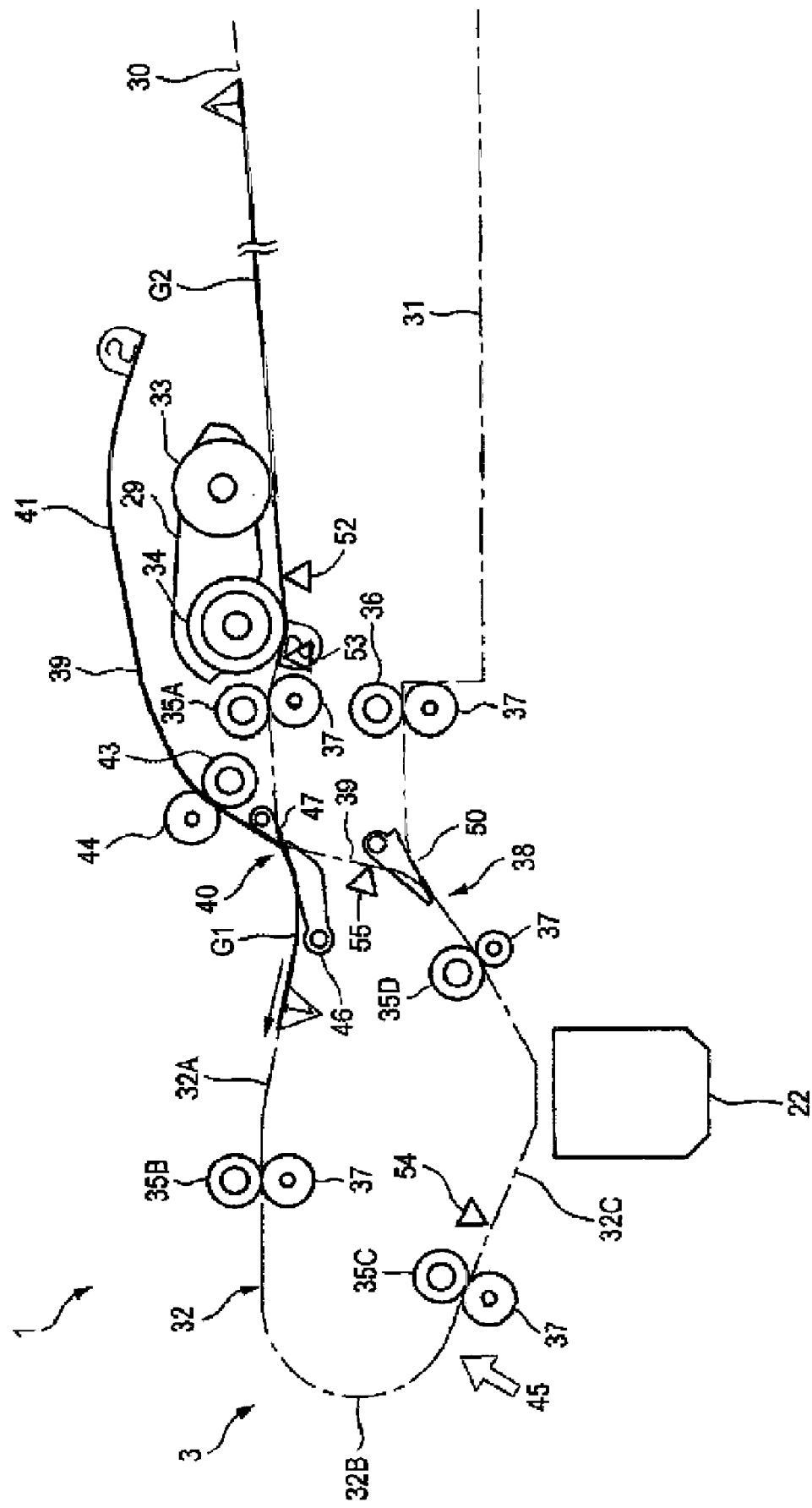
FIG. 29 is a pattern diagram for showing operations of reading images in the both-face reading mode.

The document G1 conveyed from the bidirectional path 39 to a returning direction is in contact with the guide flap 46 at the third position in the intersecting position 40. The guide flap 46 is regulated so as not to move rotationally from the third position to downward. Therefore, a conveyance path continues from the terminal end 41 on the bidirectional path 39 to the reading position on the document conveying path 32, and a conveyance path to the connection position 38 on the bidirectional path 39 is closed. Further, the guide flap 47 closes a conveyance path to the sheet feed tray 30 on the document conveying path 32. Therefore, as shown in FIG. 29, the document G1 is guided by the guide flap 46 and the guide flap 47 and conveyed from the terminal end 41 on the bidirectional path 39 to the reading position on the document conveying path 32, without advancing into the connection position 38 on the bidirectional path 39 or the sheet feed tray 30 on the document conveying path 32. The document G1 is returned from the bidirectional path 39 to upstream at the reading position on the document conveying path 32 in the conveying direction, by which the document G1 is again conveyed on the document conveying path 32 in a state where the leading end is returned back to the trailing end from a state where it was conveyed for the first time on the document conveying path 32. As described above, the document G1 is conveyed in a switchback manner.

As described above, a path at which the document G1 fed from the sheet feed tray 30 passes through the document conveying path 32 and the bidirectional path 39 and returns to the document conveying path 32 upstream of the reading position in the conveying direction corresponds to the first path.

When the leading end of the documents G1 in the conveying direction which has been returned to upstream in the conveying direction at the reading position on the document conveying path 32 from the bidirectional path 39 arrives at a predetermined position upstream of the reading position in the conveying direction, specifically, at the switching position 45 immediately upstream on the conveying roller 35C, the rotation of the motor 67 is switched from a CW rotation to a CCW rotation. The controller 60 is able to judge a timing of switching the rotation of the motor 67 by referring to an elapsed time from when the document G1 is conveyed in a switchback manner on the bidirectional path 39, that is, when the rotation of the motor 67 is switched from a CCW rotation to a CW rotation or to a rotational quantity of the motor 67. It is noted that the switching from a CW rotation to a CCW rotation is made before the leading end of the documents G1 in the conveying direction arrives at the reading position, that is, before the document G1 is read for images at the reading position by the image reading unit 22.

Figure 30:
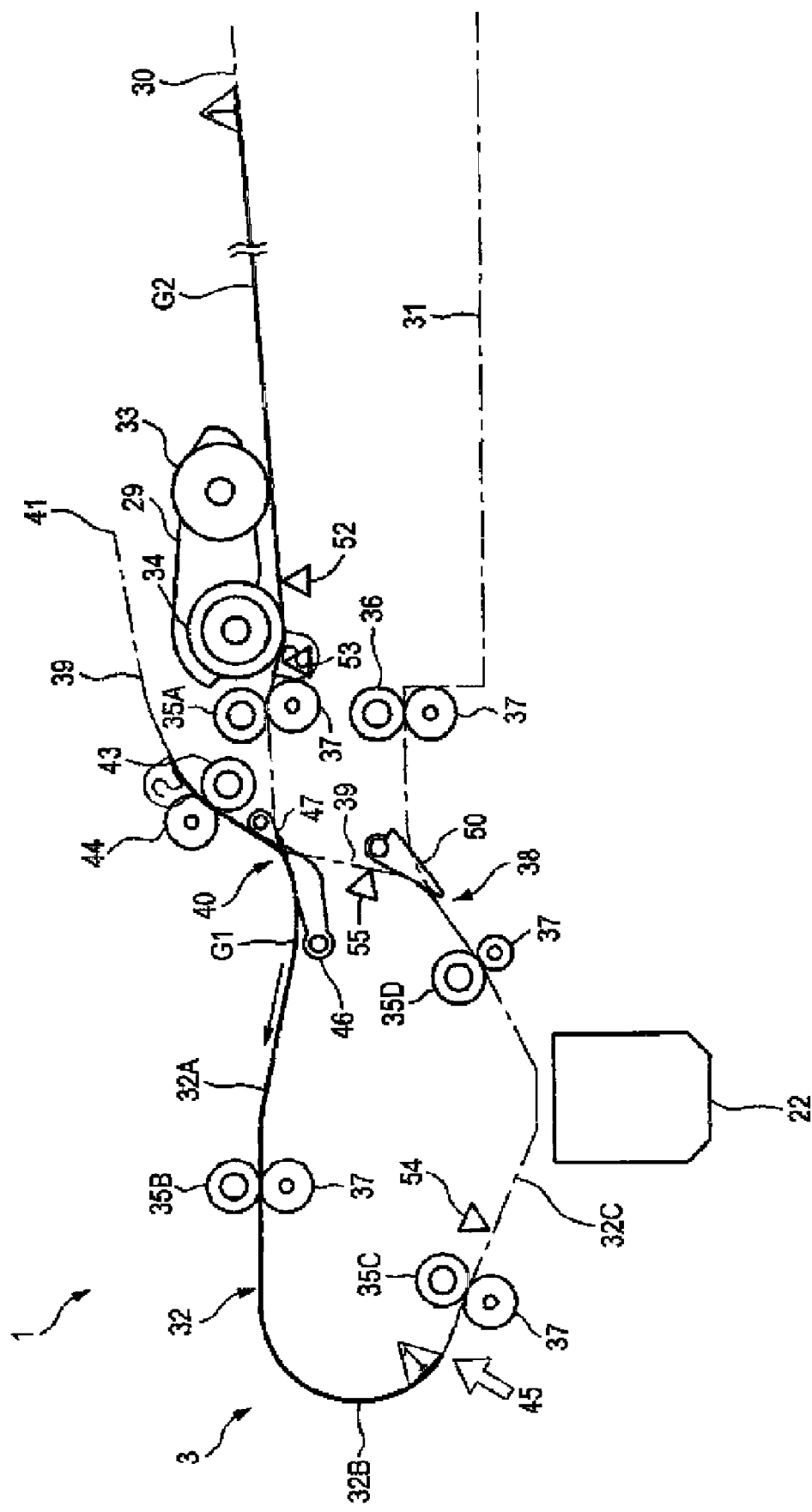
FIG. 30 is a pattern diagram for showing operations of reading images in the both-face reading mode.
Figure 31:
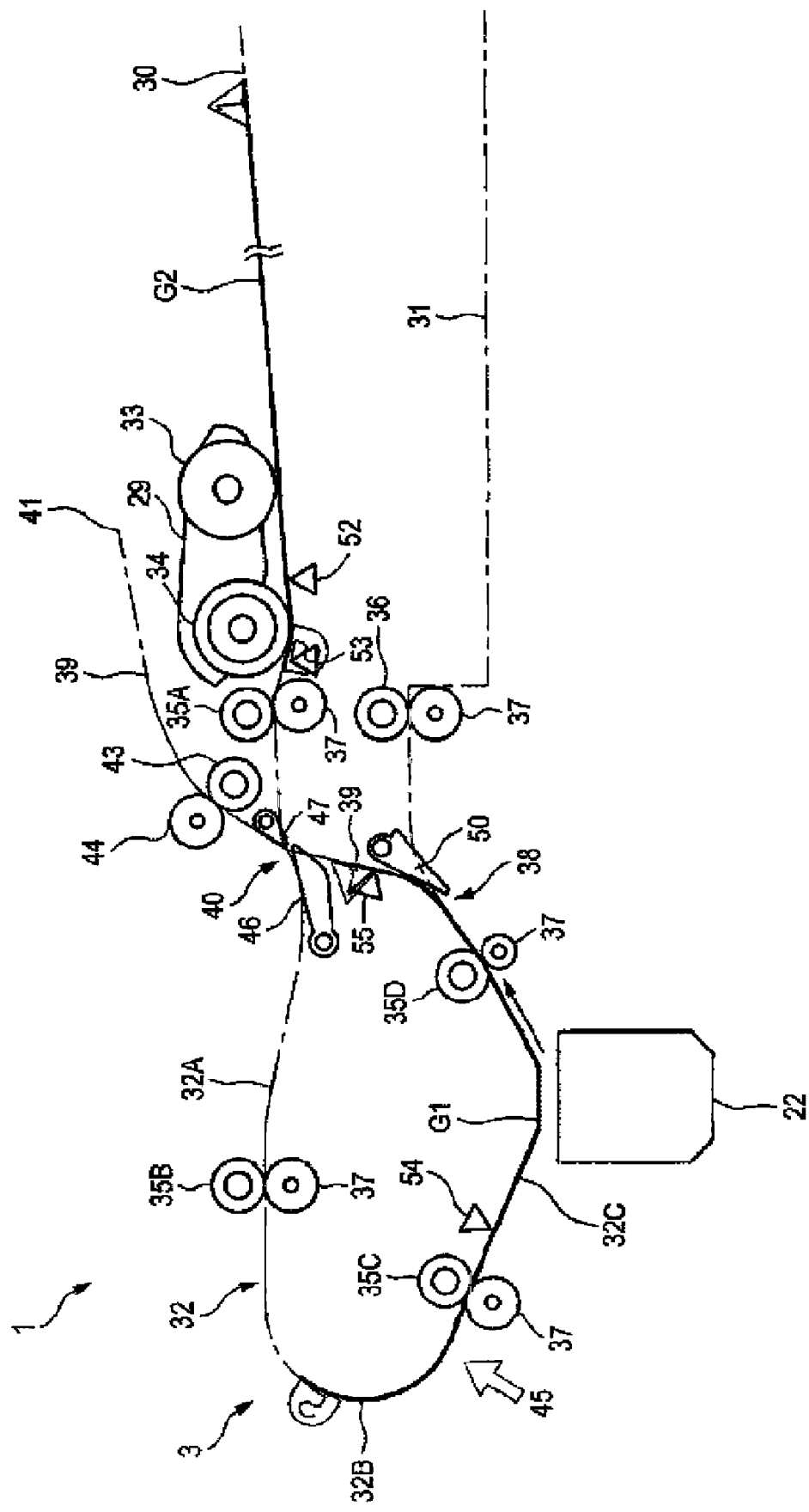
FIG. 31 is a pattern diagram for showing operations of reading images in the both-face reading mode.

As shown in FIG. 30, the document G1 is conveyed so as to turn reversely downward from the curved portion 32B on the document conveying path 32, and the first sheet sensor 54 is turned on when detecting the leading end of the document G1 (refer to FIG. 22). The leading end of the document G1 arrives at the reading position after a predetermined time has elapsed from when detected by the first sheet sensor 54. Therefore, when the leading end of the document G1 arrives at the reading position, the controller 60 activates the image reading unit 22, thereby reading images of the document G1 (S16, refer to FIG. 22). The document G1 passes over the reading position, with the second face opposing the image reading unit 22, and images on the second face of the document G1 are read by an image reading unit 22. In this instance, the controller 60 continues to activate the image reading unit 22 until the trailing end of the document G1 passes over the reading position. When the documents G1 are further conveyed and the trailing end of the documents G1 passes through the first sheet sensor 54, the first sheet sensor 54 detects the trailing end of the documents G1 and is turned off (refer to FIG. 22). The controller 60 judges that the trailing end of the documents G1 in the conveying direction has passed over the reading position after the elapse of a predetermined time from when the first sheet sensor 54 was turned off and completes image reading on the second face of the document G1 by the image reading unit 22 (refer to FIG. 22).

Image data on the second face of the document GI read by the image reading unit 22 is stored in a predetermined area of the RAM 63. The controller 60 writes the image data into the RAM 63 and also writes into a predetermined area of the RAM 63 a parameter indicating that the image reading on the second face is completed. The parameter is to indicate that "Reading on the Second Face is Completed" and used as reading state information.

As shown in FIG. 30, if the leading end of the documents G1 arrives at the switching position 45 upstream of the reading position on the document conveying path 32 in the conveying direction, as described above, the controller 60 switches the rotation of the motor 67 from a CW rotation to a CCW rotation. In this instance, halt instructions and CCW rotation instructions output from the CPU 61 of the controller 60 are stored in the RAM 63 as reading state information. Although temporarily blocked for the transfer of a driving force due to the gear loss when the motor 67 is switched in the rotational direction, the third gear system 120 transfers a driving force in the conveying direction to each of the conveying rollers 35A, 35B, 35C and 35D and the discharge roller 36, irrespective of the rotational direction of the motor 67. Therefore, after the rotation of the motor 67 is switched, the document G1 is conveyed to the reading position on the document conveying path 32 by the conveying roller 35B or others.

When the rotation of the motor 67 is switched from a CW rotation to a CCW rotation, the fourth gear system 150 is locked by a driving-force cutting off mechanism 151 by the supporting arm 156 of the planet gear device 153 rotating in a CCW rotation. Thereby, a driving force transferred from the planet gear device 153 to the driven gear 168 is cut off to halt the reversible roller 43. Therefore, as shown in FIG. 30, the leading end of the documents G1 is nipped by the conveying roller 35B and the pinch roller 37, and the reversible roller 43 will not rotate in a pulling-in direction even if the rotation of the motor 67 is switched in a state where the end of the document G1 is nipped by the reversible roller 43 and the pinch roller 44. The reversible roller 43 at which a driving force transferred from the motor 67 is cut off is rotated together in a returning direction by the documents G1 conveyed by the rotation of the conveying roller 35B.

The locking mechanism 86 is detached from the planet gear device 75 by the first gear system 70. In this instance, since the solenoid 88 is not activated, the planet gear device 75 is kept detached upon rotation of the motor 67 in a CCW rotation. The sixth gear system 170 allows the guide flap 50 to rotate at the second position by switching the rotation of the motor 67 from a CW rotation to a CCW rotation.

When the document G1 is further conveyed and the second sheet sensor 55 detects the leading end of the documents G1 in the conveying direction, which has advanced into the bidirectional path 39, and is turned on, the controller 60 turns the solenoid 161 on (refer to FIG. 22). Thereby, when the document G1 is pulled into the bidirectional path 39, lock of the supporting arm 156 of the planet gear device 153 by the driving-force cutting off mechanism 151 is released. As shown in FIG. 18, a driving force rotating in a CCW rotation is transferred from the motor 67 to the planet gear device 153, which then transfers a driving force rotating in a CW rotation to the driven gear 168, and the reversible roller 43 is rotated in a pulling-in direction.

As with the case shown in FIG. 27, the leading end of the documents G1 in the conveying direction, which has arrived at the intersecting position 40, pushes up the guide flap 46 to change the position from the third position to the fourth position, thereby advancing into the terminal end 41 of the bidirectional path 39 at the intersecting position 40. Then, as with the case shown in FIG. 28, after the trailing end of the document G1 passes over the intersecting position 40 on bidirectional path 39 and completely advances into the terminal end 41, the controller 60 switches the rotation of the motor 67 from a CCW rotation to a CW rotation, allowing the reversible roller 43 to rotate in a returning direction, thereby returning the document G1 to the intersecting position 40. In this instance, halt instructions and CW rotation instructions output from the CPU 61 of the controller 60 are stored as reading state information in the RAM 63. As with the case shown in FIG. 29, the documents G1 returned from the bidirectional path 39 are guided by the guide flap 46 and the guide flap 47 and conveyed from the terminal end 41 of the bidirectional path 39 to the reading position on the document conveying path 32. Thereby, the document G1 is again conveyed on the document conveying path 32 in a state where the leading end and the trailing end are reversed, that is, in a state where the documents G1 have been originally fed on the document conveying path 32 (S17).

As described above, a path, at which the document G1 having returned from the bidirectional path 39 to the document conveying path 32 passes through the document conveying path 32 and the bidirectional path 39 and again returns to upstream of the reading position in the conveying direction, corresponds to the second path.

It is noted that although the transfer of a driving force is temporarily blocked due to the gear loss when the motor 67 is switched in rotational direction, the third gear system 120 transfers a driving force in the conveying direction to each of the conveying rollers 35A, 35B, 35C and 35D and the discharge roller 36, irrespective of the rotational direction of the motor 67. Therefore, each of the conveying rollers 35A, 35B, 35C and 35D and the discharge roller 36 are rotated in the conveying direction. The first gear system 70 is in a state where the locking mechanism 86 retains the planet gear device 75 at the detachment position and a driving force to be transferred to the driven gear 95 is cut off. The rotation of the motor 67 is switched from a CCW rotation to a CW rotation, by which the sixth gear system 170 allows the guide flap 50 to change to the first position.

When the leading end of the documents G1 in the conveying direction, which has returned from the bidirectional path 39 to upstream of the reading position on the document conveying path 32 in the conveying direction, arrives at the first sheet sensor 54 and is detected by the first sheet sensor 54, the first sheet sensor 54 is turned on (refer to FIG. 22). The leading end of the document G1 in the conveying direction arrives at the reading position after the elapse of a predetermined time after detected by the first sheet sensor 54. Therefore, if the leading end of the documents G1 in the conveying direction arrives at the reading position, the controller 60 activates the image reading unit 22 to read images on the documents G1 (S18, refer to FIG. 22). In this instance, the documents G1 passes over the reading position, with the first face opposing the image reading unit 22. Images on the first face of the documents G1 are read by the image reading unit 22. When the documents G1 are further conveyed and the trailing end of the documents G1 in the conveying direction passes over the first sheet sensor 54, the first sheet sensor 54 detects the trailing end of the documents G1 in the conveying direction and is turned off. After the elapse of a predetermined time, based on a judgment that the trailing end of the document G1 in the conveying direction has passed over the reading position, the controller 60 completes the image reading on the first face of the documents G1 by the image reading unit 22 (refer to FIG. 22).

Image data on the first face of the document G1 read by the image reading unit 22 is stored in a predetermined area of the RAM 63. The controller 60 writes the image data into the RAM 63 and also writes into a predetermined area of the RAM 63 a parameter indicating that image reading on the first face is completed. The parameter is to indicate that "Reading on the First Face is Completed" and used as reading state information.

Figure 32:
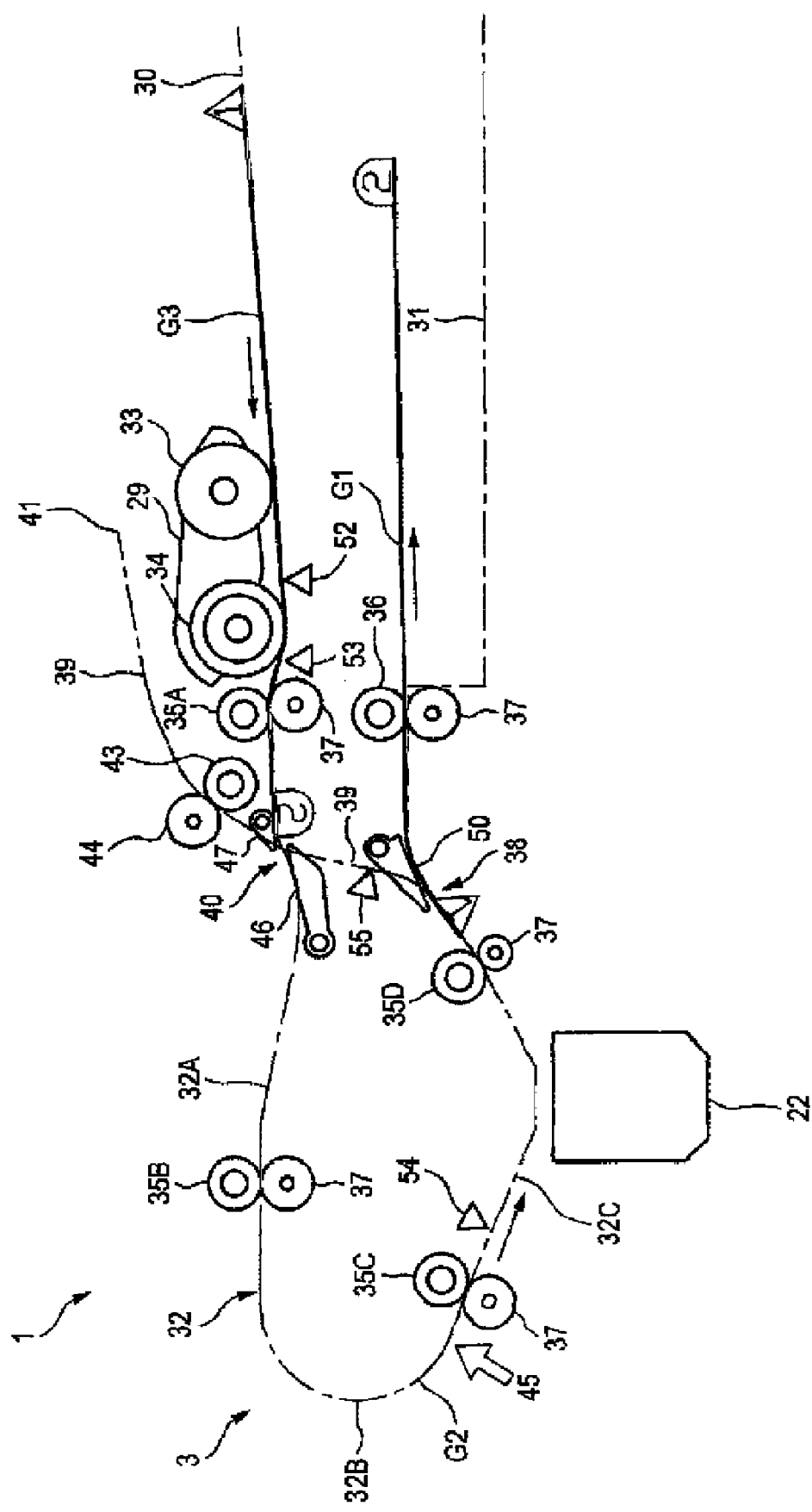
FIG. 32 is a pattern diagram for showing operations of reading images in the both-face reading mode.
Figure 33:
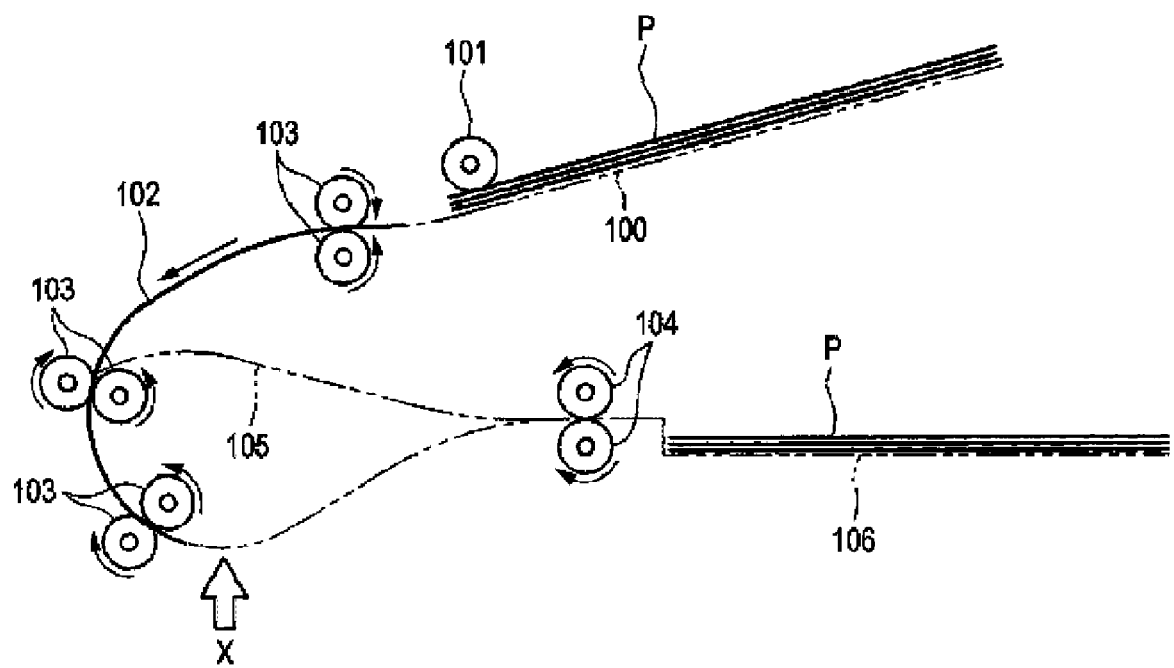
FIG. 33 is a pattern diagram for showing the conveyance of documents for reading images on both sides by a document feeder.
Figure 34:
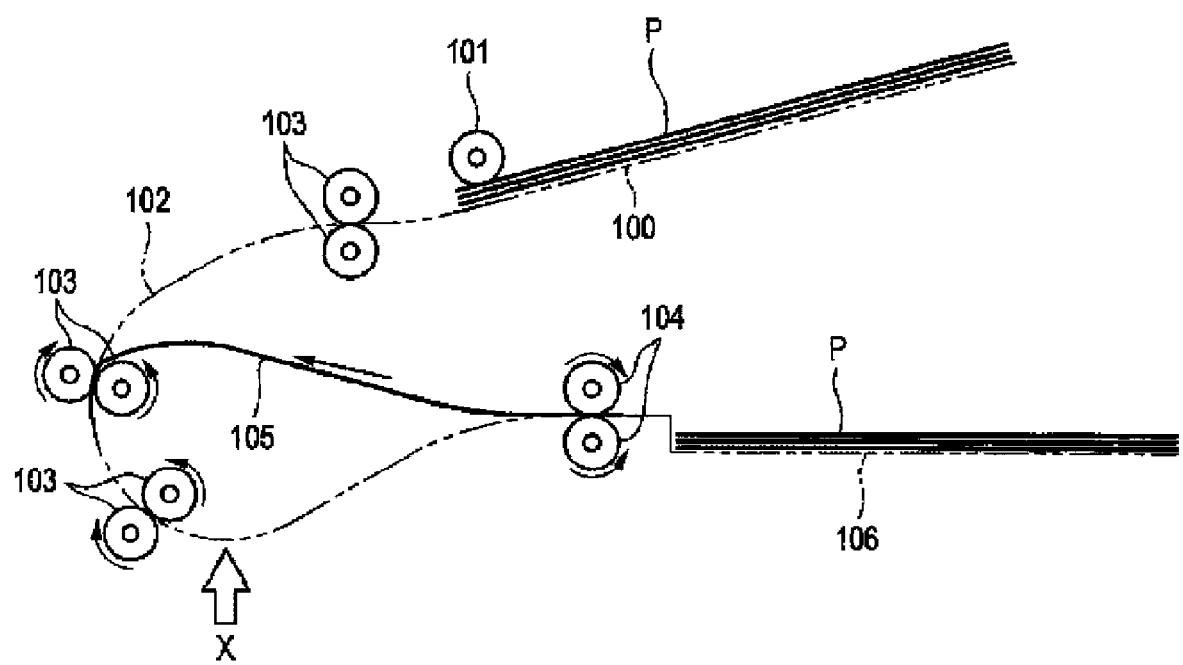
FIG. 34 is a pattern diagram for showing the conveyance of documents for reading images on both sides by a document conveying device.

As shown in FIG. 32, for the documents G1 the first face of which has been read, the leading end of the documents G1 is guided to the sheet discharging tray 31 through the connection position 38. Then, the documents G1 are discharged by the discharge roller 36 to the sheet discharging tray 31, with the first face kept downward (S19).

As described above, a path, at which the document G1 having again returned from the bidirectional path 39 to the document conveying path 32 passes through the document conveying path 32 and is discharged to the sheet discharging tray 31, corresponds to the third path.

Where next documents G2 are set on the sheet feed tray 30 after discharge of the documents G1 (S20 (Y)), in other words, where the first front sensor 52 is on, the controller 60 turns the solenoid 88 on, releasing the supporting arm 78 of the planet gear device 75 locked by the locking mechanism 86, thereby transferring a driving force from the motor 67 to the driven gear 95 by using the first gear system 70 to rotate the separation roller 34 in a feeding direction. Thereby, the documents G2 on the sheet feed tray 30 are fed to the document conveying path 32 and images on both faces of the document G2 are read in the same manner as described above.

Then, after the last document Gn placed on the sheet feed tray 30 is discharged from the document conveying path 32 to the sheet discharging tray 31, the controller 60 switches the rotation of the motor 67 from a CW rotation to a CCW rotation and also turns the solenoid 88 on. Thereby, as shown in FIG. 11, a driving force is transferred from the planet gear device 75 to rotate the driven gear 95 in a CCW rotation, and the shaft 111 is rotated in a direction opposing the feeding direction. The rotation of the shaft 111 is transferred to an arm 29 to elevate the arm 29, by which the feed roller 33 is separated from the guide face on the document conveying path 32. Thereby, an initial state is resumed in which documents Gn to be read for images can be inserted until they ride over below the feed roller 33 and come into contact with the separation roller 34. Thereafter, the controller 60 halts the motor 67 to complete the image reading in the both-face reading mode.

As described above, in the both-face reading mode, documents Gn are not read for images but allowed to pass over the reading position during the conveyance of the documents Gn on the first path, then read for images on the second face during the conveyance on the second path, and read for images on the first face during the conveyance on the third path. Thus, in this mode, when the time T (refer to FIG. 22)

has elapsed after detection of the trailing end of the document G1 in the conveying direction by the second front sensor 53 during the conveyance of the documents on the first path, the rotation of the motor 67 is to be switched from a CW rotation to a CCW rotation, thereby cutting off a driving force to be transferred to the separation roller 34. Therefore, the document G2 is halted in a state where the leading end of the document G2 in the conveying direction is in pressure-contact with the separation roller 34. Even when the leading end of the document G1, which is projected from the bidirectional path 39, is in contact with the document G2 on the sheet feed tray 30 on a switchback conveyance, the document G2 is kept placed thereon. Thereby, after conveyance of the document G1, the document G2 can be assuredly and swiftly fed to the document conveying path 32.

It is noted that in the image reading apparatus 1, the bidirectional path 39 for conveying again documents Gn to the document conveying path 32 is formed so as to project from the connection position 38 downstream of the reading position on the document conveying path 32 in the conveying direction and intersect with the intersecting position 40 upstream of the reading position in the conveying direction. The conveyance path of the bidirectional path 39 is just one example. It is a matter of course that the present invention is not restricted to the document conveying path 32 or the conveyance path of the bidirectional path 39 explained in the previous illustrative aspect. Therefore, on a switchback conveyance at which the leading end and the trailing end of a document are reversed, the conveyance path which is a two-way path may be changed whenever necessary, as long as the conveyance path is such that in which the document is temporarily exposed from an opening to above the sheet feed tray 30, as a matter of course, the guide flap 46 and the guide flap 47 may be changed whenever necessary, depending on whether the conveyance path is a two-way path. In place of the guide flaps 46, 47, for example, an elastically deformable film may be used as a guide member.

A sheet conveying device according to an aspect of the invention conveys sheet members in a sheet form. The sheet conveying device includes a first tray, a second tray, an opening portion, a sheet conveying path, a feeding unit, a sheet conveying unit, a driving source, a control unit, a transfer unit and a first detecting unit.

The first tray is to place a plurality of sheet members before feeding. The second tray is to place a plurality of sheet members after discharge. The opening portion is provided on the upper side of the first tray. The sheet conveying path is to connect the first tray, the second tray and the opening portion via a reading position.

The feeding unit is provided on the sheet conveying path. The feeding unit press-contacts with sheet members placed on the first tray, thereby feeding these sheet members sequentially to the sheet conveying path. The sheet conveying unit is provided on the sheet conveying path. The sheet member is conveyed by the sheet conveying unit.

A typical example of the driving source is a motor or the like, to generate a rotational driving force in a positive rotational direction (an example of a first rotational direction) or a reverse rotational direction (an example of a second rotational direction). The control unit is to switch the rotational direction of the driving source in the positive rotational direction or the reverse rotational direction.

The transfer unit is connected to the driving source. The transfer unit transfers a rotational driving force according to the position of a sheet member on the sheet conveying path from the driving source to the sheet conveying unit. Further, when the driving source is driven in a positive rotational direction, a rotational driving force is transferred from the driving source to the feeding unit. When a driving source is driven in a reverse rotational direction, the transfer of the rotational driving force from the driving source to the feeding unit is blocked.

The first detecting unit is provided downstream of the feeding unit in the conveying direction on the first conveying path. The first detecting unit detects the trailing end of a sheet member conveyed on the first conveying path.

In the sheet conveying device, a plurality of sheet members are sequentially conveyed as follows on a first path, a second path and a third path, thereby the sheet members are conveyed from the first tray to the second tray one by one. In this instance, on the first path, the sheet member fed from the first tray passes through a reading position and then returns to the sheet conveying path upstream of the reading position in the conveying direction. On the second path, the sheet member having returned to the sheet conveying path again returns to the sheet conveying path upstream of the reading position in the conveying direction through the reading position and the opening portion. On the third-path, the sheet member having again returned to the sheet conveying path is discharged to the second tray through the reading position and the opening portion.

In a case where sheet members are conveyed from the first tray to the second tray sequentially via the first path, the second path and the third path, the control unit switches the driving source from a positive rotational direction to a reverse rotational direction based on the result of the trailing end of the sheet member detected by the first detecting unit on conveyance of the sheet members on the first path.

In the sheet conveying device, the driving source is driven in a positive rotational direction, thereby the feeding unit feeds a sheet member on the first tray to a sheet conveying path. The sheet member is first allowed to pass through the first path and again returned to the sheet conveying path. When the sheet member is conveyed on the first path, the rotational direction of the driving source is switched based on the result detected by the first detecting unit. For example, when the trailing end of the sheet member is detected by the first detecting unit, the rotational direction of the driving source is switched from an existing positive rotational direction to a reverse rotational direction. The first detecting unit is disposed downstream in the conveying direction from feeding unit. Therefore, until the first detecting unit detects the trailing end of the sheet member, the driving source rotates and drives in a positive rotational direction. Thus, a subsequent sheet member placed on the first tray is in pressure-contact by the feeding unit, the leading end of which undergoes a rotational driving force resulting from the driving source by the time when the trailing end of a previously conveyed sheet member is detected by the first detecting unit. Thereby, even if a sheet member is exposed outside from an opening portion in the course of conveyance and in contact with a sheet member placed on the first tray before feeding, sheet members on the first tray are not disrupted and kept in an aligned state.

The sheet member having been again returned to the sheet conveying path via the first path is discharged onto the second tray after passage through the second path and the third path. In this instance, during the conveyance of the sheet member, images are read. Therefore, in order to prevent the deterioration of the thus read images, before arrival of the leading end of the sheet member at the reading position, the driving source is switched from a positive rotational direction to a reverse rotational direction. When the sheet member is conveyed through the second path, the sheet member is again in contact with a sheet member on the first tray before feeding. However, since the sheet member is continuously in pressure-contact by the feeding unit, sheet members on the first tray are kept in an aligned state.

Since sheet members are conveyed through the first path, the second path and the third path, the sheet members discharged onto the second tray are stacked in the same order as with the order when they are placed on the first tray.

On conveyance of sheet members on the first path, the control may switch the driving source from a positive rotational direction to a reverse rotational direction on the condition that the first detecting unit detects the trailing end of a sheet member.

The sheet conveying path may include a first conveying path leading from the first tray through the reading position to the second tray and a second conveying path leading from a predetermined first position downstream of the reading position in the conveying direction to the opening portion, and the sheet conveying unit may include the first conveying unit provided on the first conveying path and the second conveying unit provided on the second conveying path.

The control unit may switch the driving source from a positive rotational direction to a reverse rotational direction on conveyance of sheet members on the second path on the condition that the leading end of a sheet member is downstream of the first detecting unit in the conveying direction and has arrived at a predetermined second position upstream in the conveying direction from the first position.

Thereby, the sheet member is favorably conveyed on the second path.

The first detecting unit is provided on the first conveying path when the first detecting unit is provided downstream of the first detecting unit in the conveying direction on the first conveying path and upstream of the reading position in the conveying direction, and when the sheet conveying device further includes the second detecting unit configured to detect the leading end and the trailing end of a sheet member conveyed on the first conveying path, it is preferable that the second position is downstream of the first detecting unit in the conveying direction and upstream of the second detecting unit in the conveying direction.

Further, a block distance from the feeding unit to the second position on the first conveying path may be shorter in length in the conveying direction than a minimum size of a sheet member which can be conveyed on both faces in the sheet conveying device.

The feeding unit may include a roller body that rotates on receipt of a rotational driving force transferred from the transfer unit and a plate that is in pressure-contact with the roller body.

The first detecting unit may be provided in proximity to the feeding unit.

Thereby, it is possible to detect earlier a sheet member fed onto the sheet conveying path.

The transfer unit may include: a first transfer mechanism that transfers a rotational driving force in a definite direction from the driving source to the first conveying unit, irrespective of the rotational direction of the driving source; and a second transfer mechanism that transfers a rotational driving force from the driving source to the feeding unit only between the feeding operation to feed the sheet member to the first conveying path and a point when the rotational direction of the driving source is switched for the first time from the positive rotational direction to the reverse rotational direction by the control unit during the conveyance of one sheet member placed on the first tray based on feeding operation of feeding the sheet member to the sheet conveying path.

In the above-described transfer unit, another sheet member which is on standby on the first tray after the sheet member are fed from the first tray can be kept in a state of pressure-contact until another sheet member is fed.

The sheet conveying device may include: a third detecting unit provided at a side of the opening portion from the first position on the second conveying path and at a side of the first position from the second conveying unit to detect the trailing end of a sheet member conveyed on the second conveying path; and a first driving-force supplying unit that supplies a rotational driving force to the second conveying unit to convey the sheet member in a switchback manner on the second conveying path.

Thereby, the sheet member can be correctly conveyed in a switchback manner on the second conveying path.

The rotational direction of the second conveying unit may be switched to a direction depending on the rotational direction of the first driving-force supplying unit based on the result detected by the third detecting unit.

Thereby, the sheet member can be smoothly conveyed on the second conveying path.

The first driving-force supplying unit may include the driving source and the transfer unit. The second conveying unit may be connected to the transfer unit. The rotational direction of the second conveying unit may be switched to a direction depending on the rotational direction of the driving source based on the result detected by the third detecting unit.

Accordingly, the sheet conveying device is also able to smoothly convey the sheet member.

The second conveying unit conveys the sheet member on the second conveying path to return the sheet member from the opening portion to the first conveying path when the driving source rotates in a positive rotational direction and conveys the sheet members on the second conveying path to the opening portion when the driving source rotates in a reverse rotational direction.

The sheet conveying device may further include: a guide unit rotatably supported at the first position to guide the sheet member conveyed on the first conveying path to the second conveying path or to the second tray; and a second driving-force supplying unit that supplies a rotational driving force to the guide unit.

Thereby, the sheet members can be easily separated at the first position.

A rotational moving position of the guide unit may be switched by the second driving-force supplying unit that is controlled depending on the first path through the third path.

The second driving-force supplying unit may include the driving source and the transfer unit, and the guide unit may be connected to the transfer unit so that the sheet member is guided to the second tray when the driving source rotates in a positive rotational direction and is guided to the second conveying path when the driving source rotates in a reverse rotational direction.

A sheet conveying device according to another aspect of the invention includes: a sheet feeding port to which a sheet member is allowed to be inserted; a sheet discharging port from which the sheet member is allowed to be discharged; a conveying member that conveys the sheet member from the sheet feeding port to the sheet discharging port; a first path on which the sheet member is guided from the sheet feeding port through a reading position to a terminal end positioned above the sheet feeding port; a second path on which the sheet member is guided from the terminal end through the reading position to the terminal end again; a third path on which the sheet member is guided from the terminal end through the reading position to the sheet discharging port; a reverse rotational driving source; a transfer member that rotates the conveying member according to a positive rotation of the driving source and halting the rotation of the conveying member according to a reverse rotation of the driving source; a first detecting unit provided downstream at a sheet feeding port on the first path; and a control unit configured to switch the driving source from the positive rotation to the reverse rotation on the basis that the first detecting unit detects the trailing end of a sheet member on the first path.

In this instance, the sheet conveying device may further include an image reader at the reading position, and the sheet conveyed on the first path passes over the reading position without execution of a reading operation of the image reader.

According to one aspect of the present invention, on conveyance of sheet members along the first path and the second path, even when a sheet member is exposed from an opening portion and the sheet member is in contact with another sheet member on the first tray before feeding, sheet members on the first tray are in an aligned state and not disrupted. Thereby, it is possible to feed subsequent sheet members to the sheet conveying path assuredly and swiftly.

What is claimed is:

1. A sheet conveying device comprising:
a first tray on which a plurality of sheet members before feeding are allowed to be placed;
a second tray on which a plurality of sheet members after discharge are allowed to be placed;
an opening portion provided above the first tray;
a sheet conveying path which connects the first tray and the second tray to the opening portion through a reading position;
a feeding unit provided on the sheet conveying path to press-contact with a sheet member placed on the first tray, thereby feeding the sheet member sequentially to the sheet conveying path;
a sheet conveying unit provided on the sheet conveying path;
a driving source that generates a rotational driving force in a first rotational direction or a second rotational direction that is opposite to the first rotational direction;
a control unit configured to switch the rotational direction of the driving source to the first rotational direction or the second rotational direction;
a first detecting unit provided downstream of the feeding unit in the conveying direction on the sheet conveying path to detect the trailing end of the sheet member conveyed on the sheet conveying path;
a transfer unit that transfers a rotational driving force according to the position of the sheet member on the sheet conveying path from the driving source to the sheet conveying unit, the transfer unit configured to transfer the rotational driving force in the first rotational direction from the driving source to the feeding unit and the transfer unit configured to block the transfer of the rotational driving force from the driving source to the feeding unit when the driving source is driven to a second rotational direction; and
wherein, the sheet conveying unit is configured to convey the sheet member on the sheet conveying path from the first tray to the second tray in accordance with a first conveyance mode selected from one or more conveyance modes, the first conveyance mode comprising a first path, a second path and a third path which are arranged in this order, the first path on which, after being fed from the first tray and passing through the reading position, the sheet member returns to the sheet conveying path upstream of the reading position in the conveying direction through the opening portion, the second path on which the sheet member having returned to the sheet conveying path again returns through the reading position and the opening portion to the sheet conveying path upstream of the reading position in the conveying direction, and the third path on which the sheet member having again returned to the sheet conveying path is discharged through the reading position onto the second tray, and wherein, when the sheet member is conveyed according to the first conveyance mode, the control unit switches the driving source from the first rotational direction to the second rotational direction based on a result of the trailing end of the sheet member detected by the first detecting unit on conveyance of the sheet member on the first path.

2. The sheet conveying device according to claim 1, wherein the control unit switches the driving source from the first rotational direction to the second rotational direction when the sheet member is conveyed on the first path at a predetermined time after the first detecting unit detects the trailing end of the sheet member.

3. The sheet conveying device according to claim 1, wherein the sheet conveying path includes a first conveying path leading from the first tray through the reading position to the second tray and a second conveying path leading from a predetermined first position downstream of the reading position in the conveying direction to the opening portion, and wherein the sheet conveying unit includes a first conveying unit provided on the first conveying path and second conveying unit provided on the second conveying path.

4. The sheet conveying device according to claim 3, wherein the control unit switches the driving source from the first rotational direction to the second rotational direction when the sheet member is conveyed on the second path on a condition that the leading end of the sheet member is downstream of the first detecting unit in the conveying direction and has arrived at a predetermined second position upstream in the conveying direction from the first position.

5. The sheet conveying device according to claim 4, wherein the first detecting unit is provided on the first conveying path, wherein the sheet conveying device further comprises a second detecting unit provided downstream of the first detecting unit in the conveying direction on the first conveying path and upstream of the reading position in the conveying direction to detect the leading end and trailing end of the sheet member conveyed on the first conveying path, and wherein the second position is downstream of the first detecting unit in the conveying direction and upstream of the second detecting unit in the conveying direction.

6. The sheet conveying device according to claim 4, wherein a block distance from the feeding unit to the second position on the first conveying path is shorter in length in the conveying direction than a minimum size of a sheet member that can be conveyed on both faces by the sheet conveying device.

7. The sheet conveying device according to claim 1, wherein the feeding unit includes: a roller body that rotates on receipt of a rotational driving force transferred from the transfer unit; and a plate that is allowed to press-contact with the roller body.

8. The sheet conveying device according to claim 1, wherein the first detecting unit is provided in proximity to the feeding unit.

9. The sheet conveying device according to claim 3, wherein the transfer unit includes:
a first transfer mechanism that transfers a rotational driving force in a definite direction from the driving source to the first conveying unit, irrespective of the rotational direction of the driving source; and
a second transfer mechanism that transfers a rotational driving force from the driving source to the feeding unit only when the rotational direction of the driving source is switched for the first time from the first rotational direction to the second rotational direction by the control unit during the conveyance of one sheet member placed on the first tray based on feeding operation of feeding the sheet member to the sheet conveying path.

10. The sheet conveying device according to claim 3, further comprising:
a third detecting unit provided at a side of the opening portion from the first position on the second conveying path and at a side of the first position than the second conveying unit to detect the trailing end of the sheet member conveyed on the second conveying path; and
a first driving-force supplying unit that supplies a rotational driving force to the second conveying unit to convey the sheet member in a switchback manner on the second conveying path.

11. The sheet conveying device according to claim 10, wherein the rotational direction of the second conveying unit is switched to a direction depending on the rotational direction of the first driving-force supplying unit based on a result detected by the third detecting unit.

12. The sheet conveying device according to claim 11, wherein the first driving-force supplying unit includes the driving source and the transfer unit,
wherein the second conveying unit is connected to the transfer unit, and
wherein the rotational direction of the second conveying unit is switched to a direction depending on the rotational direction of the driving source based on the result detected by the third detecting unit.

13. The sheet conveying device according to claim 12, wherein the second conveying unit conveys the sheet member on the second conveying path to return the sheet member from the opening portion to the first conveying path when the driving source rotates in the first rotational direction and conveys the sheet member on the second conveying path to the opening portion when the driving source rotates in the second rotational direction.

14. The sheet conveying device according to claim 3, further comprising:
a guide unit rotatably supported at the first position to guide the sheet member conveyed on the first conveying path to the second conveying path or to the second tray; and
a second driving-force supplying unit that supplies a rotational driving force to the guide unit.

15. The sheet conveying device according to claim 14, wherein a rotational moving position of the guide unit is switched by the second driving-force supplying unit that is controlled depending on the first path to the third path.

16. The sheet conveying device according to claim 15, wherein the second driving-force supplying unit includes the driving source and the transfer unit, and
wherein the guide unit is connected to the transfer unit so that the sheet member is guided to the second tray when the driving source rotates in the first rotational direction and is guided to the second conveying path when the driving source rotates in the second rotational direction.

* * * * *